US 9,325,483 B2

(12) United States Patent
Karsi et al.

(10) Patent No.: US 9,325,483 B2
(45) Date of Patent: Apr. 26, 2016

(54) FLEXIBLE MIMO RESOURCE ALLOCATION THROUGH CROSS-CORRELATION NULLING AND FREQUENCY DOMAIN SEGMENTED RECEIVER PROCESSING

(71) Applicant: Wi-LAN Labs, Inc., San Diego, CA (US)

(72) Inventors: Murat Karsi, San Diego, CA (US); Kenneth L. Stanwood, Vista, CA (US); David Gell, San Diego, CA (US)

(73) Assignee: Wi-LAN Labs, Inc., San Diego, CA (US)

( * ) Notice: Subject to any disclaimer, the term of this patent is extended or adjusted under 35 U.S.C. 154(b) by 0 days.

(21) Appl. No.: 14/709,191

(22) Filed: May 11, 2015

(65) Prior Publication Data

US 2015/0280888 A1    Oct. 1, 2015

Related U.S. Application Data

(63) Continuation-in-part of application No. 14/298,774, filed on Jun. 6, 2014, now Pat. No. 9,137,688, which is a continuation-in-part of application No. 14/206,853, filed on Mar. 12, 2014, application No. 14/709,191, (Continued)

(51) Int. Cl.
*H04B 1/00* (2006.01)
*H04L 5/00* (2006.01)
(Continued)

(52) U.S. Cl.
CPC ........... *H04L 5/0073* (2013.01); *H04J 11/0056* (2013.01); *H04J 11/0059* (2013.01);
(Continued)

(58) Field of Classification Search
CPC ................ H04L 5/0023; H04L 1/0025; H04L 2025/03414; H04L 2025/03522; H04L 25/0228; H04L 25/03159; H04L 27/2607; H04L 5/0007; H04L 5/0044; H04L 5/0058; H04L 5/006; H04L 25/022; H04L 1/0002
See application file for complete search history.

(56) References Cited

U.S. PATENT DOCUMENTS 8,204,442 B2 * 6/2012 Sankar .................. H04L 5/0007
455/296
9,137,688 B2 * 9/2015 Karsi ..................... H04W 24/02
(Continued)

FOREIGN PATENT DOCUMENTS

EP          2750475 A1     7/2014
WO     2011/088465 A1     7/2011
(Continued)

OTHER PUBLICATIONS

International Search Report and Written Opinion for PCT/US2014/041411, mailed on Sep. 23, 2014, in 10 pages.

(Continued)

*Primary Examiner* — Ronald Eisner
(74) *Attorney, Agent, or Firm* — Procopio, Cory, Hargreaves & Savitch LLP

(57) ABSTRACT

An access node in a wireless communication network receives a transmission that includes first and second signals. The first and second signals may be layers of a multiple-input multiple-output transmission and may also be from first and second terminal nodes. The access node derives first and second local reference signals from the transmission received using first and second antennas and estimates channel transfer functions associated with the channel through with the transmission is received. Estimating the channel transfer function can include correlating at least a portion of an expected reference signal associated with the first signal with a corresponding portion of the first local reference signal and correlating at least a portion of an expected reference signal associated with the second signal with a corresponding portion of the second local reference signal. The expected reference signal portions used to estimate the channel transfer functions may be non-orthogonal.

29 Claims, 26 Drawing Sheets

Related U.S. Application Data which is a continuation-in-part of application No. 14/298,741, filed on Jun. 6, 2014, and a continuation-in-part of application No. 14/206,853, application No. 14/709,191, which is a continuation-in-part of application No. 14/206,853.

(60) Provisional application No. 61/991,194, filed on May 9, 2014, provisional application No. 61/832,629, filed on Jun. 7, 2013, provisional application No. 61/835,431, filed on Jun. 14, 2013, provisional application No. 61/798,572, filed on Mar. 15, 2013.

(51) Int. Cl.
*H04J 11/00* (2006.01)
*H04W 24/02* (2009.01)

(52) U.S. Cl.
CPC .............. *H04L5/005* (2013.01); *H04L 5/0023* (2013.01); *H04L 5/0058* (2013.01); *H04W 24/02* (2013.01); *H04L 5/006* (2013.01)

(56) References Cited

U.S. PATENT DOCUMENTS

| | | | | |
|---|---|---|---|---|
| 2008/0051087 | A1* | 2/2008 | Ryu | H04W 36/12 455/436 |
| 2008/0117833 | A1* | 5/2008 | Borran | H04W 72/082 370/252 |
| 2010/0087221 | A1 | 4/2010 | Srinivasan et al. | |
| 2011/0065447 | A1 | 3/2011 | Hahm et al. | |
| 2011/0124289 | A1 | 5/2011 | Balachandran et al. | |
| 2011/0201341 | A1 | 8/2011 | Choudhury et al. | |
| 2014/0274096 | A1* | 9/2014 | Stanwood | H04J 11/0056 455/452.1 |
| 2014/0286269 | A1* | 9/2014 | Stanwood | H04W 24/02 370/329 |
| 2014/0286270 | A1* | 9/2014 | Karsi | H04W 24/02 370/329 |
| 2015/0280888 | A1* | 10/2015 | Karsi | H04L 5/0073 370/329 |

FOREIGN PATENT DOCUMENTS

| | | |
|---|---|---|
| WO | 2011/159042 A2 | 12/2011 |
| WO | 2012/139624 A1 | 10/2012 |
| WO | 2013/029413 A1 | 3/2013 |
| WO | 2013/069627 A1 | 5/2013 |

OTHER PUBLICATIONS

Brück. "3G/4G Mobile Communications Systems." Qualcomm Corporate R&D Center Germany. Mar. 5, 2012, 19 pages.
Pauli et al. "Heterogeneous LTE Networks and Inter-Cell Interference Coordination." Novel Mobile Radio Research. Dec. 2010, 9 pages.
Pauli et al. "Inter-Cell Interference Coordination for LTE-A." Novel Mobile Radio Research. Sep. 2011, 7 pages.
Jia-Ming et al. "A New Channel Estimation Model in OFDM System Based on Improved Pilot Training Sequence." 2004 4th International Conference on Microwave and Millimeter Wave Technology Proceedings. pp. 846-849.
"Exploring the World of Wireless LTE-Advanced and Coordinated Multi-Point (COMP): What Goes Around, Comes Around. Special Preview Edition." Signals Ahead. 8(5):Apr. 16, 2012.
Rayal. "An overview of the LTE physical layer." EE Times. May 24, 2010. Downloaded from the following sites on Jul. 29, 2014: http://www.eetimes.com/document.asp?doc_id=1278096; http://www.eetimes.com/document.asp?doc_id=1278137; http://www.eetimes.com/document.asp?doc_id=1278199.
Du et al. "Channel Estimation for D-BLAST OFDM Systems." School of Electrical and Computer Engineering, Georgia Institute of Technology, Atlanta, GA. Nov. 2002, 5 pages.
Ozdemir et al. "Channel Estimation for Wireless OFDM Systems." IEEE Communications Surveys & Tutorials. 9(2):18-48 (2nd Quarter 2007).
Li et al. "Channel Estimation for OFDM Systems with Transmitter Diversity in Mobile Wireless Channels." IEEE Journal on Selected Areas in Communications. 17(3):461-471 (Mar. 1999).
Sawahashi et al. "Coordinated Multipoint Transmission/Reception Techniques for LTE-Advanced." IEEE Wireless Communications, Jun. 2010 (pp. 26-34).
Lee et al. "Coordinated Multipoint Transmission and Reception in LTE-Advanced: Deployment Scenarios and Operational Challenges." IEEE Communications Magazine, Feb. 2012 (pp. 148-155).
Lee et al. "Coordinated Multipoint Transmission and Reception in LTE-Advanced Systems." IEEE Communications Magazine, Nov. 2012 (pp. 44-50).
Boudreau et al. "Interference Coordination and Cancellation for 4G Networks." LTE Part II: 3GPP Release 8. IEEE Communications Magazine, Apr. 2009 (pp. 74-81).
Léost et al. "Interference Rejection Combining in LTE Networks." Bell Labs Technical Journal. 17(1):25-50 (2012).
Wild et al. "Joint Channel Estimation across Multiple Cells in Coordinated Multi-Point." IEEE 2012, pp. 845-849.
Kottkamp et al. "LTE-Advanced Technology Introduction White Paper." Rohde & Schwarz. Aug. 2012, 41 pages.
Roessler et al. "LTE-Advanced (3GPP Rel.11) Technology Introduction White Paper." Rohde & Schwarz. Jul. 2013, 39 pages.
Taoka et al. "MIMO and CoMP in LTE-Advanced." NTT DOCOMO Technical Journal. 12(2):20-28, Sep. 2010.
Panasonic. "Uplink enhancement for Rel.11." 3GPP TSG-RAN WG1 Meeting #66, R1-112367. Athens, Greece, Aug. 22-26, 2011. 4 pages.
Nokia. "DL CoMP phase2 simulation results." 3GPP TSG-RAN WG1 Meeting #66, R1-112384. Athens, Greece, Aug. 22-26, 2011. 5 pages.
Nokia. "On cell-edge enhancements via inter-cell orthogonal DM RS." 3GPP TSG-RAN WG1 Meeting #66, R1-112394, Athens, Greece, Aug. 22-26, 2011. 3 pages.
Samsung. "UL DMRS Enhancements in Rel.11." 3GPP TSG RAN WG1 #66, R1-112520, Athens, Greece, Aug. 22-26, 2011. 3 pages.
Li et al. "Simplified Channel Estimation for OFDM Systems With Multiple Transmit Antennas." IEEE Transactions on Wireless Communications. 1(1):67-75 (Jan. 2002).
Baker. "From Macro to Small Cells: Enhancements for Small Cells in 3GPP." Alcatel-Lucent. Small Cells Summit 2013, London, UK, 12 pages.
Määttänen et al. "System-level performance of LTE-Advanced with joint transmission and dynamic point selection schemes." EURASIP Journal on Advances in Signal Processing 2012, 2012:247 (37 pages).
Hou et al. "Unified View of Channel Estimation in MIMO-OFDM Systems." IEEE 2005, pp. 34-38.
International Search Report and Written opinion for related PCT/US2014/024150, mailed Jun. 12, 2014, in 17 pages.

* cited by examiner

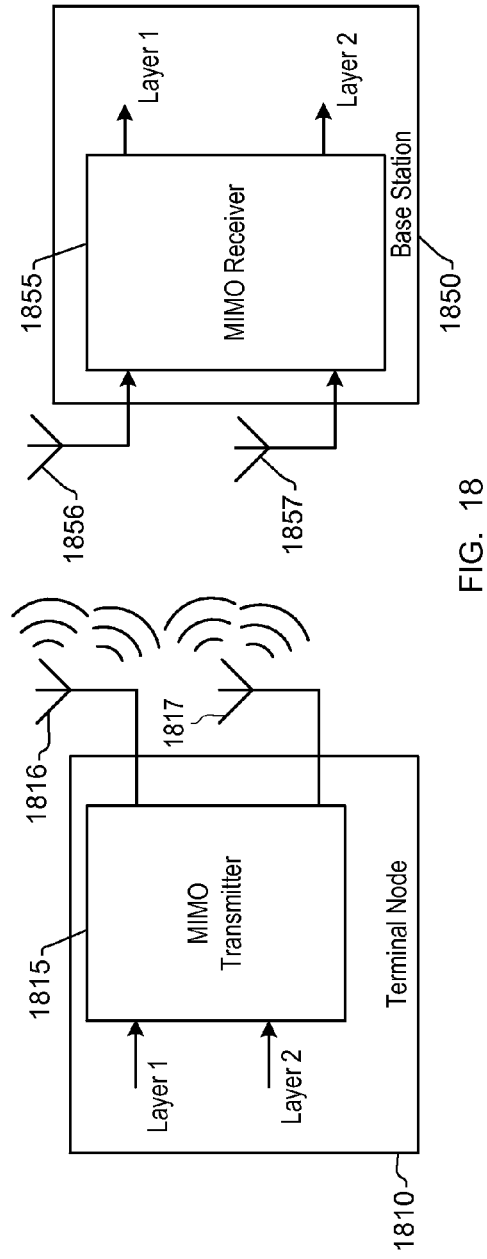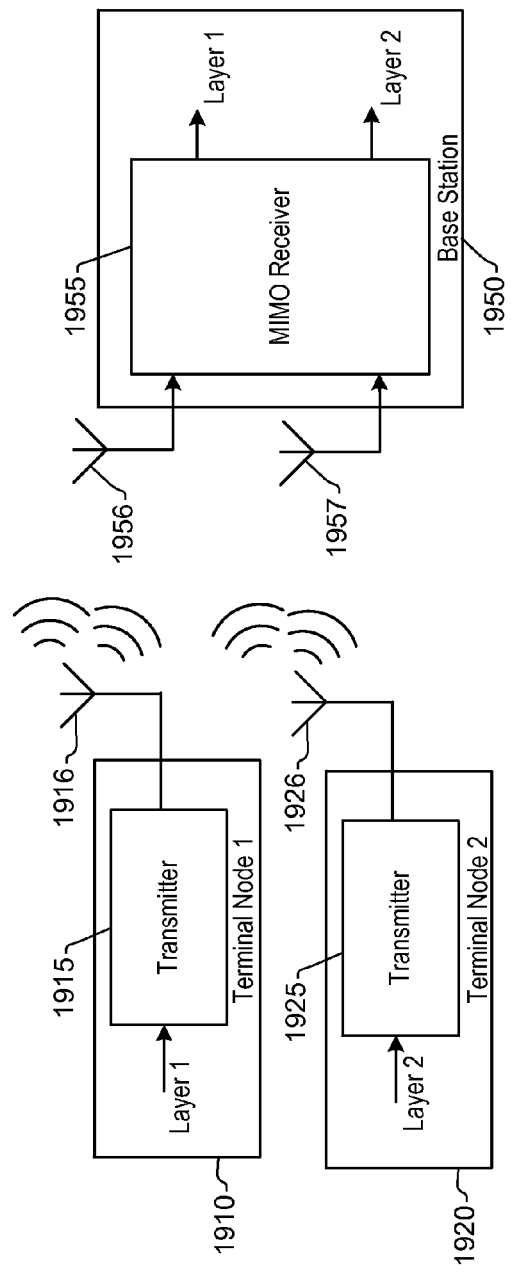

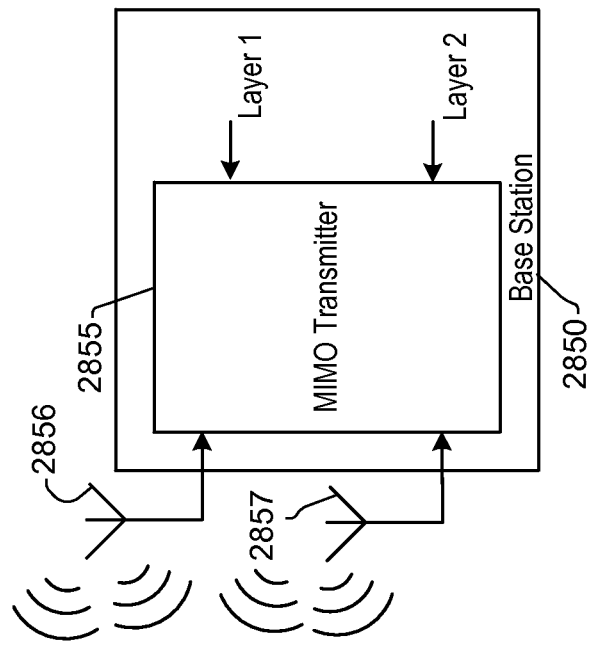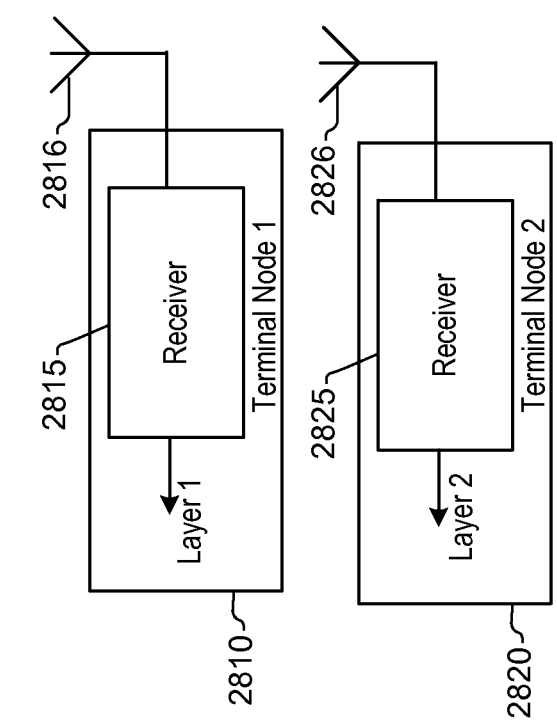
FIG. 28

FLEXIBLE MIMO RESOURCE ALLOCATION THROUGH CROSS-CORRELATION NULLING AND FREQUENCY DOMAIN SEGMENTED RECEIVER PROCESSING

CROSS-REFERENCE TO RELATED APPLICATIONS

This application claims the benefit of U.S. provisional patent application Ser. No. 61/991,194, filed May 9, 2014, which is hereby incorporated by reference.
This application is also a continuation-in-part of U.S. patent application Ser. No. 14/298,774, filed Jun. 6, 2014, which claims the benefit of U.S. provisional patent application Ser. No. 61/832,629, filed Jun. 7, 2013 and U.S. provisional patent application Ser. No. 61/835,431, filed Jun. 14, 2013, which are hereby incorporated by reference. U.S. patent application Ser. No. 14/298,774 is also a continuation-in-part of U.S. patent application Ser. No. 14/206,853, filed Mar. 12, 2014, which claims the benefit of U.S. provisional patent application Ser. No. 61/798,572, filed Mar. 15, 2013, which are hereby incorporated by reference.
This application is also a continuation-in-part of U.S. patent application Ser. No. 14/298,741, filed Jun. 6, 2014, which claims the benefit of U.S. provisional patent application Ser. No. 61/832,629, filed Jun. 7, 2013 and U.S. provisional patent application Ser. No. 61/835,431, filed Jun. 14, 2013, which are hereby incorporated by reference. U.S. patent application Ser. No. 14/298,741 is also a continuation-in-part of U.S. patent application Ser. No. 14/206,853, filed Mar. 12, 2014, which claims the benefit of U.S. provisional patent application Ser. No. 61/798,572, filed Mar. 15, 2013, which are hereby incorporated by reference.
This application is also a continuation-in-part of U.S. patent application Ser. No. 14/206,853, filed Mar. 12, 2014, which claims the benefit of U.S. provisional patent application Ser. No. 61/798,572, filed Mar. 15, 2013, which are hereby incorporated by reference.

FIELD OF THE INVENTION

The field of the invention is communication systems and, more particularly, resolution of interference in wireless communication systems.

BACKGROUND

Broadband wireless cells tend to be UL interference limited. There are many scenarios that can cause UL interference including cell edge interference in a frequency reuse 1 network (where the same frequencies are used throughout a geographic area) or when neighboring cells share a frequency channel causing co-channel interference.

However, the Long Term Evolution (LTE) wireless standard adds an additional scenario. When a femto base station is present in the macrocell coverage footprint of a macro base station in a frequency reuse 1 network, this can create what is termed in LTE as the near-far problem. If a user equipment (UE) is in the femtocell coverage area of the femto base station, but is in communication with the more distant macro base station it may be transmitting using a very high power, causing excessive uplink interference at the femto base station. Many other interference scenarios exist.

Aside from brute force methods such as using very robust and inefficient modulation and coding schemes, current methods to combat this include coordinated multipoint (CoMP) which contains multiple methods. First, fractional frequency reuse may be used, coordinating the UL resources so that a UE communication with a macrocell and a UE communication with a femto base station that has an overlapping coverage footprint do not transmit on the same subcarriers simultaneously. This technique has been previously used in WiMAX. Second, the two base stations may use beamforming to coordinate the UL resources spatially. Both of these methods require coordinated scheduling. Additionally, using joint reception, both base stations receive the same data from an individual UE using the same subcarriers at the same time. This may additionally be beamformed. The joint reception, of course, uses double the resources since the resources of both base stations are tied up with the same reception.

Fractional frequency reuse is inefficient due to the need for one base station to not schedule UL resources while the other is using them. Beamforming requires significant antenna resources which may not be available on a femto base station. Additionally, there may be times when coordinated scheduling of beamforming cannot be achieved due to the bandwidth and quality of service (QoS)/quality of experience (QoE) needs of interfering UEs, requiring a fallback to fractional frequency reuse.

Other attempts to combat interference include use of Inter-Cell Interference Cancellation (ICIC) techniques. Such ICIC techniques include signaling between base stations to inform other stations about future planned transmissions of a base station, and reporting the interference levels experienced by a base station. These techniques use High Interference Indicator (HII) and an Overload Indicator (OI) respectively. HII technique is not spectrally efficient since it may result in base stations avoiding use of bandwidth resources if they heed the planned transmission information provided by the base station providing the HII. OI technique has the additional drawback that it only reports the exposure to interference level after the exposure has occurred.

SUMMARY

In one aspect, an access node is provided that includes: a first radio module configured to receive, using a first antenna, a transmission including a first signal and a second signal; a second radio module configured to receive, using a second antenna, the transmission; a memory module; and a processor module coupled to the first and second radio modules and the memory module and configured to: derive a first local reference signal from the received transmission of the first radio module; derive a second local reference signal from the received transmission of the second radio module; and estimate one or more channel transfer functions associated with the received transmission, the estimation of the one or more channel transfer functions including correlating at least a portion of an expected reference signal associated with the first signal and at least a portion of an expected reference signal associated with the second signal with corresponding portions of the first and second local reference signals, wherein the at least a portion of the expected reference signal associated with the first signal and the at least a portion of the expected reference signal associated with the second signal are non-orthogonal.

In one aspect, a method is provided for receiving communications in a wireless communication system. The method includes: receiving, using a first antenna, a transmission that includes a first signal and a second signal; receiving the transmission using a second antenna; deriving a first local reference signal from the transmission received using the first antenna; and deriving a second local reference signal from the transmission received using the second antenna; and estimating one or more channel transfer functions associated with the received transmission, the estimating including correlating at least a portion of an expected reference signal associated with the first signal and at least a portion of an expected reference signal associated with the second signal with corresponding portions of the first and second local reference signals, wherein the at least a portion of the expected reference signal associated with the first signal and the at least a portion of the expected reference signal associated with the second signal are non-orthogonal.

In one aspect, a method is provided for partitioning a channel based on frequency selectivity of a channel. The method includes: dividing an aggregate frequency range into frequency range sub-bands, the aggregate frequency range being a range of frequencies occupied by one or more of a plurality of signals; and segmenting the frequency range sub-bands into one or more frequency range segments based at least in part on identifying frequencies that are occupied by unique combinations of the plurality of signals.

In one aspect, a communication system is provided that includes: a first terminal node including a first transmitter configured to transmit a first signal that includes a first expected reference signal; a second terminal node including a second transmitter configured to transmit a second signal that includes a second expected reference signal, wherein the second expected reference signal is transmitted using frequencies that partially overlap with frequencies used by the first terminal node to transmit the first expected reference signal, or wherein the second expected reference signal and the first expected reference signal are non-orthogonal; an access node comprising: a first radio module configured to receive, using a first antenna, a transmission including the first signal and the second signal; a second radio module configured to receive, using a second antenna, the transmission; a memory module; and a processor module coupled to the first and second radio modules and the memory module and configured to: derive a first local reference signal from the received transmission of the first radio module; derive a second local reference signal from the received transmission of the second radio module; and estimate one or more channel transfer functions associated with the received transmission, the estimation of the one or more channel transfer functions including correlating at least a portion of the first expected reference signal and at least a portion of the second expected reference signal with corresponding portions of the first and second local reference signals, wherein the at least a portion of the first expected reference signal and the at least a portion of the second expected reference signal are non-orthogonal.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 18 is a block diagram illustrating single-user multiple-input multiple-output uplink communication in a communication network in accordance with aspects of the invention;

FIG. 19 is a block diagram illustrating multi-user multiple-input multiple-output uplink communication in a communication network in accordance with aspects of the invention;

FIG. 28 is a block diagram illustrating multi-user multiple-input multiple-output downlink communication in a communication network in accordance with aspects of the invention.

DETAILED DESCRIPTION

Systems and methods for resolving interference in a communication network are provided that may allow more efficient modulation and coding, more efficient allocation of communication resources, and more reliable communication.

Figure 1:
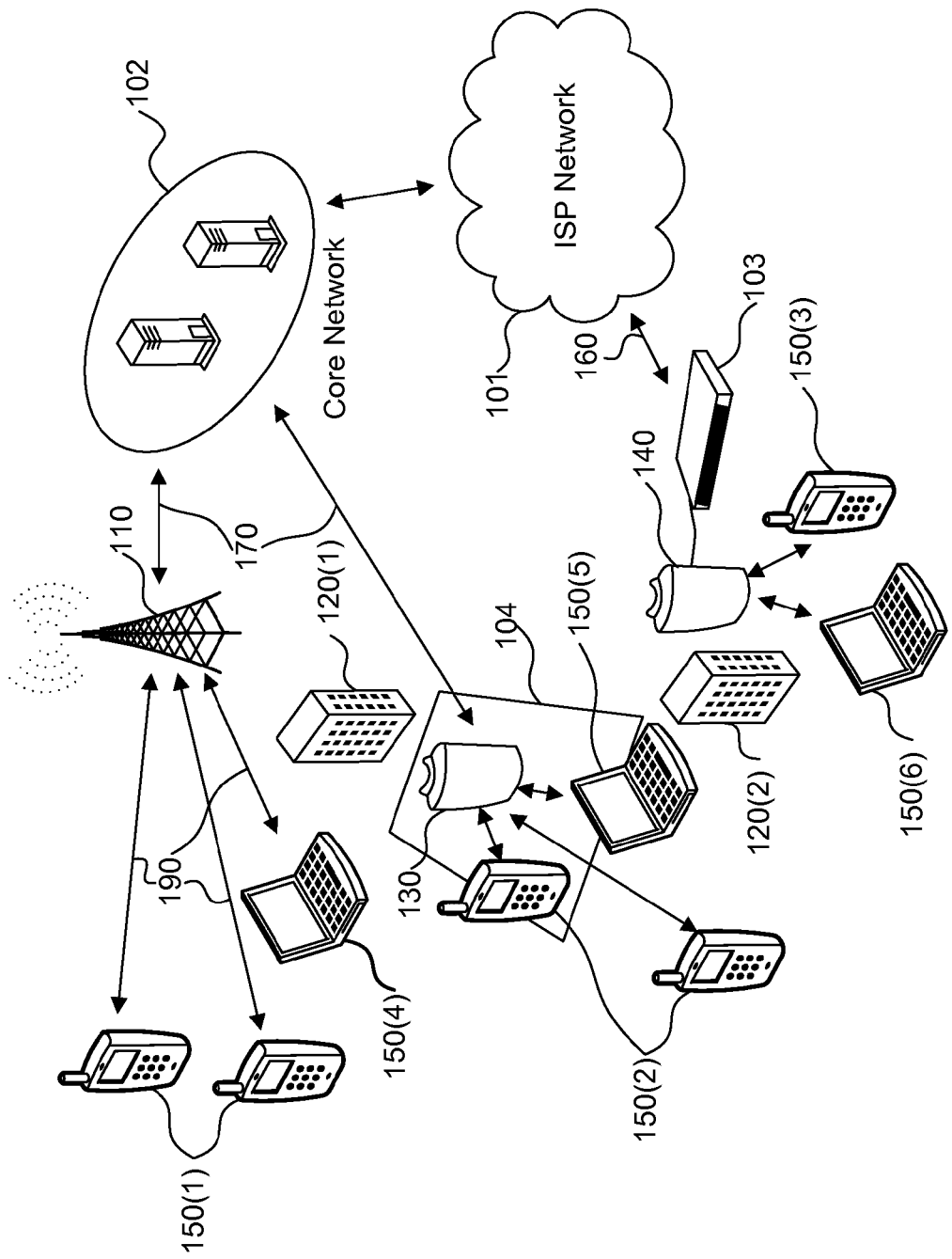
FIG. 1 is a block diagram of a communication network in which systems and methods disclosed herein can be implemented in accordance with aspects of the invention.

FIG. 1 is a block diagram of a communication network in which systems and methods disclosed herein can be implemented in accordance with aspects of the invention. A macro base station 110 is connected to a core network 102 through a backhaul connection 170. In an embodiment, the backhaul connection 170 is a bidirectional link or two unidirectional links. The direction from the core network 102 to the macro base station 110 is referred to as the downstream or downlink (DL) direction. The direction from the macro base station 110 to the core network 102 is referred to as the upstream or uplink (UL) direction. Subscriber stations 150(1) and 150(4) can connect to the core network 102 through the macro base station 110. Wireless links 190 between subscriber stations 150 and the macro base station 110 are bidirectional point-to-multipoint links, in an embodiment. The direction of the wireless links 190 from the macro base station 110 to the subscriber stations 150 is referred to as the downlink or downstream direction. The direction of the wireless links 190 from the subscriber stations 150 to the macro base station 110 is referred to as the uplink or upstream direction. Subscriber stations are sometimes referred to as user equipment (UE), users, user devices, handsets, terminal nodes, or user terminals and are often mobile devices such as smart phones or tablets. The subscriber stations 150 access content over the wireless links 190 using base stations, such as the macro base station 110, as a bridge.

In the network configuration illustrated in FIG. 1, an office building 120(1) causes a coverage shadow 104. A pico station 130 can provide coverage to subscriber stations 150(2) and 150(5) in the coverage shadow 104. The pico station 130 is connected to the core network 102 via a backhaul connection 170. The subscriber stations 150(2) and 150(5) may be connected to the pico station 130 via links that are similar to or the same as the wireless links 190 between subscriber stations 150(1) and 150(4) and the macro base station 110. The term cell (including variations such as femtocell, microcell, pico-cell, and macrocell) refers to the coverage footprint of a corresponding base station or the coverage footprint of a sector of a multi-sector base station.

In office building 120(2), an enterprise femto base station 140 provides in-building coverage to subscriber stations 150 (3) and 150(6). The enterprise femto base station 140 can connect to the core network 102 via an internet service provider network 101 by utilizing a broadband connection 160 provided by an enterprise gateway 103.

A subscriber stations may operate in a mode where it is associated with a base station within its wireless range. In this associated mode, the subscriber station may receive data and control signals from the base station it associates with. As propagation conditions change or a subscriber stations moves within a cell, association with another base station may become more favorable. The base station and the subscriber station may then be involved with a handover procedure that associates the subscriber station with another base station. Typically it may be favorable to perform a handover of subscriber stations that move towards the geographical edges of cells and continue into the coverage area of another cell.

The wireless communication system described with respect to FIG. 1 can experience many UL interference scenarios.

Figure 2:
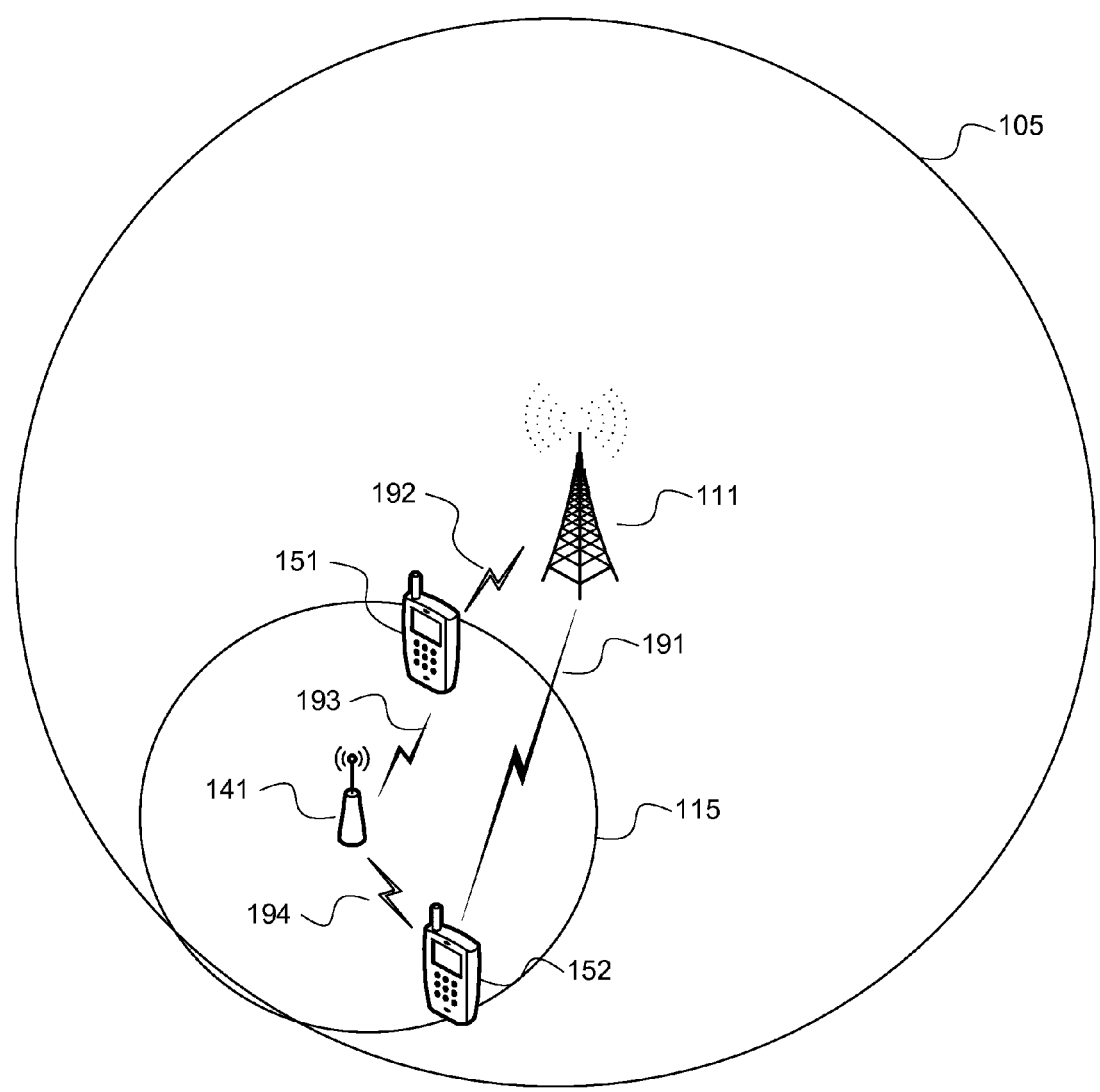
FIG. 2 is a block diagram showing uplink interference scenarios in a communication network in accordance with aspects of the invention.

FIG. 2 is a block diagram showing uplink interference scenarios in a communication network in which systems and methods disclosed herein can be implemented in accordance with aspects of the invention. FIG. 2 shows an LTE frequency reuse 1 scenario. A macrocell 105 representing the coverage area of macro station 111, which may be an instance of macro base station 110 of FIG. 1, and a femtocell 115 representing the coverage area of femto station 141, which may be an instance of enterprise femto base station 140 of FIG. 1, pico station 130 of FIG. 1, or another type of base station such as a residential femto base station. UE 151, which may be an instance of subscriber station 150 of FIG. 1, is part of a closed subscriber group (CSG) defined by access privilege to femto station 141. UE 152, which may be another instance of subscriber station 150 of FIG. 1, is not part of the CSG of femto station 141 even though it is geographically within the footprint of femtocell 115. This creates what is termed in LTE as the near-far problem. Macro station 111 may receive wanted signal 191 from UE 152 with weaker signal strength than it receives unwanted signal 192 from UE 151. Similarly, femto station 141 receives both the wanted signal 193 from UE 151 and an unwanted signal 194 from UE 152. Because UE 152 is attempting to communicate with the more distant macro station 111, unwanted signal 194 may be stronger than wanted signal 193.

The scenarios illustrated in FIG. 2 can be further complicated when there is, for example, another femto station within the footprint of macrocell 105 sharing a cell edge with femtocell 115 allowing an additional interfering source.

Figure 3:
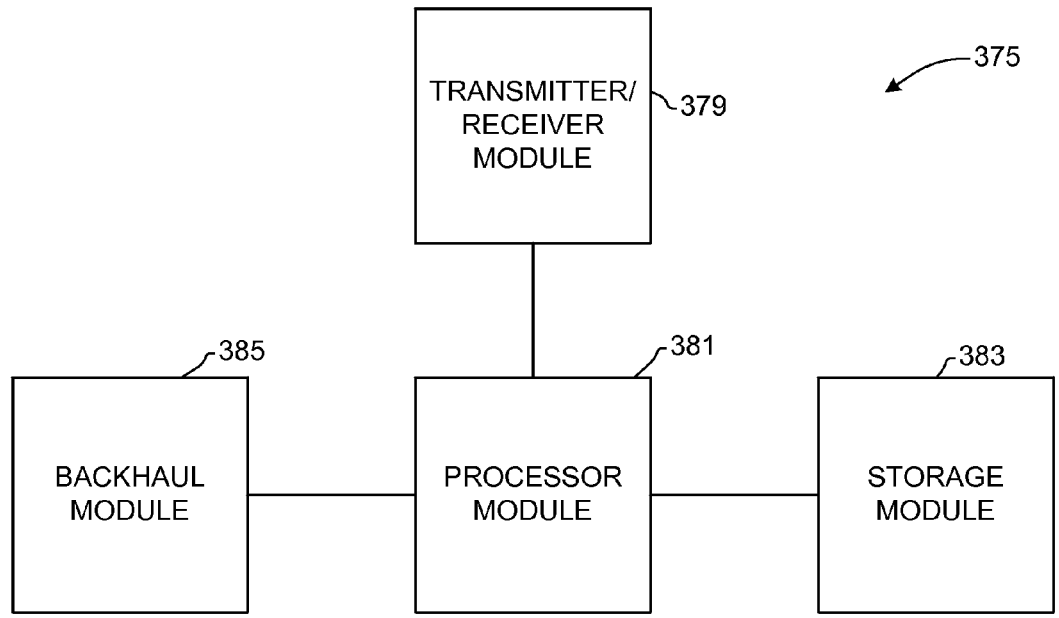
FIG. 3 is a block diagram of a base station in accordance with aspects of the invention.

FIG. 3 is a functional block diagram of a base station 375 in accordance with aspects of the invention. In various embodiments, the base station 375 may be a mobile WiMAX base station, a Universal Mobile Telecommunications System (UMTS) NodeB, an LTE evolved Node B (eNB or eNodeB), or other wireless base station or access point of various form factors. For example, the macro base station 110, the pico station 130, or the enterprise femto base station 140 of FIG. 1 or the macro station 111 or femto station 141 of FIG. 2 may be provided, for example, by the base station 375 of FIG. 3. The base station 375 includes a processor module 381. The processor module 381 is coupled to a transmitter-receiver (transceiver) module 379, a backhaul interface module 385, and a storage module 383.

The transmitter-receiver module 379 is configured to transmit and receive communications wirelessly with other devices. The base station 375 generally includes one or more antennae for transmission and reception of radio signals. The communications of the transmitter-receiver module 379 may be with terminal nodes.

The backhaul interface module 385 provides communication between the base station 375 and a core network. This may include communications directly or indirectly (through intermediate devices) with other base stations, for example, to implement the LTE X2 interface. The communication may be over a backhaul connection, for example, the backhaul connection 170 of FIG. 1. Communications received via the transmitter-receiver module 379 may be transmitted, after processing, on the backhaul connection. Similarly, communication received from the backhaul connection may be transmitted by the transmitter-receiver module 379. Although the base station 375 of FIG. 2 is shown with a single backhaul interface module 385, other embodiments of the base station 375 may include multiple backhaul interface modules. Similarly, the base station 375 may include multiple transmitter-receiver modules. The multiple backhaul interface modules and transmitter-receiver modules may operate according to different protocols. Communications originating within the base station 375, such as communications with other base stations, may be transmitted on one or more backhaul connections by backhaul interface module 385. Similarly, communications destined for base station 375 may be received from one or more backhaul connections via backhaul interface module 385.

The processor module 381 can process communications being received and transmitted by the base station 375. The storage module 383 stores data for use by the processor module 381. The storage module 383 (which may also be referred to as memory, memory device, memory module, or similar terms) may also be used to store computer readable instructions for execution by the processor module 381. The computer readable instructions can be used by the base station 375 for accomplishing the various functions of the base station 375. In an embodiment, the storage module 383 or parts of the storage module 383 may be considered a non-transitory machine readable medium. For concise explanation, the base station 375 or embodiments of it are described as having certain functionality. It will be appreciated that in some embodiments, this functionality is accomplished by the processor module 381 in conjunction with the storage module 383, transmitter-receiver module 379, and backhaul interface module 385. Furthermore, in addition to executing instructions, the processor module 381 may include specific purpose hardware to accomplish some functions.

Structures that are the same or similar to the base station of FIG. 3 may be used to implement network nodes generally and functions that are described as being performed by a base station may be performed by other network nodes. In such a network node, the transmitter-receiver module 379 may be a first communication module that provides communications with downlink devices, for example, terminal nodes, and the backhaul interface module 385 may be a second communication module that provides communications with uplink devices, for example, internet servers. The communications with the uplink and downlink devices may be through other network nodes.

Figure 4:
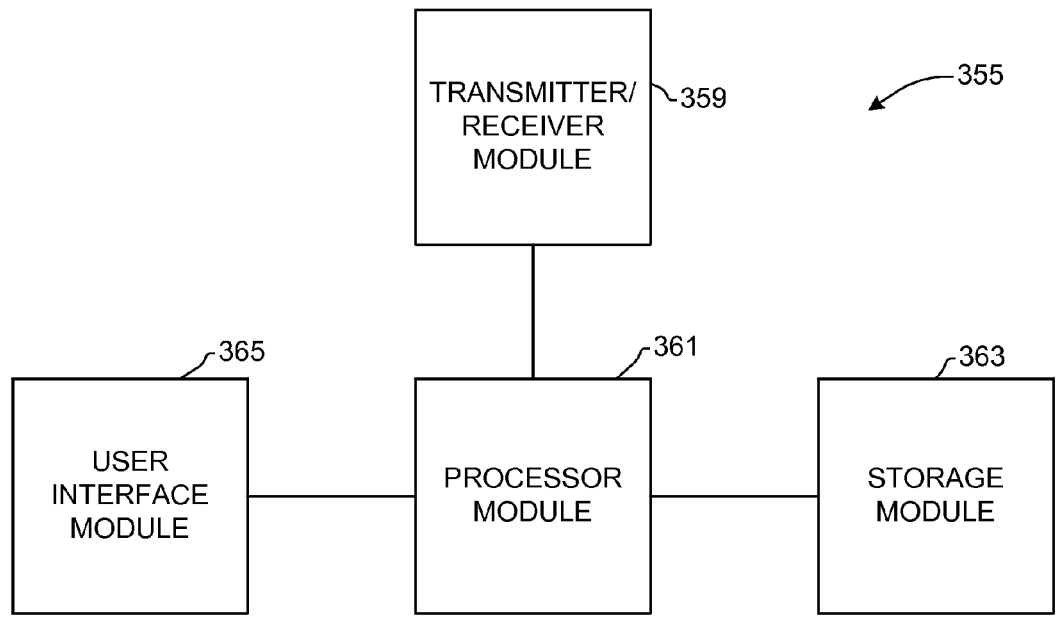
FIG. 4 is a block diagram of a terminal node in accordance with aspects of the invention.

FIG. 4 is a functional block diagram of a terminal node 355 in accordance with aspects of the invention. In various embodiments, the terminal node 355 may be a mobile WiMAX subscriber station, a UMTS cellular phone, an LTE user equipment, or other wireless terminal node of various form factors. The subscriber stations 150 of FIG. 1 or the UEs 151 and 152 of FIG. 2 may be provided, for example, by the terminal node 355 of FIG. 4. The terminal node 355 includes a processor module 361. The processor module 361 is coupled to a transmitter-receiver module (transceiver) 359, a user interface module 365, and a storage module 363.

The transmitter-receiver module 359 is configured to transmit and receive communications with other devices. For example, the transmitter-receiver module 359 may communicate with the base station 375 of FIG. 3 via its transmitter-receiver module 379. The terminal node 355 generally includes one or more antennae for transmission and reception of radio signals. Although the terminal node 355 of FIG. 4 is shown with a single transmitter-receiver module 359, other embodiments of the terminal node 355 may include multiple transmitter-receiver modules. The multiple transmitter-receiver modules may operate according to different protocols.

The terminal node 355, in many embodiments, provides data to and receives data from a person (user). Accordingly, the terminal node 355 includes the user interface module 365. The user interface module 365 includes modules for communicating with a person. The user interface module 365, in an embodiment, includes a speaker and a microphone for voice communications with the user, a screen for providing visual information to the user, and a keypad for accepting alphanumeric commands and data from the user. In some embodiments, a touch screen may be used in place of or in combination with the keypad to allow graphical inputs in addition to alphanumeric inputs. In an alternative embodiment, the user interface module 365 includes a computer interface, for example, a universal serial bus (USB) interface, to interface the terminal node 355 to a computer. For example, the terminal node 355 may be in the form of a dongle that can be connected to a notebook computer via the user interface module 365. The combination of computer and dongle may also be considered a terminal node. The user interface module 365 may have other configurations and include functions such as vibrators, cameras, and lights.

The processor module 361 can process communications being received and transmitted by the terminal node 355. The processor module 361 can also process inputs from and outputs to the user interface module 365. The storage module 363 stores data for use by the processor module 361. The storage module 363 may also be used to store computer readable instructions for execution by the processor module 361. The computer readable instructions can be used by the terminal node 355 for accomplishing the various functions of the terminal node 355. In an embodiment, the storage module 363 or parts of the storage module 363 may be considered a non-transitory machine readable medium. For concise explanation, the terminal node 355 or embodiments of it are described as having certain functionality. It will be appreciated that in some embodiments, this functionality is accomplished by the processor module 361 in conjunction with the storage module 363, the transmitter-receiver module 359, and the user interface module 365. Furthermore, in addition to executing instructions, the processor module 361 may include specific purpose hardware to accomplish some functions.

On-Demand Uncoordinated UL Multipoint Interference Resolution

On-demand uncoordinated UL multipoint interference resolution includes passing information from an assisting base station to a base station requesting additional help in resolving UL interference and decoding a received signal. This turns the UL signal resolution problem into an n source, n sensor problem (or n equations and n unknowns) allowing use of techniques such as joint decoding. Joint decoding is also used in uplink multiple-input multiple-output (UL MIMO) to separate out the UL signals and allow decoding of the data. Unlike UL MIMO, however, the UL transmissions are not coordinated other than the base stations benefit from being time synchronized to the level of tolerance of the orthogonal frequency division multiplexing (OFDM) symbol preamble, which is already necessary for evolved multimedia broadcast multicast services (eMBMS) and coordinated multipoint (CoMP), in LTE systems and is beneficial for handover in most wireless systems. Additionally, the multiple UL signals are received by different base stations rather than by different antenna on a single base station. As such, UL transmit power, modulation, and coding are not coordinated and neither is the choice of interfering UE.

Figure 5:
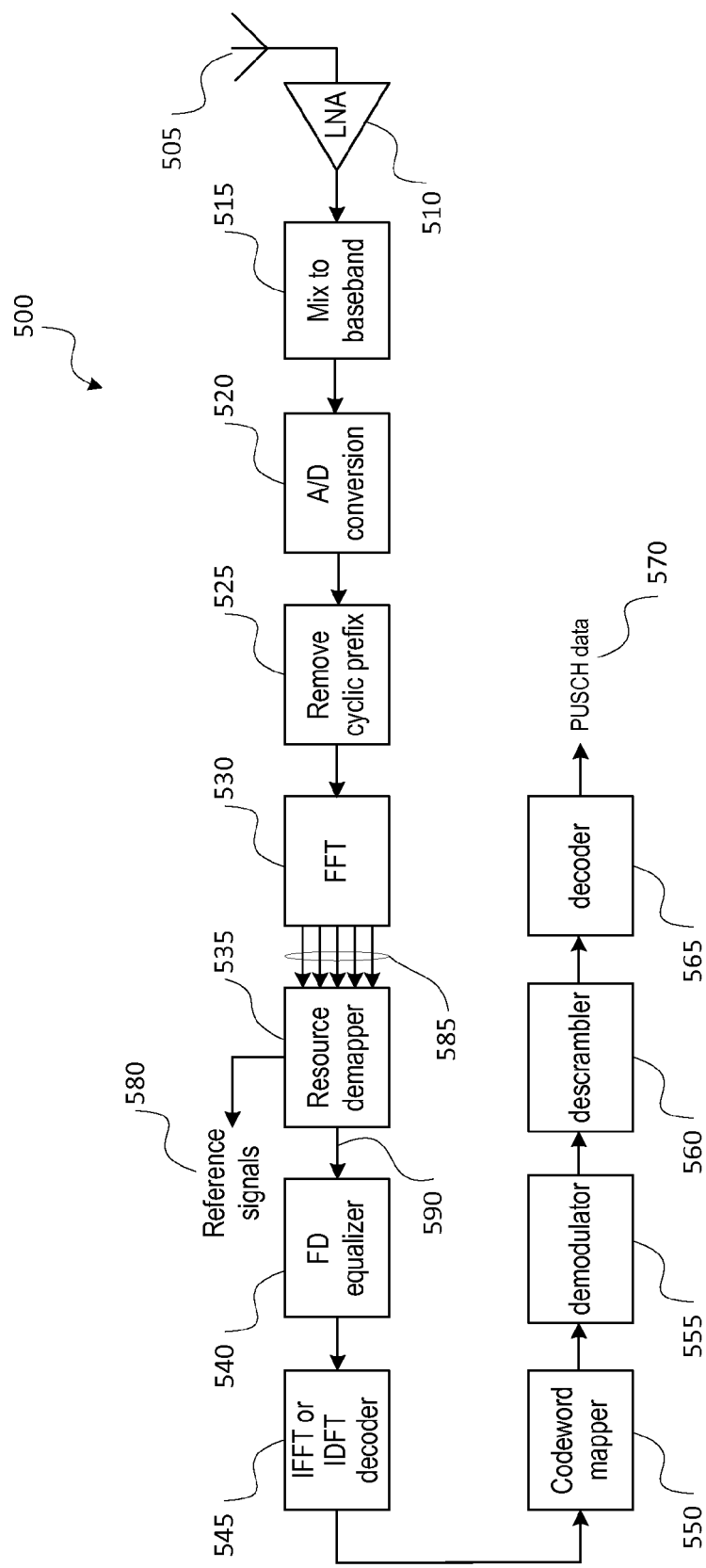
FIG. 5 is a block diagram of a single-carrier frequency division multiple access (SC-FDMA) receiver in accordance with aspects of the invention.

FIG. 5 shows block diagram of an SC-FDMA receiver 500 according to an embodiment. The SC-FDMA receiver 500 may be used, for example, in the macro base station 110, the pico station 130, the enterprise femto base station 140 of FIG. 1, the macro station 111 or femto station 141 of FIG. 2. All or part of the SC-FDMA receiver 500 may be implemented by a receiver portion of the transceiver module 379 of the base station 375 of FIG. 3. Additionally, parts of the SC-FDMA receiver 500 may be implemented by the processor module 381 of the base station 375 of FIG. 3.

The SC-FDMA receiver 500 produces physical uplink shared channel (PUSCH) data 570 from a signal received by an antenna 505. The antenna 505 is coupled to a low-noise amplifier 510. The output of the low-noise amplifier 510 is down converted to a baseband signal in a down-converter module 515. The baseband signal is digitized in an analog-to-digital converter module 520. A cyclic prefix module 525 removes cyclic prefixes from the digitized baseband signal.

The signal is then converted to the frequency domain by FFT module 530 to produce FFT outputs 585. The FFT outputs 585 may also be referred to as received frequency-domain resource element values. From the FFT outputs 585, the resource demapper 535 produces resource demapper output data including reference signal values 580 (e.g., reference signal 1030 for the PUSCH transmission 1010 of FIG. 10) and data elements values 590 (e.g., data element 1020 for the PUSCH transmission 1010 of FIG. 10), from each user equipment's uplink transmission. To aid in the extraction, the information in the subcarriers corresponding to an individual UL transmission's reference signal OFDM symbol is correlated with the expected reference signal to acquire the channel transfer function for the UL transmission.

The data elements 590 are equalized in the frequency-domain equalizer module 540 and then converted to the time domain in IFFT module 545. The time-domain signals are then processed in essentially the inverse of the processing performed by the transmitter by a code word mapper module 550, a demodulator module 555, a descrambler module 560, and a decoder module 565 to produce the received PUSCH data 570.

Figure 6:
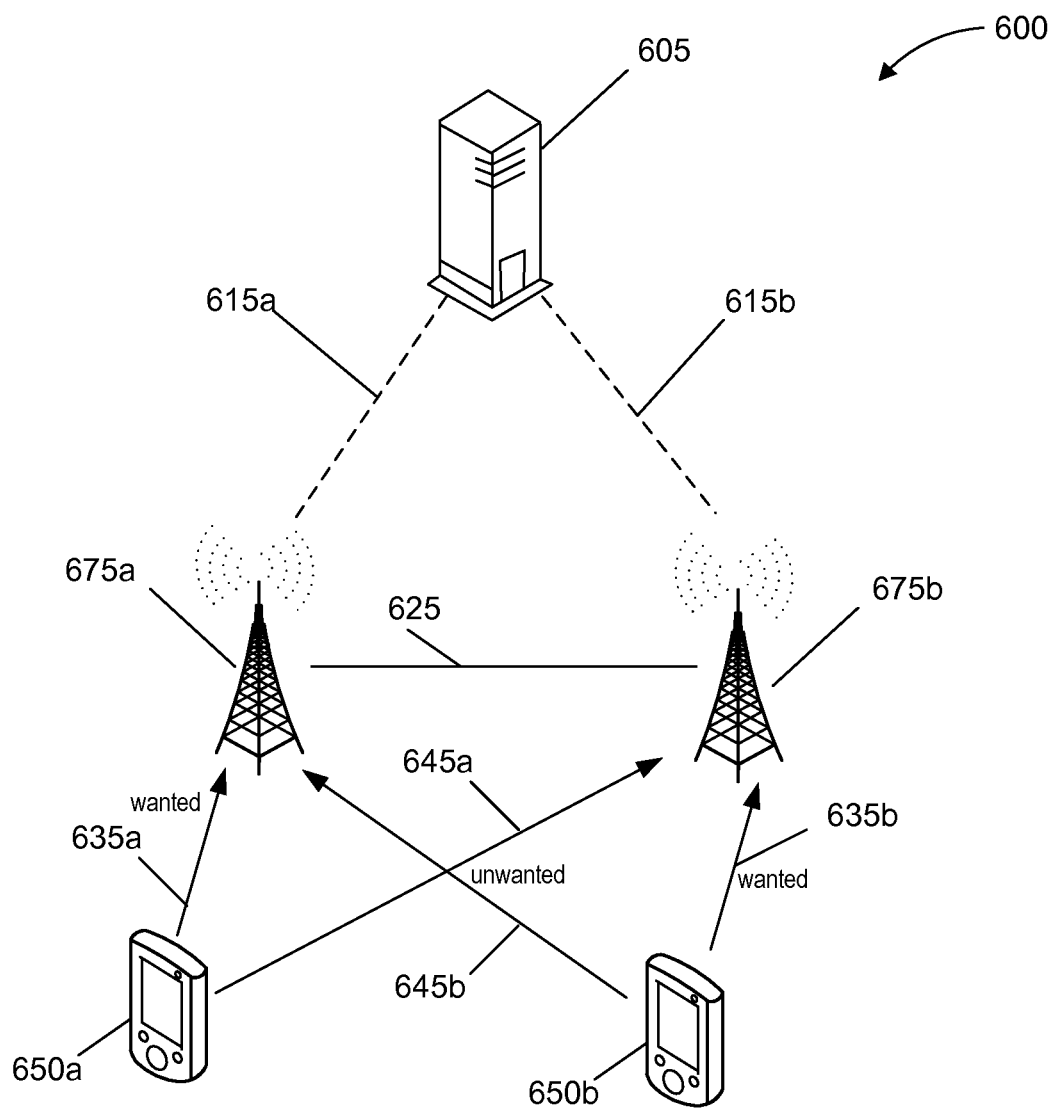
FIG. 6 is a block diagram of a communication system depicting neighboring base stations that communicate with each other to exchange information in accordance with aspects of the invention.

FIG. 6 is a block diagram of a communication system 600 depicting neighboring base stations that communicate with each other to exchange information in accordance with aspects of the invention. The communications between neighboring base stations can be on an on-demand basis and the information can be used to aid in the resolution of interference and the decoding of received signals. This may allow more efficient operational parameters to be used.

The communication system 600 includes a first base station 675a and a neighboring second base station 675b. The first base station 675a and the neighboring second base station 675b may be, for example, the macro base station 110, the pico station 130, or the enterprise femto base station 140 of FIG. 1 or the macro station 111 or femto station 141 of FIG. 2 and may be implemented, for example, using the base station 375 of FIG. 3. The base stations may also be referred to as access nodes and in the context of uplink communications may be referred to as receiver nodes or in the context of downlink communications may be referred to as transmitter nodes.

The communication system 600 includes a first UE 650a and a second UE 650b. The first UE 650a and the second UE 650b may be, for example, the subscriber stations 150 of FIG. 1 or the UEs 151, 152 of FIG. 2 and may be implemented, for example, using the terminal node 355 of FIG. 4. The UEs may also be referred to as terminal nodes and in the context of uplink communications may be referred to as transmitter nodes.

In a given timeslot/subcarrier allocation, such as a physical resource block (PRB) in LTE or a tile in WiMAX, the first UE 650a may transmit to the first base station 675a while the second UE 650b transmits to the neighboring second base station 675b. Thus, the first base station 675a may receive a combination of wanted signal 635a from the first UE 650a and unwanted signal 645b from the second UE 650b. Since the first UE 650a transmits wanted signal 635a to the first base station 675a, the first base station 675a may view the first UE 650a as, for example, a desired UE or intended transmitter node. Similarly, the first base station 675a may view the second UE 650b as, for example, an interfering UE or interfering transmitter node.

The neighboring second base station 675b may receive a combination of wanted signal 635b from the second UE 650b and unwanted signal 645a from the first UE 650a. This may cause the first base station 675a, the neighboring second base station 675b, or both base stations to not be able to decode their respective wanted signal. This may be referred to as decoding ambiguity as each base station may not be able to correctly receive its respective wanted signal. The unwanted signals originate from the UEs as the same signals as the wanted signals but arrive at the respective base stations via different paths.

Unlike UL MIMO, neither base station has both received versions of the signals, that is to say neither base station has received both the signal representing the combination of wanted signal 635a and unwanted signal 645b and the signal representing the combination of wanted signal 635b and unwanted signal 645a. However, if a base station, for example, the first base station 675a, fails to correctly decode the wanted signal 635a in a particular PRB or tile, there may be enough information in the overall communication system 600 to correct the decoding. The first base station 675a and its neighbors, for example, the neighboring second base station 675b, both have a received signal, even if they are not able to decode that signal.

Both base stations may know information about the PRB in question for their wanted signal, for example, in an OFDM or SC-FDMA system, the output of the FFT, the output of the resource demapper, a channel estimate, expected reference signals or preambles, etc.

A base station may or may not know its neighbors, where a neighbor can be any other base station with sufficient cell coverage overlap to have the potential to cause the base station to fail to decode its UL received signal. When the first base station 675a incorrectly decodes a PRB or tile, if it has sufficient processing resources and knows and is in communication with its neighbors, the first base station 675a may ask its neighbors for the baseband signals (or information associated with the signals) they received for the same PRB or tile. The request may be over a communication path 625 established for base station to base station communication, for example, the X2 interface in an LTE system. The first base station 675a may also ask the neighbor for additional communication operating parameters of the neighbor's wanted signal, such as modulation, coding, and reference signal (RS) parameters. The first base station 675a may then use one of the techniques described below to improve the decoding of its own wanted signal.

First base station 675a may request a central entity 605, such as a network management system (NMS) or gateway in core network 102 of FIG. 1, to request the necessary data and even to perform the requisite processing. The first base station 675a may request assistance from the central entity 605, for example, when the first base station 675a does not know its neighbors, cannot communicate directly with its neighbors, or lacks sufficient processing capability. The central entity 605 communicates with the first base station 675a over communication path 615a, for example, a backhaul link such as backhaul connection 170 of FIG. 1, and with the neighboring second base station 675b over communication path 615b, for example, a second backhaul link. The communication between a base station and a central entity 605 may take many forms.

Whether the central entity 605 assists or not, the additional signal information may be only made available on an as requested basis when initial decoding attempts fail. This on-demand aspect may cause occasional processing delay but can reduce the need to use spectrally inefficient methods to mitigate UL interference.

Methods of Operating a Base Station

Figure 7:
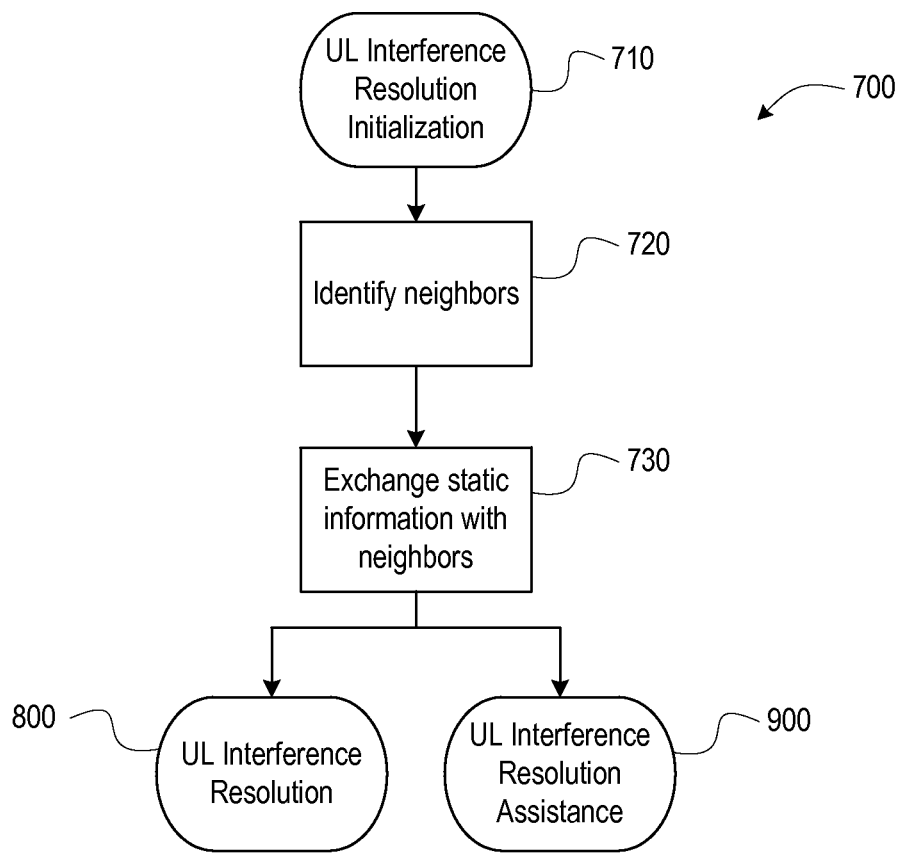
FIG. 7 is a flowchart of a process for initialization of a base station in preparation for performing on-demand uplink multipoint uncoordinated interference resolution in accordance with aspects of the invention.
Figure 8:
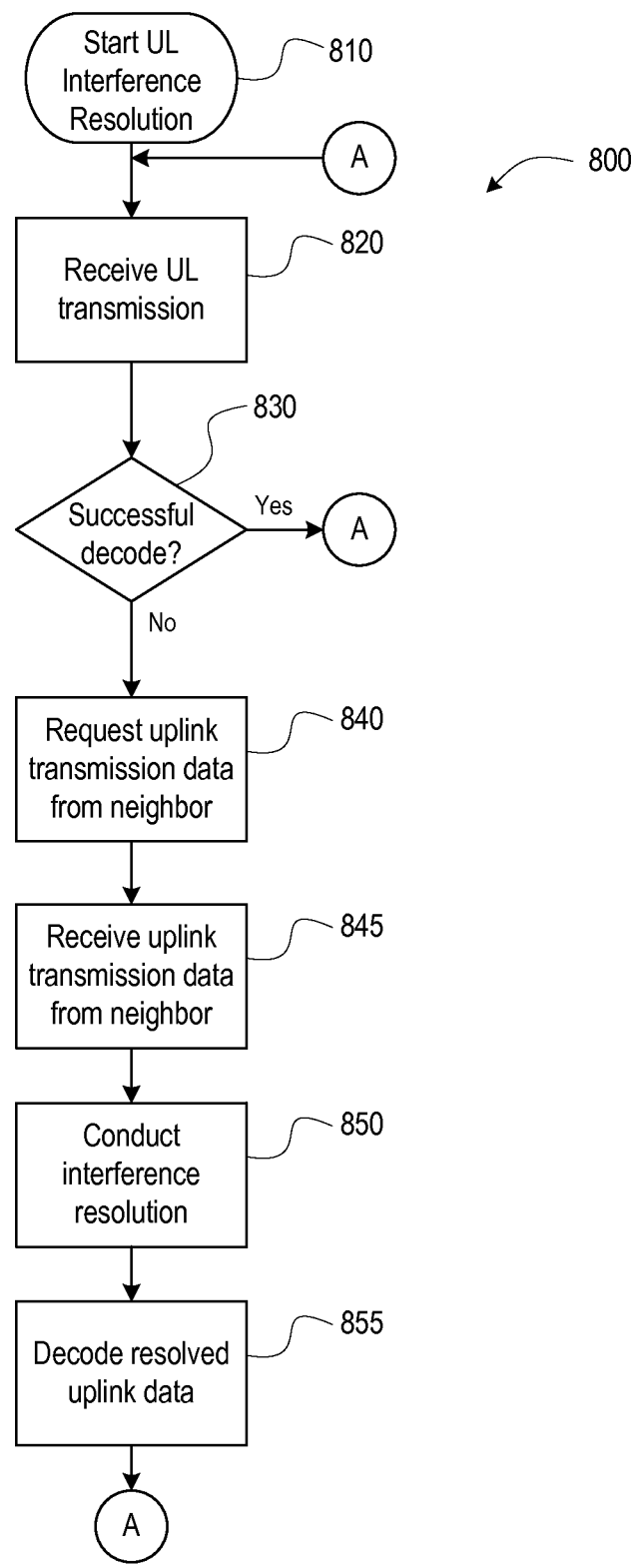
FIG. 8 is a flowchart of a process for on-demand uncoordinated uplink multipoint interference resolution in accordance with aspects of the invention.
Figure 9:
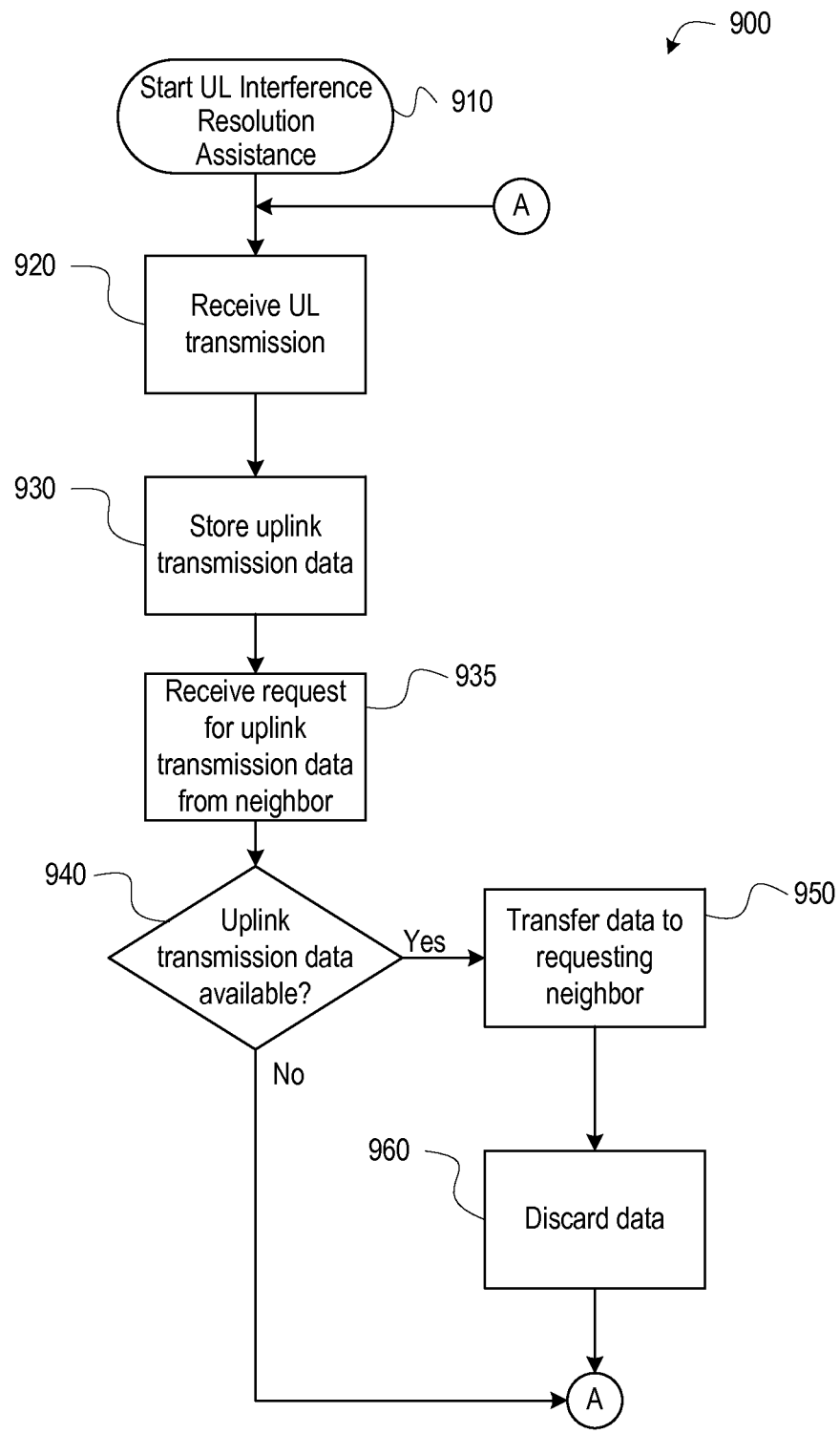
FIG. 9 is a flowchart of a process for on-demand uncoordinated uplink multipoint interference resolution assistance in accordance with aspects of the invention.

FIG. 7 is a flowchart of a method 700 for initialization of a base station in preparation for performing on-demand uncoordinated uplink multipoint interference resolution according to an example embodiment of the present invention. FIG. 8 is a flowchart of a method 800 for on-demand uncoordinated uplink multipoint interference resolution according to an example embodiment of the present invention. FIG. 9 is a flowchart of a method 900 for on-demand uncoordinated uplink multipoint interference resolution assistance according to an example embodiment of the present invention. These methods (or processes) may be performed, for example, using any of the base stations (macro, femto, or pico) depicted in FIG. 1, 2, 3, or 6. The base station performing method 800 may be referred to as an assisted base station, and a base station performing method 900 may be referred to as an assisting base station.

The method 700 to perform initialization starts at step 710. The method may begin, for example, after the base station has powered up. At step 720, the base station identifies its neighbors. This may be accomplished a number of ways. Some protocols allow a base station to sniff the uplink to detect neighbors. Some protocols allow a base station to ask user equipment with which the base station is communicating to detect and report neighbors. Some systems may provide neighbor information through communication with a central entity, such as central entity 605 in FIG. 6, which is cognizant of the network topology.

At step 730, the base station exchanges with its neighbors static information of use in interference resolution. This information may include, for example, hopping sequences or information regarding reference signals. This information could alternatively be requested, on-demand, as part of the information exchanged at the time of interference resolution. This exchange could also be performed periodically or as needed when the parameters change. This information could alternatively be provided by a central entity.

After step 730, the base station operates according to one or both of two methods which may be simultaneous. The base station may proceed to method 800 (FIG. 8) where it performs on-demand uncoordinated UL multipoint interference resolution of its own received signal. Alternatively or simultaneously, the base station may proceed to method 900 (FIG. 9) where it performs on-demand uncoordinated UL multipoint interference resolution assistance to aid neighboring base stations in resolving interference of their received signals. These processes will be described below with respect to FIGS. 8 and 9.

The method 800 for performing on-demand uncoordinated UL multipoint interference resolution of FIG. 8 begins at step 810. The base station performing on-demand uncoordinated UL multipoint interference resolution may transition to step 810 from the initialization process shown in FIG. 7. At step 820, the base station receives an uplink transmission. The uplink transmission may include a transmission that the base station is scheduled to receive from a user equipment (e.g., wanted signal 635a) and a transmission from another user equipment (e.g., unwanted signal 645b). The base station derives local uplink transmission data from the received uplink transmission, for example, by processing as described for the SC-FDMA receiver 500. The base station attempts to decode the uplink transmission data. The base station can also monitor for an error indication to determine if the attempted decode is, or may be, successful. At step 830, the base station determines whether decoding is, or may be, successful, for example, based on error vector magnitude (EVM), bit error rate (BER) estimate calculation, successful decoding of forward error correction (FEC) coding, or successful checking of checksums or cyclic redundancy checks (CRC). At step 830, if the decoding was successful, the process returns to step 820; otherwise, the process proceeds to step 840.

At step 840, the base station sends a request to one or more neighboring base stations for uplink transmission data. The requested uplink transmission data may be, for example, the output of a resource demapper for the resources in question and the expected reference signals. At step 845, the base station receives the uplink transmission data from the one or more neighboring base stations. The uplink transmission data may be requested and received through a central entity.

At step 850, the base station conducts interference resolution based on its local uplink transmission data (e.g., the received signal and information the base station knows about the received signal such as an expected reference signal) and the uplink transmission data received from one or more neighboring base stations. In step 855, the base station decodes the interference resolved uplink transmission data to decode the received UL signal and produce decode uplink data. In method 800, whether the decoding attempt is successful or not, the process returns to step 820.

Information from both the base station attempting interference resolution and the base station assisting interference resolution may be passed to a central entity which may also perform all or part of the interference resolution and decoding calculations.

The method 900 for on-demand uncoordinated UL multipoint interference resolution assistance begins at step 910. The base station may transition to step 910 from the initialization process shown in FIG. 7. At step 920, the base station receives an uplink transmission. The uplink transmission may include a transmission from a user equipment that the base station is schedule to receive (e.g., wanted signal 635b) and a transmission from another user equipment (e.g., unwanted signal 645a). The base station derives local uplink transmission data from the received uplink transmission, for example, by processing as described for the SC-FDMA receiver 500.

If the base station performing on-demand uncoordinated UL multipoint interference resolution assistance as described in the flowchart of FIG. 9 is also performing on-demand uncoordinated UL multipoint interference resolution as described in the flowchart of FIG. 8, step 920 and step 820 may be combined. However, to be of additional assistance, at step 920, the base station may activate its receiver to receive an uplink signal on uplink resources even if there is no transmission from a user device expected (e.g., based on the transmission being scheduled by the base station) to use those resources and for which the receiver would not need to be activated for step 820.

The base station may utilize an assistance mode indication to determine that it should activate its receiver to receive an uplink signal on uplink resources even if there is no expected (e.g., a transmission is not scheduled by the base station) transmission from a user device on those resources. An assistance mode indication may be received, for example, in the form of an assistance request from a neighboring base station. An assistance mode indication may also be received from a network device in the network, such as central entity 605 of FIG. 6 which may be implementing a network management system. An assistance mode indication may be pre-provisioned in the base station and set to a permanent status, or may be time-scheduled or triggered based on network conditions, such as network congestion, noise levels, or other criteria.

After reception of an uplink signal in step 920, the process moves to step 930 where uplink transmission data is stored in a memory device, for example, in storage module 383 of FIG. 3. The stored uplink transmission data may be in any of the various forms of uplink transmission data, such as, for example, resource demapper outputs 580 and 590 of FIG. 5. At step 935, the base station receives a request for uplink transmission data from a neighboring base station. The request could be from a central entity, such as central entity 605 of FIG. 6 rather than directly from the neighboring base station.

At step 940, the base station determines if the requested uplink transmission data is available. The uplink transmission data may not be available, for example, if the base station had not stored the requested uplink transmission data (e.g., if the base station did not have an UL transmission scheduled on the relevant resources). The uplink transmission data may not be available if the request is received after a timeout period has expired and the uplink transmission data was deleted from storage. Data may also be deleted from storage to free storage space for other uses. If the requested uplink transmission data is available, the process moves to step 950; otherwise, the process returns to step 920.

In step 950, the base station transfers the requested uplink transmission data to the requesting neighbor base station. The uplink transmission data may be transferred via a central entity. At step 960, the base station may discard the transferred uplink transmission data to free storage space. Uplink transmission data may also be discarded for other reasons.

The methods described herein may be applied to any neighboring co-channel cells (e.g., coverage areas as described above) whether implemented as neighboring base stations or as neighboring cells within the same base station, for example, a sectorized base station with multiple co-channel sectors or cells. In this latter case, the information exchange is within the sectorized base station, for example, between the hardware, software, or other logic controlling the receivers corresponding to the separate sectors.

LTE Background

The LTE SC-FDMA uplink, which is OFDM with an additional FFT precoder, is divided in time into 0.5 ms slots. In time, a slot is composed of 7 OFDM symbols using the normal cyclic prefix or 6 OFDM symbols using the extended cyclic prefix. In frequency, a slot is composed of some number of 15 kilohertz (kHz) subcarriers. For example, a 5 MHz wide channel is composed of 300 subcarriers taking 4.5 MHz of the channel bandwidth and a 10 MHz channel is composed of 600 subcarriers taking 9 MHz of the channel bandwidth, leaving a guard band between channels. A subcarrier at a specific frequency of an OFDM symbol is referred to as a resource element. Physical resource blocks (PRBs) are defined as 12 contiguous subcarriers (also referred to as frequency subchannels or subchannels) across all 6 or 7 OFDM symbols of a slot. A PRB is the smallest unit of uplink bandwidth allocation given to a UE. Physical resource blocks may also be referred to as resource blocks.

FIGS. 10, 11, 12, 13, 14, 15, and 16 are diagrams of uplink transmissions for LTE with a normal cyclic prefix (i.e., 7 OFDM symbols per 0.5 ms slot). These diagrams provide specific examples to aid in understanding the systems and methods disclosed herein. However, the disclosed systems and methods can be applied in many other scenarios including the extended cyclic prefix case and non-LTE OFDM or SC-FDMA based technology. FIGS. 11, 12, 13, 14, 15, and 16 show multiple slots. The slots are associated with different UEs in different cells. However, the cells are sufficiently synchronized that the slots can be considered simultaneous and transmissions in the slots in corresponding symbols and subchannels will be received at base stations as superimposed. The collection of subcarriers in multiple OFDM symbols is illustrated in grids that may be referred to as time/frequency (T/F) resource grids. The illustrated uplink transmissions may include other elements, for example, physical uplink control channel (PUCCH) and physical random access channel (PRACH) transmissions.

Figure 10:
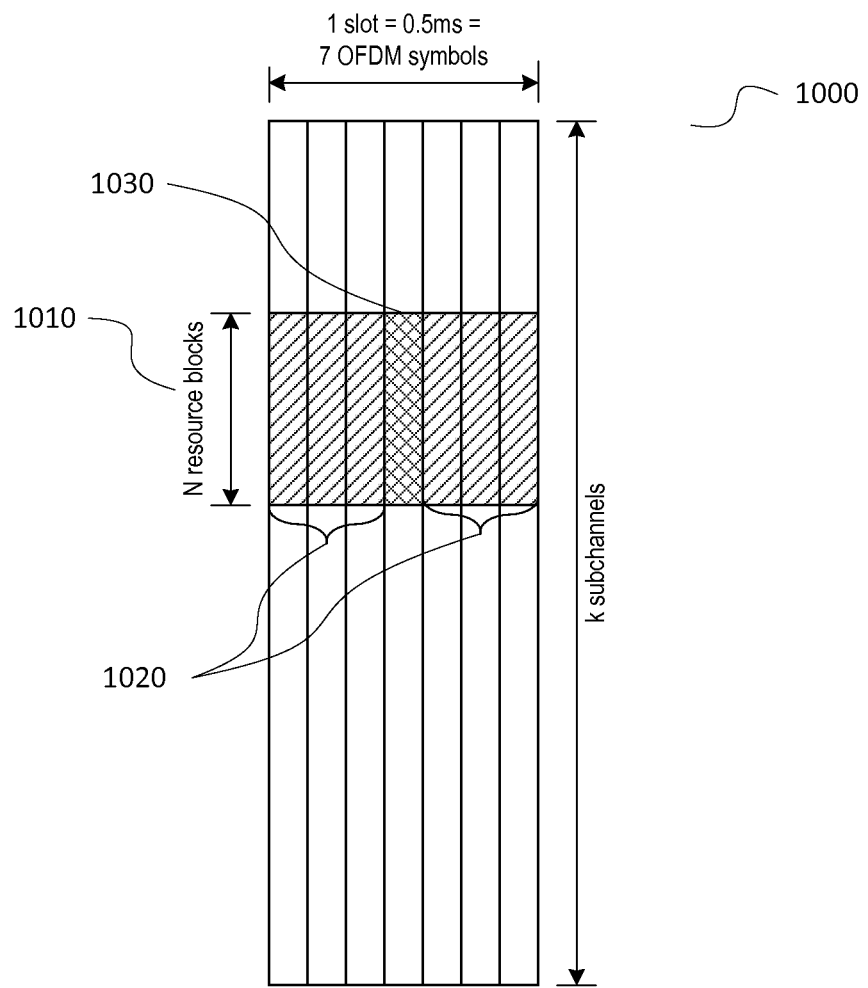
FIG. 10 is a diagram of an uplink transmission in subcarriers of a slot in accordance with aspects of the invention.

FIG. 10 is a diagram of an uplink transmission in subcarriers of a slot according to an example embodiment of the present invention. A physical uplink shared channel (PUSCH) transmission 1010 in a slot 1000 by a first UE to a first eNodeB is shown. The PUSCH transmission 1010 spans N PRBs (12×N subcarriers in frequency and the entire slot duration in time). In LTE, the N resource blocks are allocated to be contiguous in frequency. The PUSCH transmission 1010 includes a data element 1020 in the first three and last three OFDM symbols. The PUSCH transmission 1010 includes a reference signal 1030 in the middle OFDM symbol of the slot 1000. In LTE, reference signals (RSs) may be based on QPSK signals or may be derived from special sequences named Zadoff-Chu sequences. The reference signal 1030 may be a demodulation reference signal (DMRS). Additionally, the last OFDM symbol of a sub-frame (the last OFDM symbol of the second slot of a sub-frame) may also carry a sounding reference signal (SRS). An SRS may function for channel-state estimation to support uplink scheduling and link adaptation.

Figure 11:
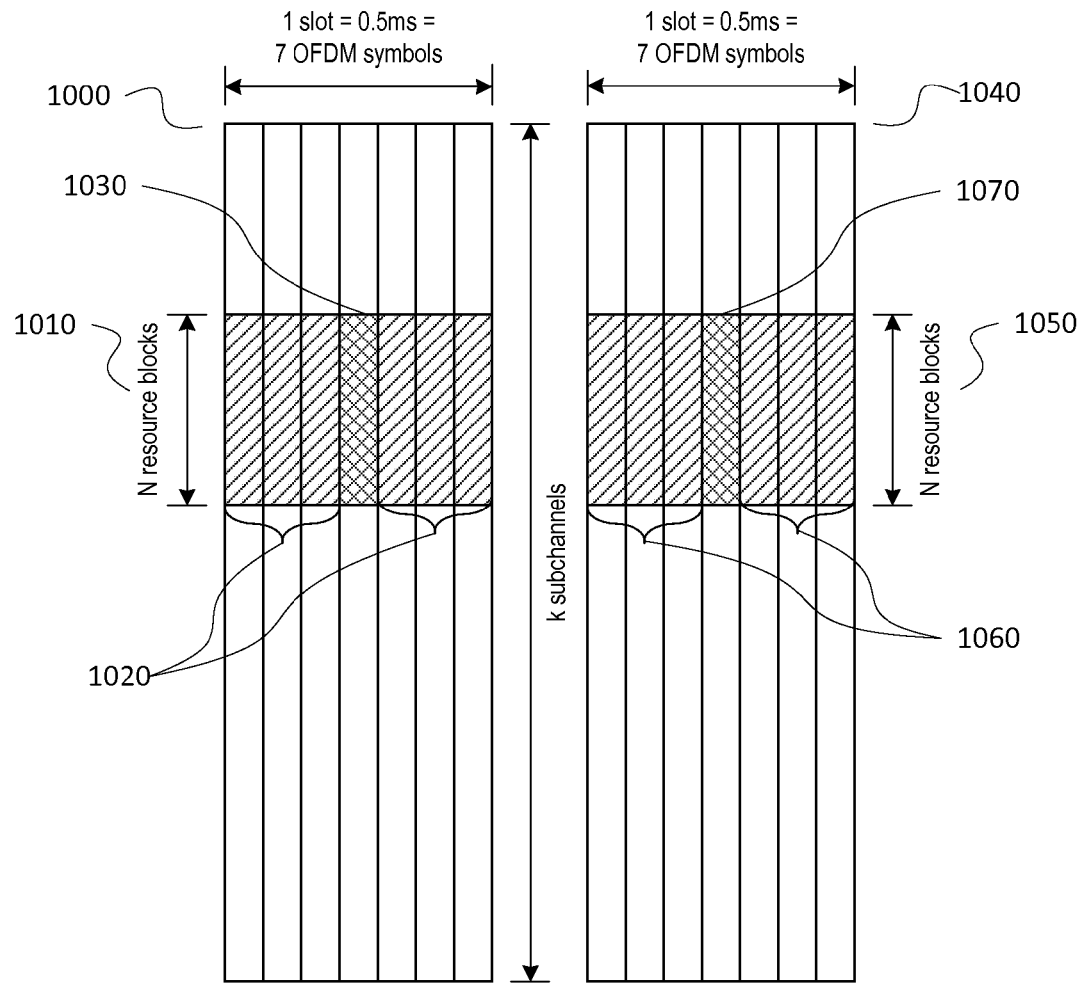
FIG. 11 is a diagram of an uplink transmission in subcarriers of a slot from one user equipment to one LTE eNodeB and an interfering LTE uplink transmission from a second user equipment to a second LTE eNodeB in accordance with aspects of the invention.

FIG. 11 is a diagram of an uplink transmission in subcarriers of a slot from one user equipment to one LTE eNodeB and an interfering LTE uplink transmission from a second user equipment to a second LTE eNodeB according to an example embodiment of the present invention. FIG. 11 shows the same PUSCH transmission 1010 by the first UE in slot 1000 to the first eNodeB as shown in FIG. 10. FIG. 11 also shows a co-channel PUSCH transmission 1050 in slot 1040 by a second UE to a second eNodeB. Slot 1040 is coincidental in time with slot 1000. PUSCH transmission 1050 is similar to PUSCH transmission 1010 and includes data element 1060 and reference signal 1070. PUSCH transmission 1050 uses the same number of resource blocks, N, on the same subcarriers as PUSCH transmission 1010. Since PUSCH transmission 1010 and PUSCH transmission 1050 use the same set of frequency subchannels, there is interference. However, the reference signal 1070 will have been derived from a different Zadoff-Chu sequence or may be some other reference signal (e.g., a QPSK reference sequence such as described in the LTE standard) than reference signal 1030 and data element 1060 and data element 1020 likely may contain different data. Also, the transmissions may use different modulation and coding. The uplink transmissions of FIG. 11 are uniform in allocation since the PUSCH transmissions are aligned in time and frequency.

Figure 12:
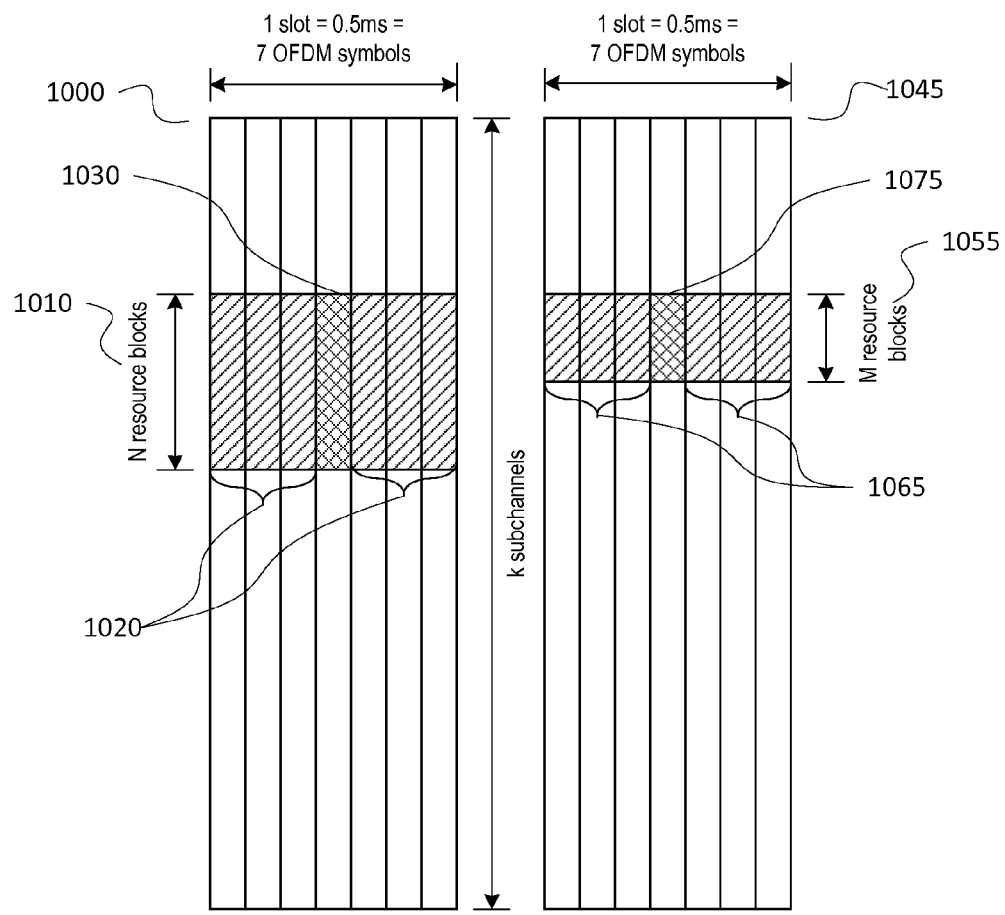
FIG. 12 is a diagram of an LTE uplink transmission in subcarriers of a slot from one user equipment to one LTE eNodeB and an interfering LTE uplink transmission from a second user equipment to a second LTE eNodeB in accordance with aspects of the invention.

FIG. 12 is a diagram of an LTE uplink transmission in subcarriers of a slot from one user equipment to one LTE eNodeB and an interfering LTE uplink transmission from a second user equipment to a second LTE eNodeB according to an example embodiment of the present invention. FIG. 12 shows the same PUSCH transmission 1010 by the first UE in slot 1000 to the first eNodeB as shown in FIG. 10. FIG. 12 also shows a co-channel PUSCH transmission 1055 in slot 1045 from a second UE to a second eNodeB. Slot 1045 is coincidental in time with slot 1000. PUSCH transmission 1055 is similar to PUSCH transmission 1010 and includes data element 1065 and reference signal 1075. The number of resource blocks, M (12×M subcarriers), in PUSCH transmission 1055 is fewer than in PUSCH transmission 1010 but the resource blocks in PUSCH transmission 1055 overlap with the resource blocks in PUSCH transmission 1010, causing interference. In addition to PUSCH transmission 1055 and PUSCH transmission 1010 being different lengths, reference signal 1075 will have been derived from a different Zadoff-Chu sequence or may be some other reference signal (e.g., a QPSK reference sequence such as described in the LTE standard) than reference signal 1030 and data element 1065 and data element 1020 likely may contain different data. Also, the transmissions may use different modulation and coding. In addition, depending on the choice of N and M, one or both of reference signals 1030 and 1075 may be QPSK reference signals. Since N and M are different, the derivation of reference signals 1030 and 1075 may be different.

Figure 13:
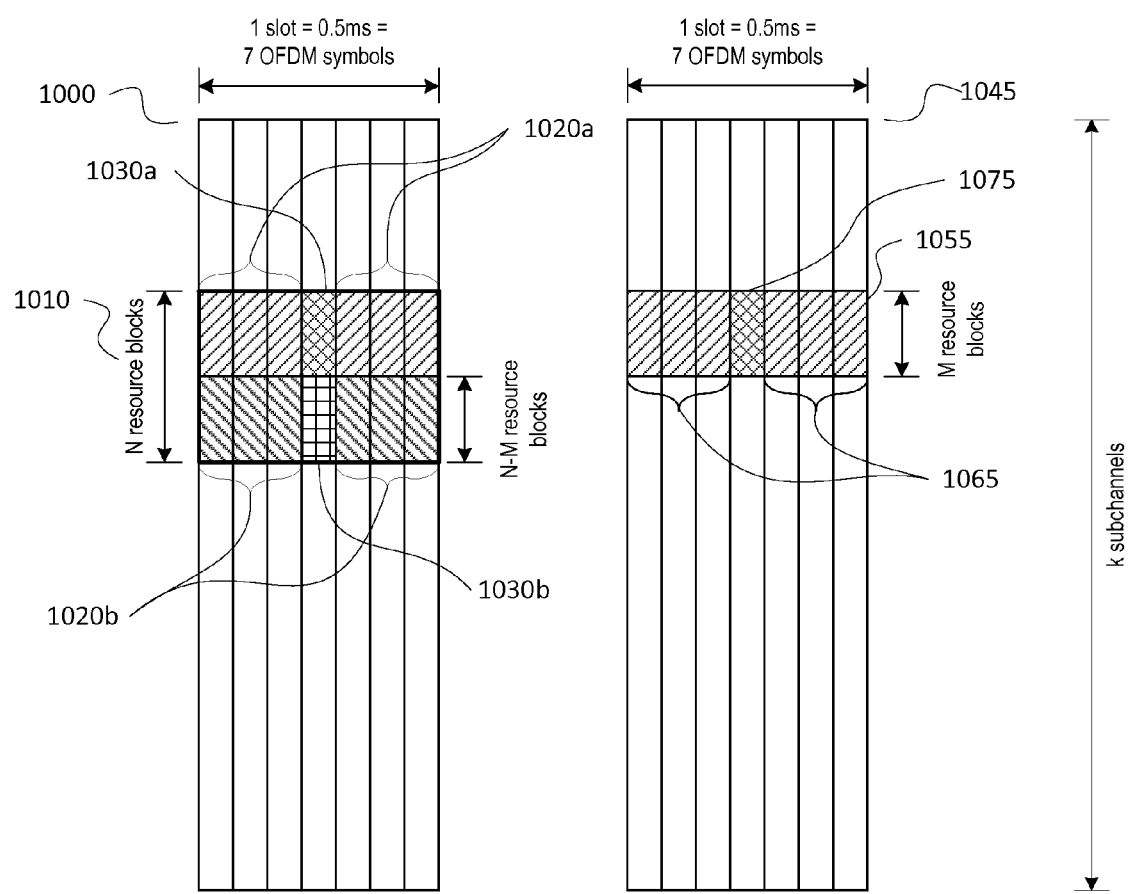
FIG. 13 is a diagram of an LTE uplink transmission in subcarriers of a slot from one user equipment to one LTE eNodeB and an interfering LTE uplink transmission in the same slot from a second user equipment to a second LTE eNodeB in accordance with aspects of the invention.

FIG. 13 is a diagram of an LTE uplink transmission in subcarriers of a slot from one user equipment to one LTE eNodeB and an interfering LTE uplink transmission in the same slot from a second user equipment to a second LTE eNodeB according to an example embodiment of the present invention. FIG. 13 shows the same PUSCH transmissions as shown in FIG. 12. In FIG. 13 the labeling of data element and reference signal portions of PUSCH transmission 1010 are made in a more detailed manner than in FIG. 12.

The first M resource blocks of the PUSCH transmission 1010 and the M resource blocks of PUSCH transmission 1055 overlap both in time and frequency. The portion of data element 1020 that overlaps with data element 1065 of PUSCH transmission 1055 is referred to as "First Interfered Data Portion" 1020*a*. The portion of the reference signal 1030 that overlaps with reference signal 1075 of PUSCH transmission 1055 is referred to as "First Interfered RS Portion" 1030*a*. The portion of data element 1020 that does not overlap with data element 1065 of PUSCH transmission 1055, comprising N-M resource blocks, is referred to as "Second Interfered Data Portion" 1020*b*. The portion of reference signal 1030 that does not overlap with reference signal 1075 of PUSCH transmission 1055 is referred to as "Second Interfered RS Portion" 1030*b*. Data element 1065 may also be referred to as "First Interfering Data Portion," and reference signal 1075 may also be referred to as "First Interfering RS Portion."

Figure 14:
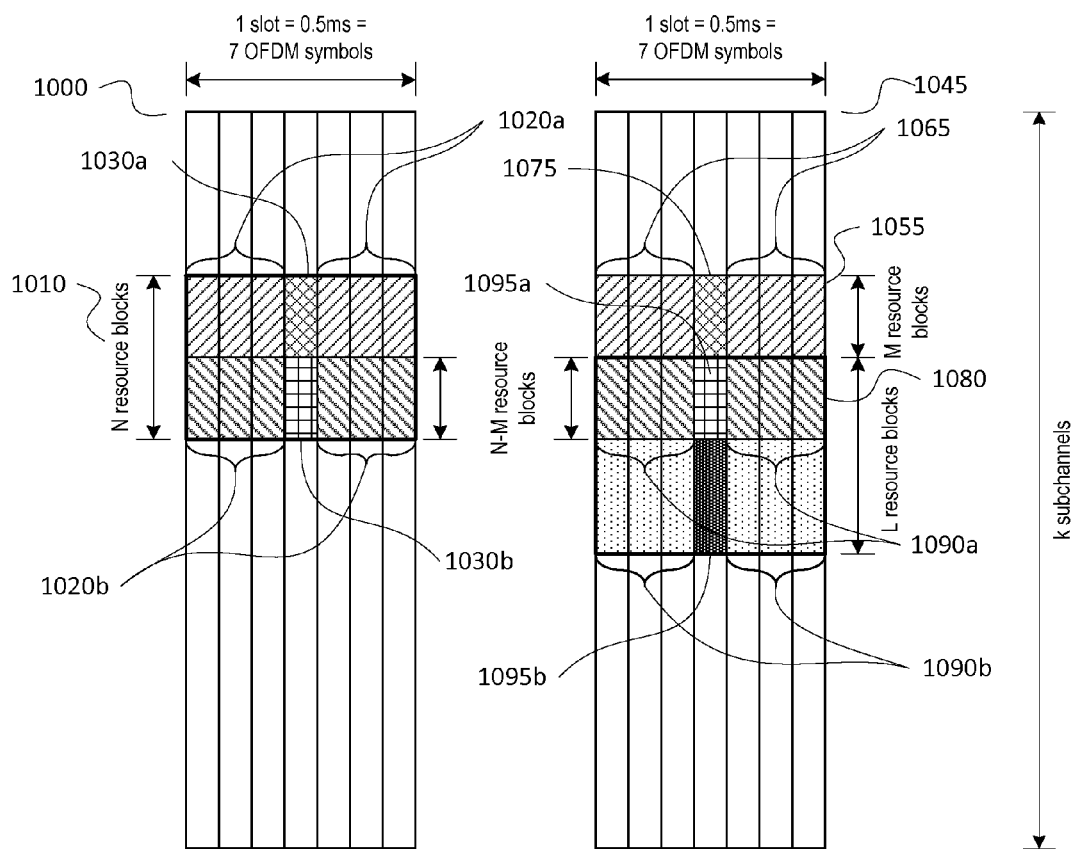
FIG. 14 is a diagram of an LTE uplink transmission in subcarriers of a slot from one user equipment to one LTE eNodeB and an interfering LTE uplink transmissions in the same slot from each of a second user equipment and a third user equipment to a second LTE eNodeB in accordance with aspects of the invention.

FIG. 14 is a diagram of an LTE uplink transmission in subcarriers of a slot from one user equipment to one LTE eNodeB and an interfering LTE uplink transmissions in the same slot from each of a second user equipment and a third user equipment to a second LTE eNodeB according to an example embodiment of the present invention. The uplink transmissions shown in FIG. 14 are similar to those shown in FIG. 13. FIG. 14 includes an additional co-channel PUSCH transmission 1080 in slot 1045 by a third UE to the second eNodeB. PUSCH transmission 1080 has a similar structure to the other PUSCH transmissions and includes data element 1090 and reference signal 1095. However, the number of resource blocks, L (12×L subcarriers across all OFDM symbols of a slot), in PUSCH transmission 1080 is greater than the N-M resource blocks in Second Interfered Data Portion 1020*b* of PUSCH transmission 1010. Portions of PUSCH transmission 1080 overlap with Second Interfered Data Portion 1020*b* of PUSCH transmission 1010 causing interference. The reference signal 1095 may have been derived from a different Zadoff-Chu sequence or may be a QPSK reference sequence than reference signal 1030, the data element 1090 may contain different data than data element 1020, and different modulation and coding may be used.

PUSCH transmission 1055 overlaps both in time and frequency with the first M resource blocks of PUSCH transmission 1010. The next N-M resource blocks of PUSCH transmission 1010 overlap in both time and frequency with the first N-M resource blocks of PUSCH transmission 1080. The portion of the data element 1090 that overlaps with Second Interfered Data Portion 1020*b* of PUSCH transmission 1010 is referred to as "Second Interfering Data Portion" 1090*a*. The portion of reference signal 1095 that overlaps with Second Interfered RS Portion 1030*b* is referred to as "Second Interfering RS Portion" 1095*a*. The portion of the data element 1090 that does not overlap with Second Interfered Data Portion 1020*b* of PUSCH transmission 1010 is referred to as "Third Interfering Data Portion" 1090*b*. The portion of reference signal 1095 that does not overlap with Second Interfered RS Portion 1030*b* is referred to as "Third Interfering RS Portion" 1095*b*.

Figure 15:
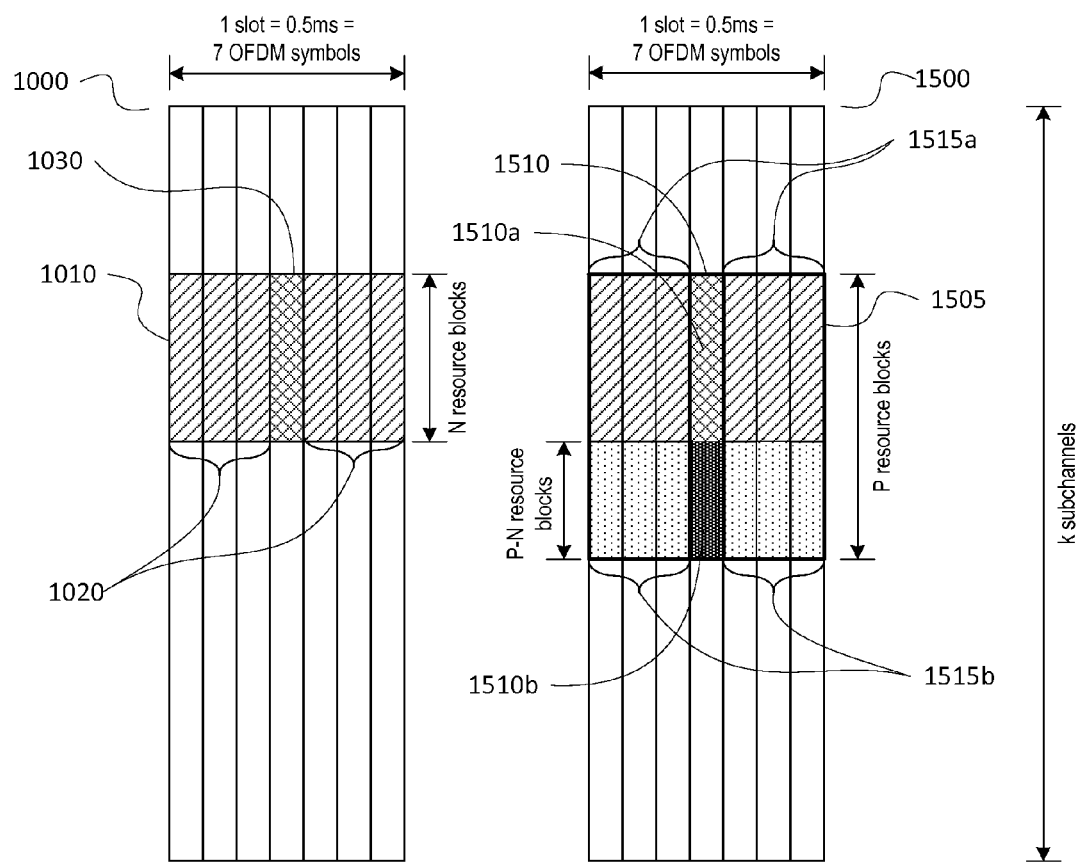
FIG. 15 is a diagram of an LTE uplink transmission in subcarriers of a slot from one user equipment to one LTE eNodeB and an interfering LTE uplink transmission in the same slot from a second user equipment to a second LTE eNodeB in accordance with aspects of the invention.

FIG. 15 is a diagram of an LTE uplink transmission in subcarriers of a slot from one user equipment to one LTE eNodeB and an interfering LTE uplink transmission in the same slot from a second user equipment to a second LTE eNodeB according to an example embodiment of the present invention. FIG. 15 shows the same PUSCH transmission 1010 in slot 1000 by a first UE to a first eNodeB as shown in FIGS. 10, 11, 12, 13, and 14. FIG. 15 also shows a co-channel PUSCH transmission 1505 in slot 1500 by a second UE to a second eNodeB. Slot 1000 and slot 1500 are coincidental in time, making PUSCH transmission 1010 and PUSCH transmission 1505 coincidental in time. PUSCH transmission 1505 has a similar structure as PUSCH transmission 1010 and includes a data element 1515 and a reference signal 1510. However, the number of resource blocks in PUSCH transmission 1505, P (12×P subcarriers across all OFDM symbols in a slot), is larger than the number of resource blocks, N (12×N subcarriers across all OFDM symbols in a slot) in PUSCH transmission 1010 and overlap, causing interference.

In addition to PUSCH transmission 1505 and PUSCH transmission 1010 being different lengths, the reference signal 1510 may have been derived from a different Zadoff-Chu sequence or may be a different QPSK reference sequence than was used for reference signal 1030, the data element 1515 may contain different data than data element 1020, and different modulation and coding may be used. In addition, depending on the choice of N and P, one or both of reference signal 1030 and reference signal 1510 may be QPSK reference signals. Since N and P are different, the derivation of reference signals 1030 and 1510 may be different.

In FIG. 15, the labeling of data element and reference signal portions of PUSCH transmission 1505 are made in a detailed manner. The portion of data element 1515 that overlaps with data element 1020 of PUSCH transmission 1010 is referred to as "Fourth Interfering Data Portion" 1515a. The portion of reference signal 1510 that overlaps with reference signal 1030 is referred to as "Fourth Interfering RS Portion" 1510a. The portion of the data element 1515 that does not overlap with data element 1020 of PUSCH transmission 1010 is referred to as "Fifth Interfering Data Portion" 915b. The portion of reference signal 1510 that does not overlap with reference signal 1030 is referred to as "Fifth Interfering RS Portion" 1510b.

Figure 16:
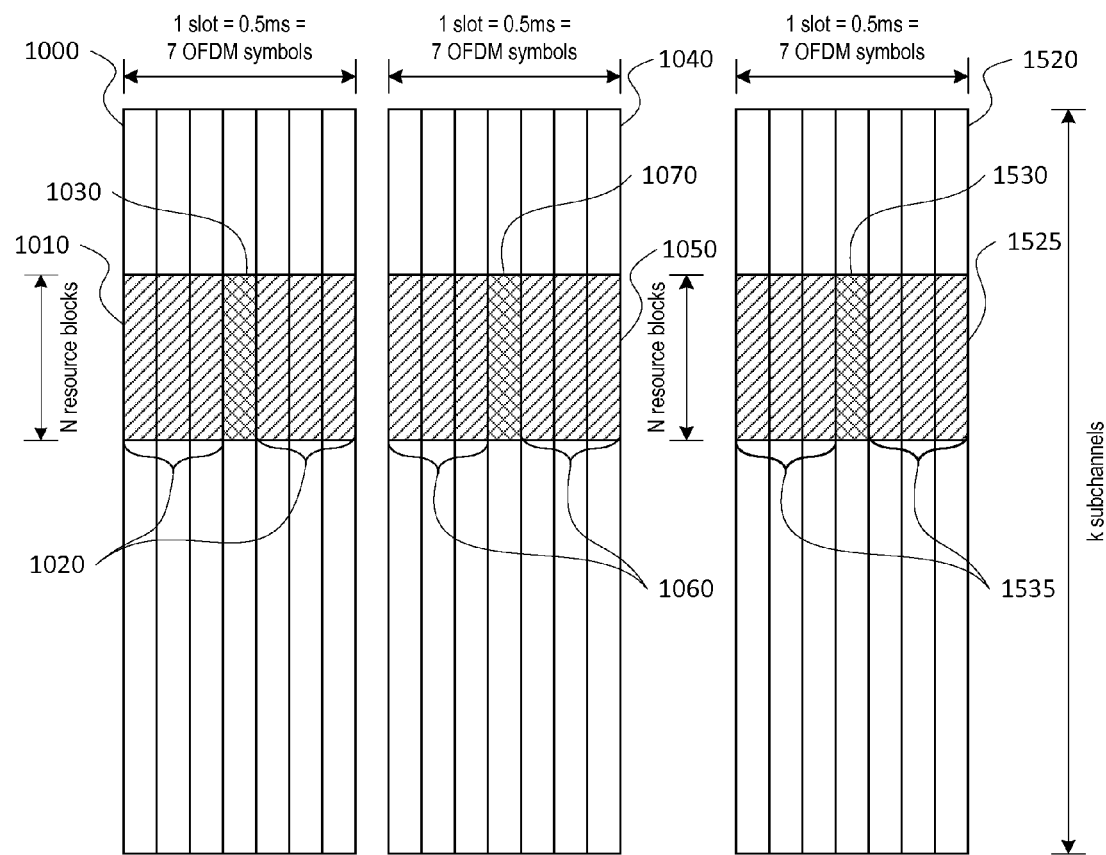
FIG. 16 is a diagram of an LTE uplink transmission in subcarriers of a slot from one user equipment to one LTE eNodeB, an interfering LTE uplink transmission from a second user equipment to a second LTE eNodeB, and an interfering LTE uplink transmission from a third user equipment to a third LTE eNodeB in accordance with aspects of the invention.

FIG. 16 is a diagram of an LTE uplink transmission in subcarriers of a slot from one user equipment to one LTE eNodeB, an interfering LTE uplink transmission from a second user equipment to a second LTE eNodeB, and an interfering LTE uplink transmission from a third user equipment to a third LTE eNodeB according to an example embodiment of the present invention. The transmissions shown in FIG. 16 are similar to those shown in FIG. 11, including PUSCH transmission 1010 in slot 1000 by a first UE to a first eNodeB and co-channel PUSCH transmission 1050 in slot 1040 by a second UE to a second eNodeB. FIG. 16 also shows a co-channel PUSCH transmission 1525 in slot 1520 from a third UE to a third eNodeB. Slot 1520 is coincidental in time with slot 1000 and slot 1040. PUSCH transmission 1525 has a similar structure as PUSCH transmission 1010 and PUSCH transmission 1050 and includes data element 1535 and reference signal 1530. PUSCH transmission 1525 uses the same number of resource blocks, N, on the same subcarriers as PUSCH transmission 1010, causing interference. However, the reference signal 1530 will have been derived from a different Zadoff-Chu sequence or may be some other reference signal (e.g., a QPSK reference sequence such as described in the LTE standard) than reference signal 1030 and data element 1535 and data element 1020 likely may contain different data. Also, the transmissions may use different modulation and coding.

FIGS. 10-16 illustrate contiguous allocations where all transmitted subcarriers are in a single cluster (at consecutive subcarriers). This mode of transmission is referred to as single-cluster transmission. Single-cluster transmission is a part of Release 8 of the LTE standards. It is possible to have a multi-cluster transmissions where there is more than one contiguous zone of subcarriers used for transmission. This mode of transmission is referred to as multi-cluster transmission. Multi-cluster mode transmission is a part of Release 10 of the LTE standards. Additionally, a PUSCH transmission may carry one or more layers in a MIMO system. Each layer to be transmitted is processed and mapped to the T/F resource grid and may have an associated RS.

Processes for Interference Resolution

Processes for interference resolution will be described with reference to the communication system of FIG. 6, the SC-FDMA receiver of FIG. 5, and the transmission diagrams of FIGS. 11, 12, 13, 14, 15, and 16. These descriptions provide specific examples to aid understanding, but the processes can be broadly applied.

In a first process for interference resolution, the assisted access node and assisting access node receive transmissions from a first UE and a second UE that use a same set of frequency subchannels in a same slot.

The received uplink transmission can be analyzed to estimate a channel that includes the radio channel and portions of the UE transmitter and base station receiver. The channel can be analyzed, for example, at the received frequency-domain resource element values (FFT output 585) in the SC-FDMA receiver 500 of FIG. 5. Alternatively or additionally, the channel can be analyzed, for example, at the demapper outputs 580 and 590 of FIG. 5.

In a single input single output (SISO) model of the channel between a transmitter and a receiver, the channel transfer functions per resource element (one subcarrier of one OFDM symbol) are multiplicative scalars. At the first base station 675a receiving wanted signal 635a from the first UE 650a and unwanted signal 645b from the second UE 650b, the channel output at OFDM symbol index i and subcarrier index j is given as, $$y_{i,j}=h_{i,j}^{d}x_{i,j}^{d}+h_{i,j}^{u}x_{i,j}^{u}+n_{i,j} \qquad (1)$$

Where $y_{i,j}$ is the 1×1 (scalar) channel output (e.g., data elements 590); $x_{i,j}^{d}$ is the 1×1 frequency domain resource element value from wanted signal 635a from the desired first UE 650a; $h_{i,j}^{d}$ is the 1×1 channel transfer function between the desired first UE 650a and the receiver of the first base station 675a; $x_{i,j}^{u}$ is the 1×1 frequency domain resource element value from interfering second UE 650b; $h_{i,j}^{u}$ is the 1×1 channel transfer function between the interfering second UE 650b and the receiver of the first base station 675a; and $n_{i,j}$ is a 1×1 noise value. The result, $\hat{x}_{i,j}^{d}$, of trying to solve for $x_{i,j}^{d}$ may be impaired by interference of the unwanted signal 645b from interfering second UE 650b and noise.

If interference and noise are within bounds, error tolerance and correction in demodulation and decoding allow the first base station 675a to properly reconstruct the original input data, $x_{i,j}^{d}$, from $\hat{x}_{i,j}^{d}$. If the original data cannot be reconstructed, additional information within communication system 600 may be used to properly reconstruct the original input data.

The received signal at neighboring second base station 675b can be written as $$y'_{i,j}=h_{i,j}^{d'}x_{i,j}^{d}+h_{i,j}^{u'}x_{i,j}^{u}+n'_{i,j} \qquad (2)$$

where $y'_{i,j}$ is the 1×1 channel output; $h_{i,j}^{d'}$ is the 1×1 channel transfer function between the desired first UE 650a and the receiver of the neighboring second base station 675b; $h_{i,j}^{u'}$ is the 1×1 channel transfer function between the interfering second UE 650b and the receiver of the neighboring second base station 675b; and $n'_{i,j}$ is a 1×1 noise value.

Availability to the first base station 675a of the signal received by the neighboring second base station 675b has the potential of significantly increasing the decoding performance at the first base station 675a. To facilitate this, the first base station 675a is operated as described in method 800 of FIG. 8 and the neighboring second base station 675b is operated as described in method 900 of FIG. 9. Note that they may also simultaneously operate such that the first base station 675a is assisting the neighboring second base station 675b on an on-demand basis.

For each UL transmission received in a slot, the neighboring second base station 675b stores local uplink transmission data, for example, its received frequency domain data elements, $y'_{i,j}$ (e.g., data elements 590) and both received and expected reference signal. For each UL transmission received in a slot that first base station 675a attempts to decode but cannot, first base station 675a requests the frequency domain data elements $y'_{i,j}$ and received and expected reference signals for UL transmissions received by neighboring second base station 675b that overlap the un-decodable UL transmission. In response to a request received from first base station 675a, the neighboring second base station 675b may send its local uplink transmission data for the UL transmissions it received that overlap the UL transmission subcarriers as requested by the first base station 675a.

The neighboring second base station 675b may store and communicate its local uplink transmission data in various forms. The local uplink transmission data may include the received frequency domain data elements for the data element portion of the transmission and received and expected values for the reference signal portion of the transmission. Alternatively, the neighboring second base station 675b sends first base station 675a the output of the FFT (some or all subcarriers) for all OFDM symbols and lets it extract the frequency domain data elements $y'_{i,j}$ from the demapper. Alternatively, the neighboring second base station 675b may send first base station 675a information sufficient to create the expected reference signals rather than the actual expected reference signals.

With local uplink transmission data from the neighboring second base station 675b, the decoding ambiguity introduced by the interference element, $h_{i,j}^u x_{i,j}^u$ of equation (1) can be substantially reduced.

The interference resolution process is further explained using equation (3), which is the two-dimensional mathematical model obtained by aggregating equations (1) and (2).

$$\begin{bmatrix} y_{i,j} \\ y'_{i,j} \end{bmatrix} = \begin{bmatrix} h_{i,j}^d & h_{i,j}^u \\ h_{i,j}^{d'} & h_{i,j}^{u'} \end{bmatrix} \begin{bmatrix} x_{i,j}^d \\ x_{i,j}^u \end{bmatrix} + \begin{bmatrix} n_{i,j} \\ n'_{i,j} \end{bmatrix} \triangleq Y_{i,j} = H_{i,j} X_{i,j} + N_{i,j} \quad (3)$$

Where $H_{i,j}$ is the channel transfer function matrix; $Y_{i,j}$ is the output vector; $X_{i,j}$ is the input vector; and $N_{i,j}$ is the noise vector.

First base station 675a desires to resolve $x_{i,j}^d$, the frequency domain resource element value from wanted signal 635a, and can conduct interference resolution based on its local uplink transmission data and the neighbor uplink transmission data received from neighboring second base station 675b to obtain resolved uplink transmission data. As described above, first base station 675a knows $y_{i,j}$, $y'_{i,j}$, and an estimate of $h_{i,j}^d$ from a combination of the functionality of its receiver and the uplink transmission data received from the neighboring second base station 675b. With the expected reference signal from the neighboring second base station 675b, the first base station 675a has enough information to estimate the channel transfer function matrix H in equation (3).

For interference resolution, the first base station 675a can calculate the estimated channel transfer functions, as shown below, for example:

$h_{11}$ by correlating the reference signal extracted by the receiver of first base station 675a with the reference signal it expected to be used by the first UE 650a.

$h_{12}$ by correlating the reference signal extracted by the receiver of first base station 675a with the reference signal that neighboring second base station 675b expected to be used by the second UE 650b.

$h_{21}$ by correlating the reference signal extracted by neighboring second base station 675b with the reference signal it expected to be used by the first UE 650a.

$h_{22}$ by correlating the reference signal extracted by neighboring second base station 675b with the reference signal that neighboring second base station 675b expected to be used by the second UE 650b.

These calculations (and other related or similar calculations) may be referred to collectively or individually as a correlation procedure.

First base station 675a then has output matrix $Y_{i,j}$, and $\hat{H}$, an estimate of the channel transfer function matrix $H_{i,j}$. The estimated channel transfer function matrix, $\hat{H}$, is formed as shown in equation (4) from the components calculated in the correlation procedure.

$$\hat{H} = \begin{bmatrix} h_{11} & h_{12} \\ h_{21} & h_{22} \end{bmatrix} \quad (4)$$

The estimated channel transfer function matrix, $\hat{H}$ can be used to obtain the equalized and joint estimate $\hat{X}_{i,j}$ for $$X_{i,j} = \begin{bmatrix} x_{i,j}^d \\ x_{i,j}^u \end{bmatrix}$$

as shown in equation (5). This calculation of $\hat{X}_{i,j}$ may be referred to as zero forcing.

$$\hat{X}_{i,j} = \hat{H}^{-1} Y_{i,j} = \hat{H}^{-1} H_{i,j} X_{i,j} + \hat{H}^{-1} N_{i,j} \quad (5)$$

If interference and noise are within bounds, error tolerance and correction in demodulation and decoding allow the first base station 675a to properly reconstruct the original input data from the impaired version of $x_{i,j}^d$ in $\hat{X}$.

The estimated channel transfer function matrix, $\hat{H}$ may be obtained over an entire OFDM or SC-FDMA uplink transmission attributable to a UE, as in the above example, where one estimated channel transfer function matrix is used the entire range of symbol index i and subcarrier index j of the uplink transmission. Alternatively, a number of different $\hat{H}$ matrices may be obtained over one or more subsets of such a transmission. An obtained $\hat{H}$ matrix may be used for the entire OFDM or SC-FDMA region of interest, or for a subset of the region or for individual resource elements. That is, different $\hat{H}$ matrices may be obtained and used for different resource elements or any subset of an OFDM or SC-FDMA transmission.

A second process for interference resolution is similar to the first process described above. In the second process for interference resolution, the assisting access node calculates part of the estimated channel transfer function matrix $\hat{H}$ and supplies this information to the assisted access node. The neighboring second base station 675b estimates channel transfer function $h_{i,j}^{d_1}$ creating $h_{21}$ by using information that it has obtained about the reference signal used by the first UE 650a. The neighboring second base station 675b estimates channel transfer function $h_{i,j}^{u_1}$ creating $h_{22}$ by correlating the reference signal it extracted with the expected reference signal associated with the second UE 650b. The neighboring second base station 675b can furnish the transfer function estimates $h_{21}$ and $h_{22}$, to first base station 675a on request along with $y'_{i,j}$ and the expected reference signal transmitted by the second UE 650b. First base station 675a calculates $h_{11}$ and $h_{12}$ as described above and then has two equations relating $x_{i,j}^u$ and $x_{i,j}^d$ and thus it can obtain detected values for $\hat{x}_{i,j}^u$ and $\hat{x}_{i,j}^d$ using equations (4) and (5).

A third process for interference resolution is similar to the second process described above. In the third process, when the first base station 675a requests information from the neighboring second base station 675b, the first base station 675a includes the expected reference signal associated with the first UE 650a or information enabling the determination of the expected reference signal. This allows the neighboring second base station 675b to make an estimate of channel transfer function $h_{i,j}^{d_1}$, creating $h_{21}$ by correlating the reference signal it extracted with the expected reference signal associated with the first UE 650a received from the first base station 675a. Then, as in the second process, the neighboring second base station 675b estimates channel transfer function $h_{i,j}^{u_1}$, creating $h_{22}$, and furnishes the transfer function estimates $h_{21}$ and $h_{22}$ to first base station 675a along with $y'_{i,j}$ and the expected reference signal transmitted by second UE 650b or information enabling the determination of that expected reference signal. First base station 675a calculates $h_{11}$ and $h_{12}$ as described above and then has two equations relating $x_{i,j}^u$ and $x_{i,j}^d$ from which it can obtain detected values for $\hat{x}_{i,j}^u$ and $\hat{x}_{i,j}^d$ using equations (4) and (5).

A fourth process for interference resolution is similar to the processes described above. In the fourth process, when first base station 675a requests uplink transmission data from the neighboring second base station 675b, the neighboring second base station 675b returns for each i, j its detected value $\hat{x}_{i,j}^u$ for $x_{i,j}^u$, the frequency domain resource element value from interfering second UE 650b, for the interfered resource elements. The neighboring second base station 675b also returns the reference signal that neighboring second base station 675b expected to be used by the second UE 650b or information enabling the determination of the reference signal. These data may have been stored by neighboring second base station 675b, for example, as shown in step 930 of method 900 of FIG. 9.

First base station 675a calculates $h_{11}$ and $h_{12}$ as described above. For each resource element i, j, the first base station 675a uses $y_{i,j}$ the 1×1 channel output (e.g., data elements 590), $\hat{x}_{i,j}^u$, $h_{11}$, and $h_{12}$ to calculate $\hat{x}_{i,j}^d$ as shown in equation (6).

$$\hat{x}_{i,j}^d = \frac{(y_{i,j} - h_{12}\hat{x}_{i,j}^u)}{h_{11}} \quad (6)$$

A fifth process for interference resolution is similar to the processes described above. The fifth process may be used when there are partially overlapping uplink transmissions, for example, as shown in FIG. 13, which the process will be described with reference to. For the M resource blocks in the First Interfered Data Portion 1020a and the First Interfered RS Portion 1030a, the channel output of the first base station 675a at OFDM symbol index i and subcarrier index j is given by equation (1).

Since, in this scenario, there is no transmission from a UE interfering with the N-M resource blocks in the Second Interfered Data Portion 1020b and the Second Interfered RS Portion 1030b, the channel output at OFDM symbol index i and subcarrier index j for these resource blocks is as shown in equation (7).

$$y_{i,j} = h_{i,j}^d x_{i,j}^d + n_{i,j} \quad (7)$$

The received signal at the neighboring second base station 675b in PUSCH transmission 1055 can be written as shown in equation (2).

For each UL transmission that first base station 675a attempts to decode but cannot, first base station 675a requests uplink transmission data from the neighboring second base station 675b. The uplink transmission data can be in the various forms as described for other interference resolution processes. The uplink transmission data of interest here is for UL transmissions received by neighboring second base station 675b that overlap the undecodable UL transmission, for example, from the First Interfering Data Portion 1065 and the First Interfering RS Portion 1075.

The first base station 675a may resolve interference for the First Interfered Data Portion 1020a, separately from resolving interference for the Second Interfered Data Portion 1020b. As described above, first base station 675a knows $y_{i,j}$ from its receiver and $y'_{i,j}$ from uplink transmission data from neighboring second base station 675b. First base station 675a can estimate the channel transfer function matrix H, obtaining Ĥ as shown in equation (4). The first base station 675a can estimate the channel transfer function matrix H using the expected reference signal from neighboring second base station 675b and its local information.

Similar to the first process, the first base station 675a can, for example, calculate:

$h_{11}$ by correlating the reference signal extracted by its receiver for the First Interfered RS Portion 1030a with the same length (Mx12 subchannels in the example of FIG. 13) corresponding portion of the reference signal that first base station 675a expected to be used by the first UE 650a for the First Interfered RS Portion 1030a.

$h_{12}$ by correlating the same length corresponding portion of the reference signal extracted by its receiver for the First Interfered RS Portion 1030a with the reference signal that neighboring second base station 675b expected to be used by the second UE 650b for the First Interfering RS Portion 1075.

$h_{21}$ by correlating the reference signal extracted by the neighboring second base station 675b for the First Interfering RS Portion 1075 with the same length corresponding portion of the reference signal the first base station 675a expected to be used by the first UE 650a for the First Interfered RS Portion 1030a.

$h_{22}$ by correlating the reference signal extracted by the neighboring second base station 675b for the First Interfering RS Portion 1075 with the reference signal that neighboring second base station 675b expected to be used by the second UE 650b for the First Interfering RS Portion 1075.

Alternatively, first base station 675a may calculate $h_{11}$ by correlating the received version of full reference signal 1030, composed of 1030a and Second Interfered RS Portion 1030b, that is extracted by its receiver with the full length reference signal it expected to be used by first UE 650a. Using the full reference signal may be easier to implement or may provide improved performance in some receiver architectures.

Alternatively or additionally, first base station 675a may calculate $h_{21}$ by correlating the full length reference signal composed of the received version of reference signal 1075 and the reference signal resource elements from the additional N-M resource blocks which overlap Second Interfered RS Portion 1030b, extracted by the neighboring second base station 675b, with the full length reference signal expected to be used by the first UE 650a. This requires neighboring second base station 675b to also store and provide upon request to first base station 675a the local uplink transmission data for the additional N-M resource blocks which overlap Second Interfered RS Portion 1030b. Alternatively, in the request for information, first base station 675a may provide neighboring second base station 675b with the full length reference signal expected to be used by the first UE 650a, or a means of constructing it. In this alternative, neighboring second base station 675b calculates and returns $h_{21}$.

For the First Interfered Data Portion 1020a, the first base station 675a now has output vector $Y_{i,j}$ and $\hat{H}$, an estimate of channel transfer function matrix H. The estimated channel transfer function matrix $\hat{H}$ can then be used to obtain the equalized joint estimate $\hat{X}_{i,j}$ for $$X_{i,j} = \begin{bmatrix} x_{i,j}^d \\ x_{i,j}^u \end{bmatrix}$$

as shown in equation (5).

In a variation of this interference resolution process, when first base station 675a requests information from neighboring second base station 675b, neighboring second base station 675b returns for each i, j its detection value $\hat{x}_{i,j}^u$ for $x_{i,j}^u$, the equalized received frequency domain resource element values for First Interfering Data Portion 1065 from interfering second UE 650b. First base station 675a calculates $h_{11}$ and $h_{12}$ as described above. For each resource element i, j, the first base station 675a uses $y_{i,j}$ the 1×1 channel output $\hat{x}_{i,j}^u$ in place of $x_{i,j}^u$, $h_{11}$ and $h_{12}$, allowing the calculation of $\hat{x}_{i,j}^d$ through interference cancellation as shown in equation (6).

For decoding the Second Interfered Data Portion 1020b, which in this scenario has not been interfered by a UE communicating with the neighboring second base station 675b, $h_{i,j}^d$ is needed to resolve the channel. The first base station 675a calculates an estimate $h_{11}$ of $h_{i,j}^d$ by correlating the reference signal extracted (e.g., 580) by its receiver with the same length corresponding portion of the reference signal it expected to be used by the first UE 650a for the Second Interfered RS Portion 1030b. Estimated channel transfer function $h_{11}$ can be used to obtain the equalized estimate $\hat{x}_{i,j}^d$ of $x_{i,j}^d$ as shown in equation (8).

$$\hat{x}_{i,j}^d = h_{11}^{-1} y_{i,j} \quad (8)$$

As described above with respect to decoding the First Interfered Data Portion 1020a, for some receiver architectures it may be easier or provide improved performance for the first base station 675a to calculate $h_{11}$ by correlating the received version of full reference signal 1030, composed of 1030a and 1030b, that is extracted by its receiver with the full length reference signal it expected to be used by the first UE 650a. The resulting estimated channel transfer function $h_{11}$ can be used to obtain the equalized estimate $\hat{x}_{i,j}^d$ of $x_{i,j}^d$ as shown in equation (8).

For further assistance in decoding the Second Interfered Data Portion 1020b, the first base station 675a may request from the neighboring second base station 675b the reference signal resource elements from the additional N-M resource blocks which overlap the Second Interfered RS Portion 1030b. The first base station 675a may calculate $h_{21}$ by correlating the reference signal resource elements from the additional N-M resource blocks, received by neighboring second base station 675b, which overlap the Second Interfered RS Portion 1030b with the same length corresponding portion of the reference signal it expected to be used by the first UE 650a. As described above, $h_{21}$ may be calculated by neighboring second base station 675b. The first base station 675a may also request from the neighboring second base station 675b the data portion resource elements $y'_{i,j}$ from the additional N-M resource blocks which overlap the Second Interfered Data Portion 1020b. Channel transfer function estimate $h_{21}$ along with data portion resource elements $y'_{i,j}$ from the additional N-M resource blocks which overlap the Second Interfered Data Portion 1020b may be used in equation (9), which is an extension of equation (8).

$$\hat{x}_{i,j}^d = h_{11}^{-1} y_{i,j} + h_{21}^{-1} y'_{i,j} \quad (9)$$

If interference and noise are within bounds, error tolerance and correction in demodulation and decoding allow the first base station 675a to properly reconstruct the original input data for the data elements i, j corresponding to the First Interfered Data Portion 1020a and the Second Interfered Data Portion 1020b from the $\hat{x}_{i,j}^d$, the impaired estimates of the $x_{i,j}^d$.

The method of resolving Second Interfered Data Portion 1020b can also be used in the case where there is no First Interfered Data Portion 1020a, that is to say when M=0.

As an alternative to resolving decoding ambiguity in the First Interfered Data Portion 1020a and the Second Interfered Data Portion 1020b separately, they may be processed together. In this case, $h_{12}$, $h_{21}$, and $h_{22}$ are calculated using one of the methods described above for individual processing of First Interfered Data Portion 1020a, and $h_{11}$ is calculated using one of the methods described above for individual processing of either of First Interfered Data Portion 1020a or of Second Interfered Data Portion 1020b. If the First Interfered Data Portion 1020a and the Second Interfered Data Portion 1020b are processed together, data portion resource elements $y'_{i,j}$ from the additional N-M resource blocks which overlap Second Interfered Data Portion 1020b from neighboring second base station 675b may be used. Alternatively, values of zero in place of the data portion resource elements $y'_{i,j}$ from the additional N-M resource blocks which overlap Second Interfered Data Portion 1020b may be used, for example, to enhance immunity against noise.

A sixth process for interference resolution is similar to the processes described above. The sixth process may be used when there are overlapping or partially overlapping uplink transmissions from two interfering UEs, for example, as shown in FIG. 14, which the process will be described with reference to. In the transmissions of FIG. 14, in addition to PUSCH transmission 1055 from second UE 650b to neighboring second base station 675b, there is an additional PUSCH transmission 1080 from a third UE to neighboring second base station 675b.

The first base station 675a can resolve interference from First Interfering Data Portion 1065 to First Interfered Data Portion 1020a, for example, as described above for the fifth process for interference resolution.

Interference from Second Interfering Data Portion 1090a to Second Interfered Data Portion 1020b is resolved in a similar manner. In addition to the information that neighboring second base station 675b sends to first base station 675a for resolution of interference from First Interfering Data Portion 1065 to First Interfered Data Portion 1020a, neighboring second base station 675b also sends the corresponding information for Second Interfering Data Portion 1090a and Second Interfering RS Portion 1095a.

Similar to the interference resolution for the First Interfered Data Portion 1020a first process, for the Second Interfered Data Portion 1020b, the first base station 675a can, calculate the estimated channel transfer functions, as shown below, for example:

$h_{11}$ by correlating the reference signal extracted by its receiver for the Second Interfered RS Portion 1030b with the same length corresponding portion of the reference signal that first base station 675a expected to be used by the first UE 650a for Second Interfered RS Portion 1030b.

$h_{12}$ by correlating the reference signal extracted by its receiver for the Second Interfered RS Portion 1030b with the same length corresponding portion of the reference signal that neighboring second base station 675b expected to be used by the third UE for Second Interfering RS portion 1095a.

$h_{21}$ by correlating the reference signal extracted by neighboring second base station 675b for Second Interfering RS Portion 1095a with the same length corresponding portion of reference signal that first base station 675a expected to be used by the first UE 650a for Second Interfered RS Portion 1030b.

$h_{22}$ by correlating the reference signal extracted by neighboring second base station 675b for Second Interfering RS Portion 1095a with the same length corresponding portion of reference signal that neighboring second base station 675b expected to be used by the third UE for Second Interfering RS portion 1095a.

At this point, for the Second Interfered Data Portion 1020b, first base station 675a has output vector $Y_{i,j}$, and $\hat{H}$, an estimate of channel transfer function matrix H, as shown in equation (4). The estimated channel transfer function matrix $\hat{H}$ can then be used to obtain the equalized joint estimate $\hat{X}_{i,j}$ for $$X_{i,j} = \begin{bmatrix} x^d_{i,j} \\ x^u_{i,j} \end{bmatrix}$$

as shown in equation (5).

Many variations on this interference resolution process are possible. For example, first base station 675a may be passed the received version of the full reference signal 1095, composed of Second Interfering RS Portion 1095a and Third Interfering RS Portion 1095b, extracted by neighboring second base station 675b. First base station 675a may then calculate, for example, alternative estimated channel transfer functions as:

$h_{12}$ by correlating the concatenation of the reference signal extracted by its receiver corresponding to the N-M resource blocks of Second Interfered RS Portion 1030b and the reference signal extracted by its receiver corresponding to the L-N+M resource blocks of Third Interfering RS Portion 1095b with the full length reference signal 1095 that neighboring second base station 675b expected to be used by the third UE.

$h_{22}$ by correlating the full length reference signal extracted by neighboring second base station 675b corresponding to reference signal 1095 (composed of Second Interfering RS Portion 1095a and Third Interfering RS Portion 1095b) with the full length reference signal that neighboring second base station 675b expected to be used by the third UE for reference signal 1095.

A seventh process for interference resolution is similar to the processes described above. The seventh process may be used when there are partially overlapping uplink transmissions, for example, as shown in FIG. 15 which the process will be described with reference to. Interference from Fourth Interfering Data Portion 1515a to data element 1020 is resolved in a manner similar to that used in the sixth process for resolving interference from Second Interfering Data Portion 1090a to Second Interfered Data Portion 1020b (shown in FIG. 14).

Upon request from first base station 675a, neighboring second base station 675b provides the corresponding received frequency domain data elements, $y'_{i,j}$ for Fourth Interfering Data Portion 1515a and provides the expected and received Fourth Interfering RS Portion 1510a.

First base station 675a can estimate the channel transfer functions using its local uplink transmission data and uplink transmission data received from the neighboring second base station 675b. The neighboring second base station 675b may perform some of the calculations. Example calculations of the estimated channel transfer functions include calculating:

$h_{11}$ by correlating the reference signal extracted by the receiver of first base station 675a with the reference signal that first base station 675a expected to be used by the first UE 650a for reference signal 1030.

$h_{12}$ by correlating the reference signal extracted by the receiver of first base station 675a with the same length corresponding portion of the reference signal that neighboring second base station 675b expected to be used by second UE 650b for Fourth Interfering RS portion 1510a.

$h_{21}$ by correlating the reference signal extracted by neighboring second base station 675b with the same length corresponding portion of reference signal that first base station 675a expected to be used by first UE 650a for reference signal 1030.

$h_{22}$ by correlating the reference signal extracted by neighboring second base station 675b with the same length corresponding portion of the reference signal that neighboring second base station 675b expected to be used by the second UE 650b for Fourth Interfering RS portion 1510a.

For data element 1020, first base station 675a now has matrix $Y_{i,j}$, and $\hat{H}$, an estimate of channel transfer function matrix H. The estimated channel transfer function matrix $\hat{H}$ can then be used to obtain the equalized joint estimate $\hat{X}_{i,j}$ for $$X_{i,j} = \begin{bmatrix} x^d_{i,j} \\ x^u_{i,j} \end{bmatrix}$$

as shown in equation (5).

Many variations on this interference resolution process are possible. For example, neighboring second base station 675b may provide the full length expected reference signal for reference signal 1510, composed of Fourth Interfering RS Portion 1510a and Fifth Interfering RS Portion 1510b, and the received version of full reference signal 1510 extracted by neighboring second base station 675b. First base station 675a may then calculate alternative channel transfer functions estimates. Example calculations of the alternative estimated channel transfer functions include calculating:

$h_{12}$ by correlating the full length reference signal composed of a concatenation of the received reference signal corresponding to reference signal 1030 and reference signal related elements corresponding to Fifth Interfering RS Portion 1510b extracted by first base station 675a with the full length reference signal 1510 that the neighboring second base station 675a expected to be used by the second UE 650b.

$h_{22}$ by correlating the full length reference signal extracted by neighboring second base station 675b with the full length reference signal neighboring that the neighboring second base station 675b expected to be used by the second UE 650b for reference signal 1510.

An eighth process for interference resolution is similar to the processes described above. The eighth process may be used when there are interfering uplink transmissions from multiple UEs transmitting to multiple other base stations, for example, as shown in FIG. 16. Interference to PUSCH transmission 1010 from PUSCH transmission 1050 and PUSCH transmission 1525 may be resolved through extensions of the above processes to equations using matrices having more elements.

From the point of view of first base station 675a, the channel output at OFDM symbol index i, and subcarrier index j is given as shown in equation (10).

$$y_{i,j} = h_{i,j}{}^d x_{i,j}{}^d + h_{i,j}{}^{u2} x_{i,j}{}^{u2} + h_{i,j}{}^{u3} x_{i,j}{}^{u3} + n_{i,j} \quad (10)$$

Where $y_{i,j}$ is the 1×1 channel output, $x_{i,j}{}^d$ is the 1×1 frequency domain resource element value from wanted signal 635a from the desired first UE 650a. $h_{i,j}{}^d$ is the 1×1 channel transfer function between the first UE 650a and the receiver of the first base station 675a, $x_{i,j}{}^{u2}$ is the frequency domain resource element value from interfering second UE 650b. $h_{i,j}{}^{u2}$ is the 1×1 channel transfer function between the interfering second UE 650b and the receiver of the first base station 675a. $x_{i,j}{}^{u3}$ is the frequency domain resource element value from interfering third UE. $h_{i,j}{}^{u3}$ is the 1×1 channel transfer function between the interfering third UE and the receiver of the first base station 675a. $n_{i,j}$ is the 1×1 noise value. The result, $\hat{x}_{i,j}{}^d$, of trying to solve for $x_{i,j}{}^d$ may be impaired by interference of the unwanted signals from interfering second UE 650b and interfering third UE and noise.

The received signal at the neighboring second base station 675b can be written as $$y'_{i,j} = h_{i,j}{}^{d'} x_{i,j}{}^d + h_{i,j}{}^{u2'} x_{i,j}{}^{u2} + h_{i,j}{}^{u3'} x_{i,j}{}^{u3} + n'_{i,j} \quad (11)$$

where $y'_{i,j}$ is the 1×1 channel output, $h_{i,j}{}^{d'}$ is the 1×1 channel transfer function between the first UE 650a and the receiver of the neighboring second base station 675b, $h_{i,j}{}^{u2'}$ is the 1×1 channel transfer function between the interfering second UE 650b and the receiver of the neighboring second base station 675b, $h_{i,j}{}^{u3'}$ is the 1×1 channel transfer function between the interfering third UE and the receiver of the neighboring second base station 675b, $n'_{i,j}$ is the 1×1 noise value.

The received signal at neighboring third base station can be written as:

$$y''_{i,j} = h_{i,j}{}^{d''} x_{i,j}{}^d + h_{i,j}{}^{u2''} x_{i,j}{}^{u2} + h_{i,j}{}^{u3''} x_{i,j}{}^{u3} + n''_{i,j} \quad (12)$$

where $y''_{i,j}$ is the 1×1 channel output, $h_{i,j}{}^{d''}$ is the 1×1 channel transfer function between the first UE 650a and the receiver of the neighboring third base station, $h_{i,j}{}^{u2''}$ is the 1×1 channel transfer function between the interfering second UE 650b and the receiver of the neighboring third base station, $h_{i,j}{}^{u3''}$ is the 1×1 channel transfer function between the interfering third UE and the receiver of the neighboring third base station, $n''_{i,j}$ is the 1×1 noise value.

Equation (3) is then replaced with equation (13) which is the 3×3 matrix representation obtained by aggregating equations (10), (11), and (12).

$$\begin{bmatrix} y_{i,j} \\ y'_{i,j} \\ y''_{i,j} \end{bmatrix} = \begin{bmatrix} h_{i,j}^d & h_{i,j}^{u2} & h_{i,j}^{u3} \\ h_{i,j}^{d'} & h_{i,j}^{u2'} & h_{i,j}^{u3'} \\ h_{i,j}^{d''} & h_{i,j}^{u2''} & h_{i,j}^{u3''} \end{bmatrix} \begin{bmatrix} x_{i,j}^d \\ x_{i,j}^{u2} \\ x_{i,j}^{u3} \end{bmatrix} + \begin{bmatrix} n_{i,j} \\ n'_{i,j} \\ n''_{i,j} \end{bmatrix} \triangleq Y_{ij} = H_{ij} X_{ij} + N_{ij} \quad (13)$$

To decode the received data, first base station 675a will create an estimate, $\hat{x}_{i,j}{}^d$ for each $x_{i,j}{}^d$ for all i, j. To do this, first base station 675a may build the matrix $Y_{i,j}$ from the frequency domain data elements received by its receiver (e.g., received frequency-domain resource element values 585 in the SC-FDMA receiver 500) and those received by neighboring base stations' receivers. Additionally, an estimate of channel matrix $H_{i,j}$ may be calculated, resulting in $\hat{H}$ as shown in equation (14).

$$\hat{H} = \begin{bmatrix} h_{11} & h_{12} & h_{13} \\ h_{21} & h_{22} & h_{23} \\ h_{31} & h_{32} & h_{33} \end{bmatrix} \quad (14)$$

For the resource blocks corresponding to interfered PUSCH transmission 1010, first base station 675a requests uplink transmission data from neighboring second base station 675b. The requested uplink transmission data may include:

- Frequency domain data elements $y'_{i,j}$, or information sufficient to recreate them such as the FFT output, corresponding to resource elements for the data elements 1060 of PUSCH transmission 1050.
- The reference signal that neighboring second base station 675b expected to be received from second UE 650b for reference signal 1070.
- The reference signal extracted by neighboring second base station 675b for the resource blocks corresponding to reference signal 1070.

For the resource blocks corresponding to interfered PUSCH transmission 1010, first base station 675a requests uplink transmission data from neighboring third base station. The requested uplink transmission data may include:

- Frequency domain data elements $y''_{i,j}$, or information sufficient to recreate them such as the FFT output, corresponding to resource elements for the data elements 1535 of PUSCH transmission 1525.
- The reference signal the neighboring third base station expected to be received from the third UE for reference signal 1530.
- The reference signal extracted by the neighboring third base station for the resource blocks corresponding to reference signal 1530.

First base station 675a can estimate the channel transfer functions using its local uplink transmission data and the uplink transmission data received from the neighboring base stations. Some of the calculations may be performed by the neighboring base stations or a central entity. Similar to the first process, the first base station 675a may, for example, calculate:

- $h_{11}$ by correlating the reference signal extracted by the receiver of first base station 675a with the reference signal 1030 that first base station 675a expected to be used by the first UE 650a.
- $h_{12}$ by correlating the reference signal extracted by the receiver of first base station 675a with the reference signal 1070 that neighboring second base station 675b expected to be used by second UE 650b.
- $h_{13}$ by correlating the reference signal extracted by the receiver of first base station 675a with the reference signal 1530 that neighboring third base station expected to be used by the third UE.
- $h_{21}$ by correlating the reference signal extracted by neighboring second base station 675b with the reference signal 1030 that first base station 675a expected to be used by first UE 650a.
- $h_{22}$ by correlating the reference signal extracted by neighboring second base station 675b with the reference signal 1070 that neighboring second base station 675b expected to be used by the second UE 650b.
- $h_{23}$ by correlating the reference signal extracted by neighboring second base station 675b with the reference signal 1530 that neighboring third base station expected to be used by the third UE.

$h_{31}$ by correlating the reference signal extracted by the neighboring third base station with the reference signal 1030 that first base station 675a expected to be used by the first UE 650a.

$h_{32}$ by correlating the reference signal extracted by neighboring third base station with the reference signal 1070 that neighboring second base station 675b expected to be used by the second UE 650b.

$h_{33}$ by correlating the reference signal extracted by neighboring third base station with the reference signal 1530 that neighboring third base station expected to be used by the third UE.

For data element 1020, first base station 675a now has matrix $Y_{i,j}$, and $\hat{H}$, an estimate of channel transfer function matrix H, as shown in equation (13). The estimated channel transfer function matrix $\hat{H}$ can then be used to obtain the equalized joint estimate $\hat{X}_{i,j}$ for $X_{i,j}$ as shown in equation (5), providing estimate $\hat{x}_{i,j}{}^d$. In this case only the top row of the inverse estimated channel transfer function matrix $\hat{H}^{-1}$ is used for calculating estimate $\hat{x}_{i,j}{}^d$ of $x_{i,j}{}^d$ as only $x_{i,j}{}^d$ is the target of estimation.

Instead of initially requesting help from multiple neighboring base stations, the first base station may request and use information from one neighboring base station and if that is unsuccessful, requesting information from one or more additional neighboring base stations, retrying until decoding is successful or help from neighboring base station is exhausted.

The various interference resolution and decoding ambiguity reduction methods described herein may be applied individually or in combination. The method may be applied to all or subsets of all possible combinations of interfered and not interfered portions of a PUSCH transmission. The methods may be performed on smaller or larger sets of resource blocks, individual resource blocks, or sets of frequency subchannels. The methods may also be applied when there is no interfering UE, but a neighboring base station listens to the uplink and aids with interference mitigation. Additionally, if a calculation requires a piece of information from each of two base stations, a protocol can be implemented where either the first base station can transmit it's portion to the second base station as a part of the request, allowing the second base station to calculate the desired result and return it in a response, or the second base station may return the information required for the calculation to the first base station which would then perform the calculation locally. Alternatively, a central entity may receive perform the calculations.

LTE allows neighboring base stations to use different channel bandwidths. For example, one base station may be using 10 MHz channels while an adjacent base station may be using 5 MHz channels. While this may impact the description of the interfered and interfering portions used in requests and responses, the interference resolution and decoding ambiguity reduction methods described herein may be adapted for use with different channel bandwidths.

Forms of Information Exchange

The interference resolution and decoding ambiguity reduction methods described herein include the exchange of information between base stations (or other entities).

In an initial request for assistance, a first base station may include an indication of the uplink time-frequency resources that were interfered, allowing an assisting neighboring second base station to know what UL transmission the assisting neighboring second base station expected to receive were overlapping in time and frequency. For example, in an LTE system, the first base station may indicate the frame number, either absolute or relative, in which the interference or inability to decode the uplink transmission occurred. Alternatively it may specify a time in accordance with a time standard such as provided by the global positioning system (GPS). The first base station may also specify the resource blocks of interest. Resource blocks may be indicated by the subframe within the frame and the slot within the subframe as well as the subchannels within the slots. Identification of resource blocks may alternatively be expressed in a form similar (for example, normalized for frequency hopping) to how the resource blocks making up the uplink resource grant is expressed to the UE which transmitted in the uplink resource grant. If neighboring base stations are allowed to have different channelization, the request may also include a description of the channel such as center frequency, channel width (e.g., 5 MHz or 10 MHz), and subchannel spacing or FFT size.

The response from the neighboring second base station may include the same information for every UL transmission it expected on the uplink that overlaps in time and frequency with the interfered reception of the first base station. Neighboring second base station may also include indications of portions of its uplink that overlapped in time and frequency with the interfered reception of the first base station but did not contain any interfering uplink transmissions by UEs to the neighboring second base station.

Observed or estimated frequency domain data element values, e.g., $y'_{i,j}$ and $\hat{x}_{i,j}{}^u$, may be exchanged, for example, in the form of phase, amplitude pairs identified per symbol i and subcarrier j.

Received reference signal may also take the form of phase, amplitude pairs for each symbol and subcarrier of the reference signal.

The expected reference signal may take the same form as the received reference signal. Alternatively, information that allows the reconstruction of the expected reference signal or selection from a known set of reference signals may be exchanged. For example, in LTE, a reference signal can be described by sequence length in resource blocks, sequence group number, cyclic shift value, usage information related to orthogonal cover code of LTE, and operating parameters that are associated with group hopping, sequence hopping and cyclic shift hopping patterns.

Channel transfer functions, e.g., $h_{21}$ and $h_{22}$, are complex values and may be exchanged as pairs of fixed or floating point numbers.

The FFT output, when exchanged, may take the form of a series of in-phase and quadrature (I&Q) value pairs, which may be exchanged as fixed or floating point numbers, binned by subchannel for each OFDM symbol in the reception in question.

Cross-Correlation Nulling

The interference resolution methods described above may have reduced performance when the reference signal, or portion thereof, expected to be received by the first base station and the reference signal, or portion thereof, expected to be received by a neighboring base station in the same slot and in overlapping subcarriers have a non-zero cross-correlation which impacts the ability to estimate the channel transfer functions. Cross-correlation nulling techniques to remedy such impact are provided. Additionally, the cross-correlation nulling techniques may be used to improve the channel transfer function estimate even when the reference signals come from the same base station, as long as they have some difference such as length or offset in subchannel.

Figure 17:
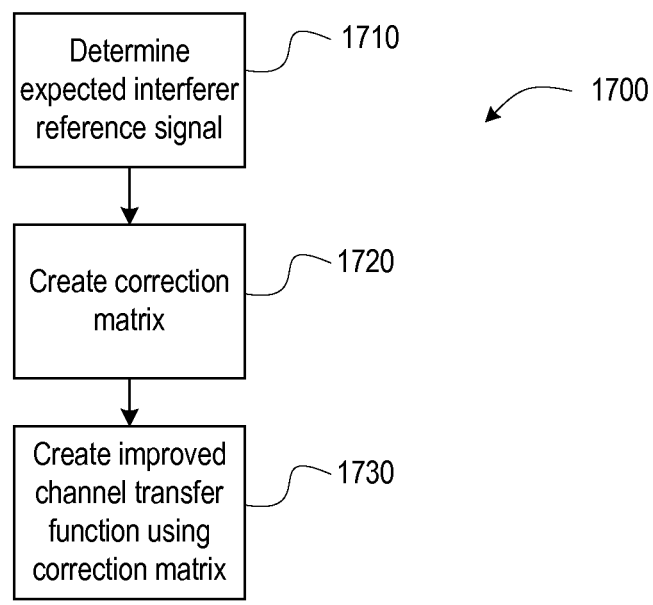
FIG. 17 is a flowchart of a process for creating improved channel transfer function estimate matrices in accordance with aspects of the invention.

FIG. 17 is a flowchart of a process 1700 for creating improved channel transfer function estimate matrices according to an example embodiment of the present invention. The process may, for example, be performed by the various the base stations (macro, femto, or pico) depicted in FIG. 1, 2, 3, or 6 and with the method for performing on-demand uncoordinated UL multipoint interference resolution of FIG. 8.

In step 1710, the process determines information regarding a reference signal expected to be used in a transmission from an interfering UE. The expected reference signal information may be, for example, the expected reference signal or information from with the expected reference signal can be created. The information may be obtained, upon request, from a neighboring base station that was the intended recipient of the transmission from the interfering UE.

When information regarding reference signals expected to be received at neighboring base stations is available at a first base station, for example, via the information exchanges described above, the first base station may create an improved version, $\hat{H}'$ of the estimated channel transfer function matrix $\hat{H}$. Examples of improved versions of the channel transfer function estimate matrix are shown for the 2×2 and 3×3 cases in equation (15), corresponding to equations (4) and (14).

$$\hat{H}' = \begin{bmatrix} h'_{11} & h'_{12} \\ h'_{21} & h'_{22} \end{bmatrix}, \quad (15)$$

$$\hat{H}' = \begin{bmatrix} h'_{11} & h'_{12} & h'_{13} \\ h'_{21} & h'_{22} & h'_{23} \\ h'_{31} & h'_{32} & h'_{33} \end{bmatrix}, \text{etc.}$$

In step 1720, the process creates a correction matrix. The correction matrix may also be referred to as a cross-correlation matrix when it removes or reduces the effects of cross-correlation on estimated channel transfer functions.

In step 1730, the process creates one or more corrected channel transfer function estimates or corrected estimated channel transfer function matrices. A corrected estimated channel transfer function matrix may also be referred to as an improved estimated channel transfer function matrix. The corrected estimated channel transfer functions can then be used in an interference resolution process. The corrected estimated channel transfer functions may be created by applying the correction matrix to previously calculated estimated channel transfer functions.

To apply cross-correlation nulling, a cross-correlation matrix, $C$, is calculated from the reference signal expected to be received by the first base station and the reference signals expected to be received by neighboring base stations. The inverse of cross-correlation matrix $C$ is applied to the estimated channel transfer function matrix $\hat{H}$ to create the improved estimated channel transfer function matrix $\hat{H}'$ as shown in equation (16).

$$\hat{H}' = \hat{H} C^{-1} \quad (16)$$

The transmission overlap scenarios previously discussed with respect to FIGS. 11, 13, 14, 15, and 16 present different possibilities for calculating and applying the cross-correlation matrix C. The application of cross-correlation nulling to the channel transfer function estimate is not limited to these overlap scenarios and the technique can be applied to the many other transmission overlap scenarios that may occur.

A first example of cross-correlation nulling will be described with reference to FIG. 11 where the wanted and interfering PUSCH transmissions cover the same set of frequency subchannels. The first base station computes the cross-correlation, $C_1$, of the reference signal 1030 it expected to receive with the reference signal 1070 expected to be received by the neighboring second base station, as shown in equation (17).

$$c_1 = \text{cxcorr}(R_A, R_B) \quad (17)$$

Where $R_A$ denotes reference signal 1030 and $R_B$ denotes reference signal 1070. The cross-correlation value $c_1$ is calculated by a cross-correlation function cxcorr with the two argument vectors $R_A$ and $R_B$. The cross-correlation function cxcorr for example, may be the circular cross-correlation between its two argument vectors calculated at a zero relative delay value and normalized by the length of the argument vectors. Other cross-correlation functions may also be used.

The cross-correlation matrix C for this scenario is shown in equation (18), where $c_1^*$ denotes the conjugate of $c_1$.

$$C = \begin{bmatrix} 1 & c_1 \\ c_1^* & 1 \end{bmatrix} \quad (18)$$

The cross-correlation matrix C is applied as shown in equation (16) to create improved channel transfer function estimates that may be used in the interference resolution processes described herein.

A second example of cross-correlation nulling will be described with respect to FIG. 13 where the first M resource blocks, comprising $n_M$ subchannels, of PUSCH transmission 1010 is interfered by PUSCH transmission 1055 and the second N-M resource blocks, comprising $n_{N-M}$ subchannels, of PUSCH transmission 1010 is not interfered by a transmission to the neighboring second base station.

In a variation of the fifth process for interference resolution described above for this interference scenario, $h_{11}$ is calculated by correlating the received version of full reference signal 1030, composed of First Interfered RS Portion 1030a and Second Interfered RS Portion 1030b, that is extracted by the receiver of first base station 675a with the full length reference signal expected to be used by the first UE 650a, and $h_{21}$ is calculated by correlating the full length reference signal composed of the received version of reference signal 1075 and the reference signal resource elements from the additional N-M resource blocks which overlap Second Interfered RS Portion 1030b, extracted by the neighboring second base station 675b, with the full length reference signal expected to be used by the first UE 650a. In this variation, two cross-correlations may be calculated to construct the cross-correlation matrix C. The first calculated cross-correlation is the cross-correlation of the entire expected reference signal 1030 with the expected reference signal 1075 padded to be the same length as expected reference signal 1030 by inserting zeros for subchannels of slot 1045 not overlapped by subchannels of reference signal 1075. This is shown in equation (19), where $R_A$ denotes reference signal 1030 and $R_B$ denotes reference signal 1075 and where $[n_j:n_k]$ denotes the range of subchannels from j to k. The second calculated cross-correlation is the cross-correlation of only the portion of expected reference signal 1030 transmitted over those subchannels that are overlapped by reference signal 1075, for example, first interfered RS portion 1030a, with the expected reference signal 1075. This is shown in equation (20).

$$c_1 = \text{cxcorr}(R_A, R_B + \text{zeros}[n_{M+1}:n_N]) \quad (19)$$

$$c_2 = \text{cxcorr}(R_A[1:n_M], R_B) \quad (20)$$

The cross-correlation matrix C for this scenario as shown in equation (21), and may be applied to create improved channel transfer function estimates that may be used as described earlier.

$$C = \begin{bmatrix} 1 & c_2 \\ c_1^* & 1 \end{bmatrix} \quad (21)$$

Alternatively, $c_2$ from equation (20) can be used by itself. The cross-correlation matrix C for this scenario is shown in equation (22).

$$C = \begin{bmatrix} 1 & c_2 \\ c_2^* & 1 \end{bmatrix} \quad (22)$$

The above equations can be adapted to scenarios, for example, where reference signal 1075 overlapped a different, for example, last or middle, subset of the subchannels of reference signal 1030.

Another example of cross-correlation nulling will be described with respect to FIG. 14. The cross-correlation nulling may be applied separately for the first interfered RS portion 1030a of expected reference signal 1030 with respect to first interfering RS portion 1075 and for the second interfered RS portion 1030b of expected reference signal 1030 with respect to second interfering RS portion 1095a of expected reference signal 1095.

For first interfered RS portion 1030a, the expected reference signal is cross-correlated with the expected reference signal for first interfering RS portion 1075 as shown in equation (20).

The cross-correlation matrix C for this scenario is shown in equation (22), and may be applied to improve the channel transfer function estimate for the subchannels on which the first interfered RS portion 1030a was transmitted.

For second interfered RS portion 1030b, the expected reference signal is cross-correlated with the expected reference signal for second interfering RS portion 1095a of expected reference signal 1095 as shown in equation (23), where $R_C$ denotes reference signal 1095.

$$c_3 = \text{cxcorr}(R_A[n_{M+1}:n_N], R_C[1:n_{N-M}]) \quad (23)$$

The cross-correlation matrix C for this scenario as shown in equation (24), and may be applied to improve the channel transfer function estimate for the subchannels on which the second interfered RS portion 1030b was transmitted.

$$C = \begin{bmatrix} 1 & c_3 \\ c_3^* & 1 \end{bmatrix} \quad (24)$$

Another example of cross-correlation nulling will be described with respect to FIG. 15. Two methods for creating a cross-correlation matrix C for improving the channel transfer function for the subchannels occupied by PUSCH transmission 1010 will be described. For both methods, a first cross-correlation, $c_1$, is calculated between the expected reference signal 1030 and the fourth interfering RS portion 1510a of expected reference signal 1510, as shown in equation (25).

$$c_1 = \text{cxcorr}(R_A, R_B[1:n_N]) \quad (25)$$

In the first method with respect to the overlap scenario of FIG. 15, $c_1$ is used in equation (18) to produce the cross-correlation matrix C. In the second method with respect to the overlap scenario of FIG. 15, a second cross-correlation, $c_2$, is calculated as shown in equation (26) with reference signal 1030 zero padded to be the same length as reference signal 1510.

$$c_2 = \text{cxcorr}(R_A + \text{zeros}[n_{N+1}:n_P], R_B) \quad (26)$$

The cross-correlations $c_1$ and $c_2$ may be used together in equation (21) to produce an alternative cross-correlation matrix C for the overlap scenario of FIG. 15. Equations (25) and (26) can be adjusted to account for different overlaps of reference signal 1030 with longer reference signal 1510.

Another example of cross-correlation nulling will be described with respect to FIG. 16. Three cross-correlations may be performed to create a 3×3 version of cross-correlation matrix C to create a 3×3 version of improved channel transfer function matrix Ĥ'.

Cross-correlation $c_1$ is calculated as in equation (18). Cross-correlation $c_2$ is calculated as in equation (27). Cross-correlation $c_3$ is calculated as in equation (28). Where $R_A$ denotes reference signal 1030, $R_B$ denotes reference signal 1070, and $R_C$ denotes reference signal 1530, $$c_2 = \text{cxcorr}(R_A, R_C) \quad (27)$$

$$c_3 = \text{cxcorr}(R_B, R_C) \quad (28)$$

Cross-correlations $c_1$, $c_2$, and $c_3$ are used in equation (29) to calculate the 3×3 version of cross-correlation matrix C which can be used to create an improved channel transfer function estimate to be used in the interference resolution processes described herein.

$$C = \begin{bmatrix} 1 & c_1 & c_2 \\ c_1^* & 1 & c_3 \\ c_2^* & c_3^* & 1 \end{bmatrix} \quad (29)$$

The cross-correlation nulling for the described scenarios provides building blocks which may be used and extended to improve channel transfer function estimates for all combinations of overlap scenarios that may arise in performing interference resolution.

Improving the channel estimate with the above techniques may allow the first base station (which is performing interference resolution) to be more aggressive in its use of spectrum. For example, the first base station may use more efficient modulation or coding schemes than it could without the techniques for interference resolution. The first base station may also use fewer retransmissions, such as fewer hybrid automatic repeat request (HARQ) retransmissions. The first base station may use a more efficient unacknowledged transport mode rather than an acknowledged transport mode.

Resource Allocation

Orthogonal frequency division multiplex (OFDM) modulated signals are specified by many recent communication standards. Systems that use OFDM modulated signals for communications may be referred to as OFDM systems. In OFDM systems, a data stream to be transmitted in a transmitter is divided into numerous sub-streams. A data stream is a sequence of data elements for transmission of audio, video, and other digital data traffic. Each sub-stream is transmitted using a narrowband modulated waveform. In OFDM systems, the narrowband modulated waveform used for transmitting a sub-stream may also be referred to as a subcarrier. The narrowband modulated waveforms are multiplexed in the frequency domain in an orthogonal manner. The narrowband modulated waveforms may be modulated directly with digital modulation values derived from each of the sub-streams. The digital modulation values may be obtained according to techniques such as phase shift keying (PSK) or quadrature amplitude modulation (QAM). Alternatively, the narrowband modulated waveforms may be modulated with a transformed signal derived from digital modulation of each of the substreams. A transformation that may be used on the digital modulated values is to use a Fourier type transformation on sets of digital modulated values. The modulation used in single carrier frequency division multiple access (SC-FDMA) that is used in the uplink of cellular LTE systems is an example of discrete Fourier transform (DFT) pre-coded OFDM techniques.

Orthogonal frequency division multiple access (OFDMA) is a multiple access technique that is based on OFDM. OFDMA is used for orchestrating access of multiple users to the wireless medium for transmission and reception. Systems where multiple-access is established through OFDMA may be referred to as OFDMA systems. In OFDMA systems, resource allocation is accomplished by allocating one or more subcarriers of one or more OFDM symbols to different users. Since OFDM symbols that are transmitted at different times represent time domain allocation resources, and subcarriers at different frequencies represent frequency domain allocation resources, the OFDMA resource allocation can also be referred to as time/frequency (T/F) resource allocation.

Two common modes for OFDMA resource allocation are multiple transmitters transmitting to a single receiver and a single transmitter transmitting to multiple receivers. The uplink transmission where multiple terminal nodes transmit to a single base station is an example of the case of multiple transmitters transmitting to a single receiver. The downlink transmission where a single base station is transmitting to multiple terminal nodes is an example of the case of a single transmitter transmitting to multiple receivers.

In the case that multiple transmitters are transmitting to a single receiver, individual transmitters transmit using T/F resources allocated for their transmission. The receiver receives a signal that is formed by superimposition of individual transmissions from the transmitters with each transmission transformed by the wireless channel. Knowing the T/F resources allocated to each of the transmitters, the receiver can separate transmitted data from each of the transmitters.

In the case that a single transmitter is transmitting to multiple receivers, sets of subcarriers of transmitted OFDM symbols in one or more OFDM symbols are allocated to the transmissions to different receivers. Each receiver knows its T/F resource allocation and can extract the data targeted for it.

In OFDMA transmission by multiple transmitters to a single receiver (e.g., uplink transmission in cellular systems), communications from individual transmitters should not negatively impact reception of signals from other transmitters. This may be accomplished by using one of the following techniques: (a) allocating resources such that no two transmitters transmit in a coinciding T/F resource (i.e., all transmitters using distinct T/F resources); (b) enable and orchestrate transmission of multiple transmitters using a coinciding set of resources (i.e., at least two OFDM transmissions at the same time and actively using the same subcarriers) and using special signal processing at the receiver to extract the transmission from the multiple transmitters. Technique (a) has a limitation of splitting T/F resources between distinct transmitters thus reducing the total throughput that can be obtained for a given T/F resource. In technique (b), at least some coinciding T/F resources are used by multiple transmitters. Reusing the T/F resources can increase the data rates and the number of transmitters supported by T/F resources. As a result, reusing the T/F resources is beneficial to increasing the network capacity.

In OFDMA transmission by a single transmitter to multiple receivers (e.g., downlink transmission in cellular systems), communications to individual receivers should not negatively impact transmissions to other receivers. This may be accomplished by using one of the following techniques: (1) allocating resources such that transmission to receivers are allocated to distinct T/F resources; (2) enable and orchestrate transmissions to multiple receivers using a coinciding set of resources and use special signal processing at receivers to extract the transmissions to each receiver. Technique (1) has the limitation of splitting T/F resources between distinct receivers thus reducing the total throughput that can be obtained for a given T/F resource. In technique (2), at least some coinciding T/F resources are used by multiple receivers. Reusing the T/F resources can increase the data rates and the number of receivers supported by T/F resources. As a result, reusing the T/F resources is beneficial to increasing the network capacity.

MIMO Techniques

Multiple transmissions of independent data streams by using coinciding T/F resource allocation has been enabled by recent developments in communication systems theory. These techniques are a subset of a family of techniques called multiple-input multiple-output (MIMO) techniques. In MIMO systems more than one antenna at either or both of the receiver and transmitter are used. In a specific class of MIMO techniques called spatial multiplexing (SM), multiple transmissions are resolved from each other through using multiple antennas and associated receiver chains at the receiver. In MIMO spatial multiplexing (MIMO-SM), the transmission data rate is increased by making multiple transmissions at coinciding T/F resources while using multiple transmitter and receiver antennas. Distinct groups of data to be transmitted are conceptually referred to as layers. For successful MIMO reception, channel conditions should support transmission and reception of multiple layers. The support of a channel for MIMO transmission may be measured with a parameter set that may include channel rank, condition number, and signal to noise ratio.

Other MIMO techniques include transmit diversity and receive diversity. In transmit diversity, the same information is either directly or in some coded form transmitted over multiple antennas. In receive diversity, multiple receiver antennas are used to increase the received signal quality. Any two or all of the techniques of transmit diversity, receive diversity, and spatial multiplexing may be used simultaneously in a system. For example, a MIMO-SM system may use transmit diversity in addition to receive diversity.

MIMO-SM techniques include single-user (SU) MIMO-SM and multi-user (MU) MIMO-SM techniques. In SU-MIMO-SM, multiple layers are transmitted by a transmitter at coinciding T/F resources and received by a receiver. In MU-MIMO-SM, multiple signals using common T/F resources are either transmitted by multiple transmitters and received by a receiver (e.g., uplink transmission in a cellular network) or transmitted by a single transmitter and received by multiple receivers (e.g., downlink transmission in a cellular network).

FIG. 18 is a block diagram illustrating single-user multiple-input multiple-output uplink communication in a communication network in accordance with aspects of the invention. FIG. 18 illustrates transmission of two layers using two transmitter antennas and two receiver antennas (2×2 SU-MIMO-SM). The communication network includes a terminal node 1810 with a MIMO transmitter 1815 that receives two layers (layer 1 and layer 2). The MIMO transmitter 1815 may perform a precoding operation on the two layers and transmit weighted combinations of signals associated with the layers from each of two transmitter antennas 1816, 1817. Alternatively, the precoding operation may be designed such that each of the transmitter antennas is used for transmitting a unique layer, for example, according to the LTE standard for uplink. The communication network includes a base station 1850 with a MIMO receiver 1855. The MIMO receiver 1855 receives the signals from the terminal node 1810 using two receiver antennas 1856, 1857 and works to decode the two layers.

In SU-MIMO-SM, to transmit a given number, S, of layers using common T/F resources, the relationship S<=min (Nt, Nr) should be satisfied. Here Nt is the number of antennas used for transmission and Nr is the number of antennas used for reception. If a transmitter has more than the minimum number of required transmitter antennas, the available antennas may be used in support of one or more of a transmit diversity mode, a pre-coding mode, and a beamforming mode. If the receiver has more than the minimum number of required receiver antennas, the available antennas may be in coordination in either or both of a receive diversity mode and a beamforming mode.

FIG. 19 is a block diagram illustrating multi-user multiple-input multiple-output uplink communication in a communication network in accordance with aspects of the invention. FIG. 19 illustrates two independent layers being independently transmitted by two transmitters to a single receiver. The communication network includes a first terminal node 1910 with a first transmitter 1915 and a second terminal node 1920 with a second transmitter 1925. The first transmitter 1915 processes a first layer (layer 1) and transmits the processed signal from a first transmitter antenna 1916. The second transmitter 1925 processes a second layer (layer 2) and transmits the process signal from a second transmitter antenna 1926. The communication network includes a base station 1950 with a MIMO receiver 1955. The MIMO receiver 1955 receives the signals from the first terminal node 1910 and the second terminal node 1920 using two receiver antennas 1956, 1957 and works to decode the two layers.

Although the transmitters in the communication network of FIG. 19 each transmit a single layer, a MU-MIMO-SM system may include one or more transmitters that transmit more than one layer. Similarly, a MU-MIMO-SM system may include multiple receivers that receive the signals from the terminal nodes. In MU-MIMO-SM transmission from multiple transmitters to a single receiver, the minimum number of antennas required at each transmitter is the number of layers transmitted by the transmitter, and the minimum number of antennas required at the receiver is total number of layers transmitted by all the transmitters to the receiver. If a transmitter has a greater number of antennas than the number of layers it is transmitting, the available antennas may be used in one or more of a transmit diversity mode, a pre-coding mode, and a beamforming mode to enhance reliability of transmission. If the receiver has more than the minimum number of required receiver antennas, the available antennas may be used in one or more of a receive diversity mode and a beamforming mode to enhance reliability of reception.

In MU-MIMO-SM transmission from a single transmitter to multiple receivers, the minimum number of antennas required at the transmitter is the total number of layers transmitted by the transmitter and the minimum number of antennas required at each receiver is the number of layers intended to be received by the receiver. If the transmitter has a greater number of antennas than the total number of layers being transmitted, the available antennas may be used in one or more of a transmit diversity mode, a pre-coding mode, and a beamforming mode to enhance reliability of transmission. If MU-MIMO-SM receivers are furnished with the minimum number of antennas, transmitter beamforming is typically used to mitigate inter-layer interference. If the number of antennas in an MU-MIMO-SM receiver is equal to or greater than the number of transmitted layers, it is possible for the receiver to process all received layers in a similar manner to processing SU-MIMO-SM transmissions. In such a case, transmitter beamforming may be omitted.

Channel Impacts on MIMO-SM OFDM Transmission

In MIMO-SM OFDM systems, each transmitter transmits an OFDM waveform. The transmitted OFDM waveforms are impacted by numerous conditions including transmitter chain and transmitter antenna distortions, wireless channel attenuation, delay and multipath fading artifacts, and receiver antenna and receiver chain distortions.

In OFDM, individual sub-streams carried in different sub-carriers can in principle be decoded independently of other sub-streams. Furthermore, data carried in a subcarrier can in principle be decoded independently of previous data carried in the same subcarrier. As a result, the impact of a channel to a transmitted waveform is typically characterized as an amplitude scaling and a phase shift for each subcarrier of transmitted OFDM symbols. The amplitude scaling and phase shift value impact of a channel to a subcarrier is characterized as the channel transfer function (CTF) for the subcarrier. The CTF value for a subcarrier is in general a complex number whose magnitude and phase determine the channel amplitude scaling and phase shift, respectively.

The impact of the channel on a transmitted signal may be the same or may vary across the transmitted allocated frequency band. A channel whose impact across frequency does not vary is called a frequency-flat channel. A channel whose impact across frequency varies is called a frequency-selective channel. In a frequency-flat channel, the CTF values for all subcarriers of OFDM symbols transmitted are the same. In a frequency-selective channel the CTF values for different subcarriers of OFDM symbols transmitted are not the same.

CTF values may also vary over time (e.g., from one OFDM symbol to another OFDM symbol). Such a channel is known as a time-varying channel.

Received OFDM symbols may be impacted by numerous electrical noise sources including ambient noise and receiver front end noise.

Figure 20:
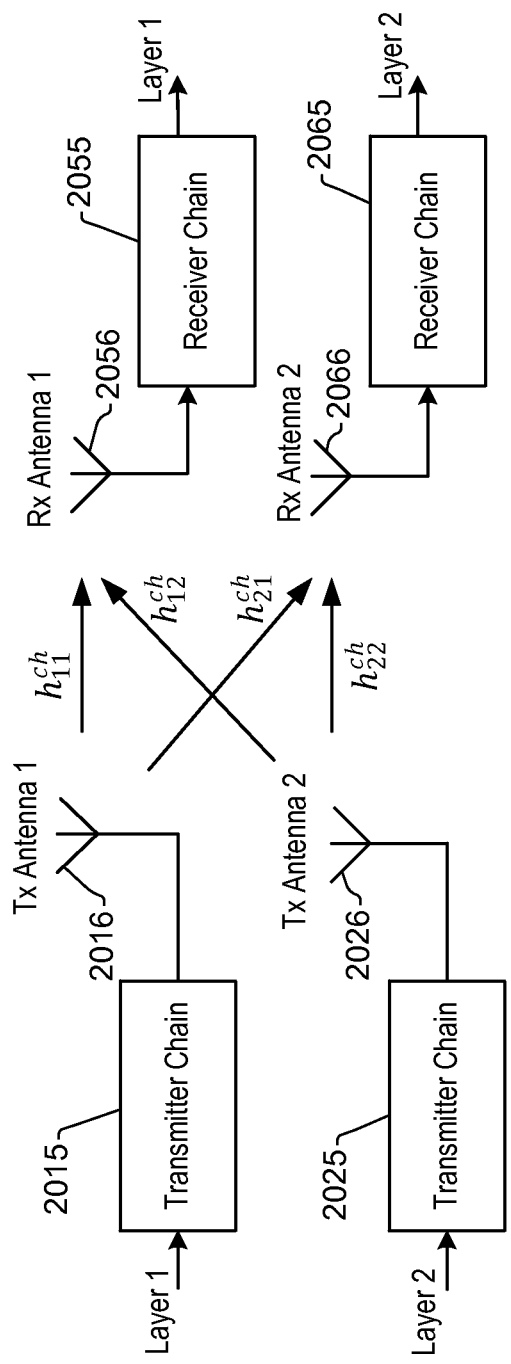
FIG. 20 is a block diagram of a communication system illustrating communication channels in a multiple-input multiple-output communication system in accordance with aspects of the invention.

FIG. 20 is a block diagram of a communication system illustrating communication channels in a multiple-input multiple-output communication system in accordance with aspects of the invention. The communication system includes a first transmitter chain 2015 transmitting a first layer (layer 1) from a first transmitter antenna 2016 and a second transmitter chain 2025 transmitting a second layer (layer 2) from a second transmitter antenna 2026. The transmitted signals are received by a first receiver chain 2055 using a first receiver antenna 2056 and a second receiver chain 2065 using a second receiver antenna 2066. The first receiver chain 2055 decodes the first layer and the second receiver chain 2065 decodes the second layer.

Since multiple transmissions use coinciding T/F resources in MIMO-SM, each of the receiver antennas receives in principle versions of signals from all transmitter antennas that are each impacted by the CTF between the particular transmitter and receiver antennas. The CTF values $h_{11}^{ch}$, $h_{12}^{ch}$, $h_{21}^{ch}$, $h_{22}^{ch}$ shown in FIG. 20 refer to complex CTF values between the specific antennas per each resource element of the transmission. Each of the transmitter chains and the receiver chains may impact the received value for each transmitted resource element. The techniques provided herein while referring to the CTF between particular transmitter and receiver antennas represented by CTF values $h_{11}{}^{ch}$, $h_{12}{}^{ch}$, $h_{21}{}^{ch}$, $h_{22}{}^{ch}$ also apply when the CTF values incorporate the impact of the transmitter chains and the receiver chains.

The communication system of FIG. 20 applies to both uplink and downlink communications. In the uplink case, the transmitter antennas 2016, 2026 may be colocated at a terminal node and may be transmitting two layers of a SU-MIMO-SM transmission to the two receiver antennas 2056, 2066 of a base station. Alternatively, the two antennas 2016, 2026 may be located at two different terminal nodes with each transmitting one layer of a two layer MU-MIMO-SM transmission to the two receiver antennas 2056, 2066 of a base station. In the downlink case, the transmitter antennas 2016, 2026 of a base station may be transmitting two layers of a SU-MIMO-SM transmission to the two receiver antennas of 2056, 2066 of a terminal node. Alternatively, the two antennas 2016, 2026 of a base station may be may be transmitting two layers of a MU-MIMO-SM transmission to receiver antenna 2056 of a first terminal node and receiver antenna 2066 of a second terminal node.

Receiver Processing of MIMO-SM OFDM Transmission

A MIMO-SM receiver processes received antenna outputs to recover transmitted multiple layers including resolving multiple transmissions at coinciding T/F resources. The receiver processing can include estimating CTFs that impact the transmitted layers.

To facilitate estimation of channel characteristics, a subset of the T/F resources may be used to provide a reference for the estimation. The transmitter inserts specific known values (reference values or known transmitted values) into specific T/F resources (reference value locations). The reference values and the reference value locations are known to both transmitter and receiver. Receivers then use information about received values at the reference value locations and the known transmitted values to identify the channel characteristic that impacted the transmitted signal. These reference values are referred to with different names in different wireless systems, for example, reference signal, pilot signal, cell specific reference signal (CRS), demodulation reference signal (DMRS), and channel state information reference signal (CSI-RS).

The nature of the CTF estimation depends on the type of MIMO-SM technique used in the transmitter. In systems where multiple layers of transmissions are supplemented by distinct reference signals prior to distribution of the layers to the same or a larger number of antennas that operate in a beamforming, pre-coding, or transmit diversity manner, the CTF estimation is typically conducted per transmit layer. This is the case in both uplink and downlink non-codebook based antenna pre-coding in LTE MIMO. In systems where multiple layers of transmissions are pre-coded and distributed for transmission to the same or a larger number of antennas with distinct reference signals inserted per each antenna, the CTF estimation is typically conducted per transmitter antenna. An example of such transmission is codebook based downlink transmission in LTE MIMO systems. Descriptions of many techniques herein are based on uplink LTE as example embodiments. As a result, CTF estimation per layer is described. The techniques that are described for CTF estimation per layer may be adapted to cases where CTF estimation is conducted per transmitter antenna.

A common family of techniques for CTF estimation uses cross-correlation operations between received reference signals and reference signals known to have been transmitted. If a cross-correlation operation is used for CTF estimation and more than one of the reference signals occupy the same T/F resources, non-orthogonality of reference signals can reduce CTF estimation fidelity.

Reception performance loss may be observed in a receiver if the receiver operates based on a flat-frequency channel model assumption when the actual channel characteristics are frequency-selective. For example, the capability to resolve multiple layers is based on orthogonality of reference signals in typical correlation based CTF estimators. At the same time, when exposed to a frequency-selective channel, the correlation properties of reference signals are impacted. Impact on correlation properties may cause losses in the CTF estimation accuracy.

For improved performance of the receiver in a frequency-selective channel, the receiver may employ a partitioning of the received signal frequency range into partial frequency ranges where the channel characteristics do not change significantly and thus may be considered frequency flat. Separate CTF values for each of the partial frequency ranges are then obtained. Estimation of the CTFs in each of the partial frequency ranges may require use of partial reference signals in the individual partial frequency ranges.

SU-MIMO-SM Resource Allocation

A terminal node that is transmitting in SU-MIMO-SM mode transmits multiple layers within a PUSCH. In Release 10 of the LTE standard there may be one, two, three, or four layers transmitted. The transmitted layers are fully overlapping (in the same-slot and using the same PRBs). The RSs for all layers are constructed to be orthogonal to each other. If the RSs were not orthogonal, channel estimation results would have reduced performance in correlation based CTF estimation due to interference of signals from different layers. The orthogonality of RSs in SU-MIMO-SM is accomplished by using "cyclic shifted" (in LTE terminology) versions of a base sequence. There are a maximum of 12 orthogonal cyclic shifts available in the LTE standards. The orthogonality of cyclic shifted RSs requires that the RS sequences are of equal length because the cyclic shifting operation in LTE is applied to the whole transmitted sequence. The orthogonality of RS sequences also requires that the RS sequences are transmitted in a fully overlapped mode (in the same-slot and using the same PRBs).

Figure 21:
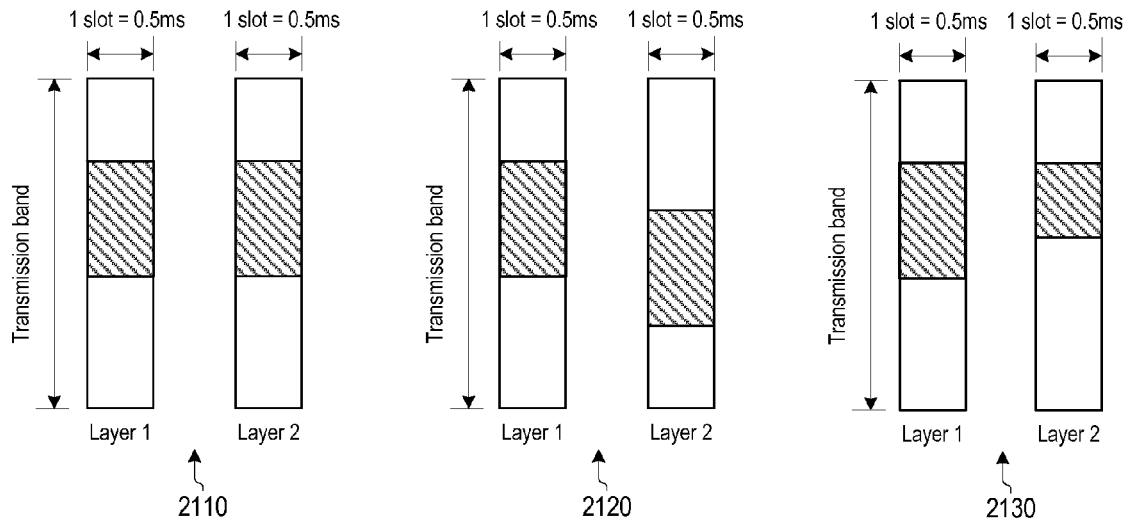
FIG. 21 is a diagram of multiple-input multiple-output layer size and overlap in accordance with aspects of the invention.

FIG. 21 is a diagram of examples of multiple-input multiple-output layer size and overlap in accordance with aspects of the invention. Through Release 12, the LTE standard does not allow transmissions of different sizes or with partially overlapping SU-MIMO-SM layers. A first example 2110 illustrates such transmissions with two fully overlapping layers of the same size. A second example 2120 includes two partially overlapping layers. A third example 2130 includes two partially overlapping layers with different sizes. Many other arrangements of transmission may also be used, for example, transmissions of different sizes that partially overlap.

Allowing different size and partially overlapping T/F resources may improve resource allocation flexibility. Such flexibility may be used to assign different layers to different data streams, each having different characteristics. For example, data streams with less data requirements may be assigned smaller layer sizes. Alternatively, modulation and coding schemes (MCS) may be assigned per data stream without requiring the use of equal sized T/F resource allocation for transmitted layers. This flexibility may be used to transmit data with higher reliability requirements using a more robust MCS. The use of a more robust MCS for a stream would result in a larger layer as compared to a stream with the same amount of pending data but which uses a more efficient MCS. Such a transmission is possible only if different sized layers are allowed.

Allowing different size or partially overlapping T/F resources necessitates CTF estimation when RSs are partially overlapped. A communication standard (e.g., LTE) may not guarantee that overlapping portions of RSs of different size or partially overlapping layers are orthogonal.

MU-MIMO-SM Resource Allocation

A terminal node that is transmitting in MU-MIMO-SM mode transmits one or more layers within a PUSCH transmission. One or more other terminal nodes transmit one or more layers using the same T/F resources. Successful demodulation separates the multiple layers from each other. The performance level attained in separation of the layers depends on the accuracy of CTF estimation. Use of orthogonal reference signals may increase CTF estimation accuracy. In Release 8 of the LTE standards, orthogonality of reference signals was assured by using same-length RS sequences that are cyclically shifted. This, in turn, establishes a restriction that all PUSCHs used by different terminal nodes must have same-size PUSCH allocation. This is quite restrictive as it may not be possible to find terminal nodes that have similar data requirements to justify same-size PUSCH use. As a result, benefits from the use of MU-MIMO are reduced.

An effort to remedy the resource allocation restriction on the PUSCH sizes of the terminal nodes participating in MU-MIMO-SM is made in Release 10 of the LTE standards. Available reference signals for uplink communication have been extended through the use of orthogonal cover codes (OCCs). OCCs are length-2 Walsh codes modulating the RS sequences in the two slots of an uplink sub-frame. For example, when two terminal nodes participate in MU-MIMO-SM, the first and the second RSs of the first terminal node in the first and second slots of a sub-frame may be modulated by the Walsh code[1 1] while the first and the second RSs of the second terminal node in the first and second slots may be modulated by the Walsh code[1 −1]. Use of OCC enables orthogonal reference signals even when the terminal nodes that participate in MU-MIMO-SM have non-equal PUSCH allocation sizes or when they do not overlap totally. As a result, accurate CTF estimation for multiple layers can be conducted. The concept of RS and OCC pairing can also be used for SU-MIMO-SM communication.

A limitation of using OCC to complement the RS sequences is the applicability in the presence of time variations of the channel. The basic assumption in use of OCCs is that the CTFs stay the same over a whole sub-frame. If there are CTF variations from the RS of the first slot to the RS of the second slot, the orthogonality of the reference signals obtained by RSs complemented with OCCs is lost. Thus use of OCCs in MU-MIMO-SM for the case when the channel characteristics vary across a sub-frame may cause performance loss. The case of one or more of the terminal nodes being mobile is an example of a situation where CTF variation across sub-frames can be detrimental to link performance when using MU-MIMO-SM. The reduction in link performance in turn impacts network-level performance figures, such as throughput.

As a result, it is desirable to develop techniques to use non-equal size PUSCH allocation for MU-MIMO-SM, including those not requiring OCC.

Use of Non-Orthogonal Sequences:

In the cases of both SU-MIMO-SM and MU-MIMO-SM and when the PUSCH allocation sizes for all the layers are the same, the requirement of orthogonal reference signals puts a limitation on the total number of available reference sequences. It is desirable to be able to use non-orthogonal sequences and yet not have the negative impacts of the use non-orthogonal sequences on the CTF estimation accuracy.

The circumstances that may cause the non-orthogonality include:

non-orthogonality of RSs generated for different size or partially overlapping layers in both MU-MIMO-SM and SU-MIMO-SM transmissions without use of OCCs;

use of non-orthogonal RSs having the same length for layers; and use of fragments of RSs for CTF estimation for reception in frequency-selective channels.

In addition to techniques for receiver signal processing that mitigate the impact of non-orthogonality of reference signals on CTF estimation at the receiver, techniques to independently use fragments of received reference signals for CTF estimation are disclosed. Techniques are also disclosed to perform equalization and detection of received signals by taking information on the layer structure of transmissions into account.

Disclosed techniques allow the use of various transmission techniques including:

transmission with non-equal size SU-MIMO-SM layers;

transmission with non-equal size allocation in MU-MIMO-SM where reference signal processing is made in a per slot basis; and transmission with non-orthogonal reference signals for equal size layers of SU-MIMO-SM and MU-MIMO-SM.

Figure 22:
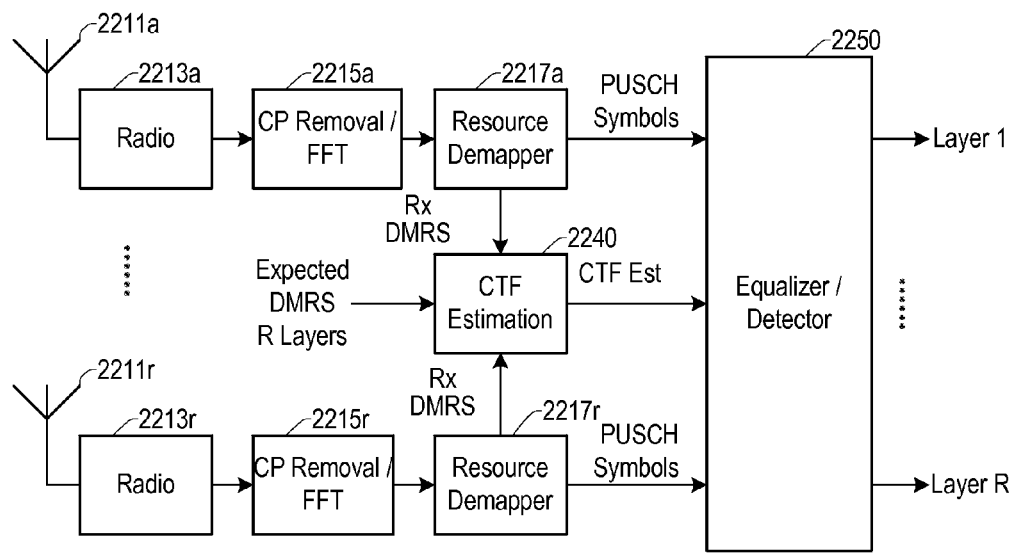
FIG. 22 is a block diagram of a multi-layer receiver in accordance with aspects of the invention.

FIG. 22 is a block diagram of a multi-layer receiver in accordance with aspects of the invention. The receiver includes R antennas 2211a-2211r (collectively 2211), R radio modules 2213a-2213r (collectively 2213), and R cyclic-prefix removal/FFT modules 2215a-2215r (collectively 2215). The radio modules 2213 receive outputs from the antennas 2211 and supply digital signals to the cyclic-prefix removal/FFT modules 2215. The radio modules 2213 may include modules such as the low-noise amplifier 510, the down-converter module 515, and the analog-to-digital converter module 520 of the receiver of FIG. 5. The cyclic-prefix removal/FFT modules 2215 receive outputs from the radio modules 2213 and perform OFDM processing such as cyclic prefix removal and Fast Fourier Transform (FFT) operations. The receiver of FIG. 22 is presented in simplified form to aid in understanding of the techniques described herein. Receivers may include additional functions, such functions include time, frequency, and frame synchronization, automatic gain control (AGC), automatic frequency control (AFC), analog-to-digital conversion (ADC). Although techniques may be described with reference to the receiver of FIG. 22, the techniques may be used with any apply to such suitable receiver.

It is assumed that the number of antennas at the receiver is equal to or larger than the number of transmitted layers. Furthermore, it is assumed that the receiver has the resource allocation map information for all the layers. A resource allocation map may include descriptions of T/F resources used for each of the layers being transmitted, reference signals used for each of the layers, and modulation and coding schemes used for each of the layers.

The receiver of FIG. 22 includes R resource demapper modules 2217a-2217r (collectively 2217) that select pertinent resource elements from the outputs of the cyclic-prefix removal/FFT modules 2215 (e.g., FFT outputs). Other receiver embodiments may have unequal numbers of antennas, radio modules, cyclic-prefix removal/FFT modules, and resource demapper modules. The resource elements are supplied to a CTF estimation module 2240 and an equalizer/ detector module 2250. The resource demapper module 2217 provides the frequency domain values that are in the T/F resource grid RS locations to the CTF estimation module 2240 and the frequency domain values that are in the T/F resource grid data locations to the equalizer/detector module 2250. The resource demapper module 2217 may operate in a manner where it stores all pertinent resource elements for a whole slot and then transfers RS and data elements for an entire slot to the CTF estimation module 2240 and the equalizer/detector module 2250. Alternatively, the resource demapper module 2217 may operate so that at the end of each OFDM symbol FFT operation, pertinent resource elements obtained from individual OFDM symbols are sent to the CTF estimation module 2240 or the equalizer/detector module 2250. The receiver of FIG. 22 may be implemented in the base station of FIG. 3. In an example embodiment, the radio modules 2213 may be provided by the transmitter/receiver module 379. In this example embodiment, the cyclic-prefix removal/FFT modules 2215, the resource demapper modules 2217, the CTF estimation module 2240, and the equalizer/detector module 2250 may be provided by the processor module 381.

Figure 23:
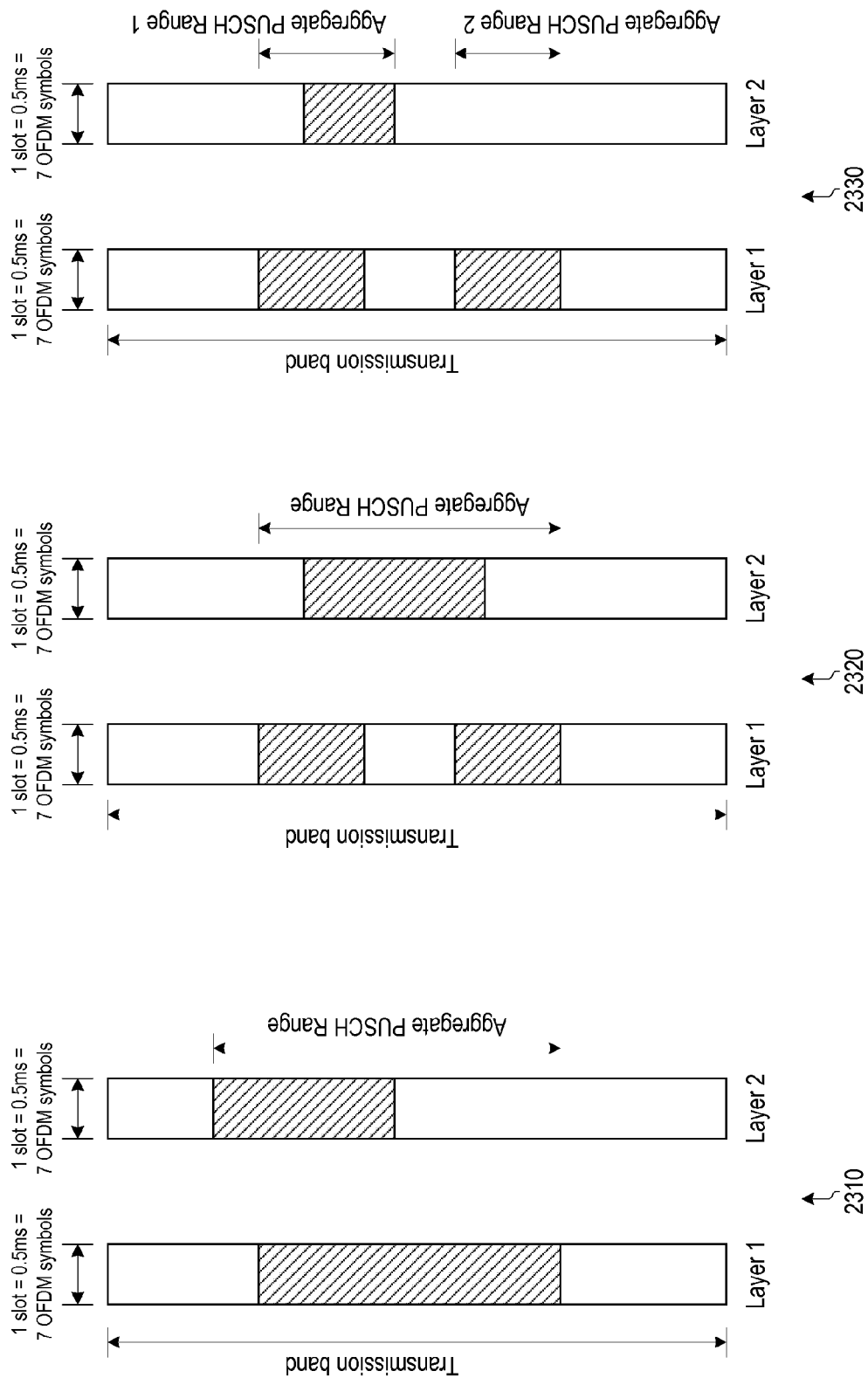
FIG. 23 is a diagram of aggregate physical uplink shared channel ranges in accordance with aspects of the invention.

FIG. 23 is a diagram of aggregate PUSCH ranges in accordance with aspects of the invention. The concept of aggregate PUSCH ranges can aid in understanding the receiver. Signals received by the receiver may contain single cluster or multi-cluster transmissions. In the case of reception of multi-layer transmissions sharing common T/F resources where all transmissions are single cluster transmissions, the aggregate PUSCH range is defined as the T/F resources grid range where all subcarriers in the range are used by at least one of the layers. The length of the aggregate PUSCH range in the frequency dimension may be referred to as aggregate PUSCH size. Aggregate PUSCH size may be measured in units of subcarriers or resource blocks. Example 2310 illustrates an aggregate PUSCH range for two layer transmission where both of the layers are single cluster.

In the case of the reception of transmissions sharing common T/F resources where one or more transmissions are multi-cluster transmissions, there may be only one T/F resources grid range where all subcarriers in the range are used by at least one of the layers. Similar to the case where all transmissions are single cluster transmissions, in such multi-cluster case, the aggregate PUSCH range is defined as the frequency range where all subcarriers in the range are used by at least one of the layers. Example 2320 illustrates aggregate PUSCH range determination for a two layer transmission with one single cluster layer and one two cluster layer in a single aggregate PUSCH range.

In the case of the reception of transmissions sharing common T/F resources where one or more transmissions are multi-cluster transmissions, there may be multiple disjoint T/F resource grid areas where one or more layers are present. In this case, disjoint areas of the T/F resource grid may be defined as separate aggregate PUSCH ranges and the techniques presented herein may be applied to each range. Example 2330 illustrates aggregate PUSCH range determination for a two layer transmission example with one single cluster layer and one two cluster layer and two aggregate PUSCH ranges.

Returning to FIG. 22, the CTF estimation module estimates the channel impact on transmitted signals. For the case of an LTE PUSCH transmission, The CTF estimation module processes the RS elements to produce estimated CTF values.

CTF Estimation Module

Figure 24:
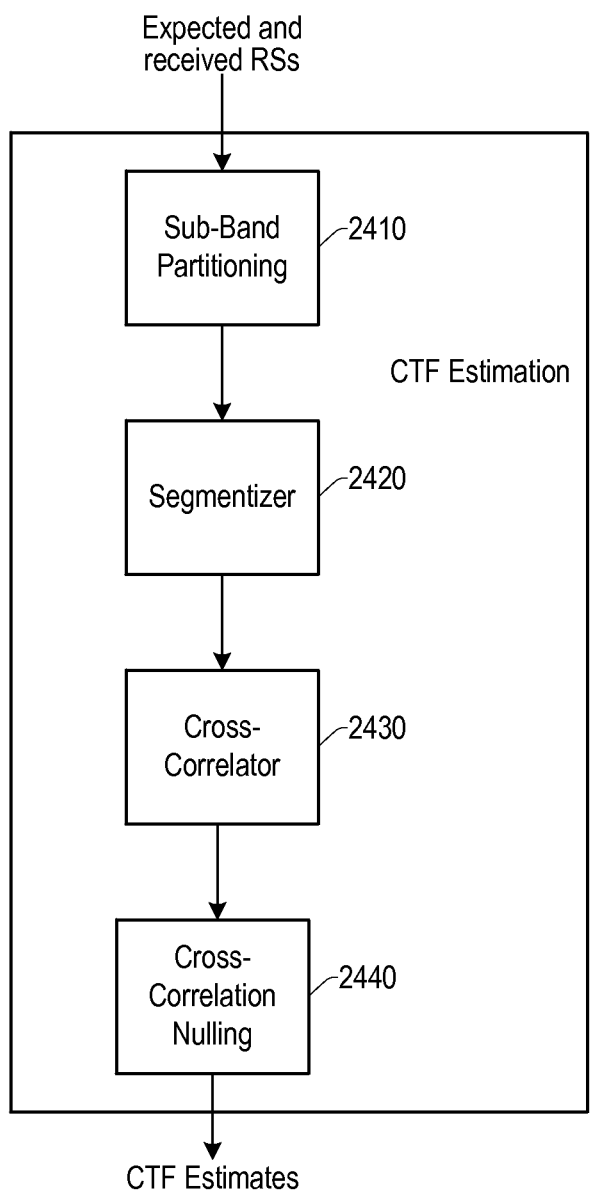
FIG. 24 is a block diagram of a channel transfer function estimation module in accordance with aspects of the invention.

FIG. 24 is a block diagram of a CTF estimation module in accordance with aspects of the invention. The CTF estimation module may, for example, implement the CTF estimation module 2240 of the receiver of FIG. 22. The CTF estimation module of FIG. 24 receives RS elements (expected and received) and produces estimated CTF values.

The CTF estimation module 2240 includes a sub-band partitioning module 2410, a segmentizer module 2420, a cross-correlator module 2430, and a cross-correlation nulling module 2440. By way of introduction, the sub-band partitioning module 2410 and the segmentizer module 2420, in combination, determine segments of aggregate PUSCH range over which cross-correlation operations are to be performed in the cross-correlator module 2430. The sub-band partitioning module 2410 determines the sub-bands of each aggregate PUSCH range within which channel characteristics do not significantly change. The segmentizer module 2420 determines segments by taking the size and overlap of the transmitted layers into account. The cross-correlator module 2430 calculates the cross-correlation between the portions of known transmitted RSs and the received values of RSs for each segment. The cross-correlation nulling module 2440 reduces inaccuracies in the CTF estimates that may occur due to non-orthogonality of the parts of the known transmitted RSs in each segment.

Sub-Band Partitioning

The sub-band partitioning module 2410 partitions aggregate PUSCH ranges into sub-bands in the frequency domain. A reason for partitioning is the potential for frequency selectivity in channel CTFs across the aggregate PUSCH range. The sub-band partitioning module 2410 may select the sub-bands so that channel characteristics do not significantly change within each of the sub-bands.

Figure 25:
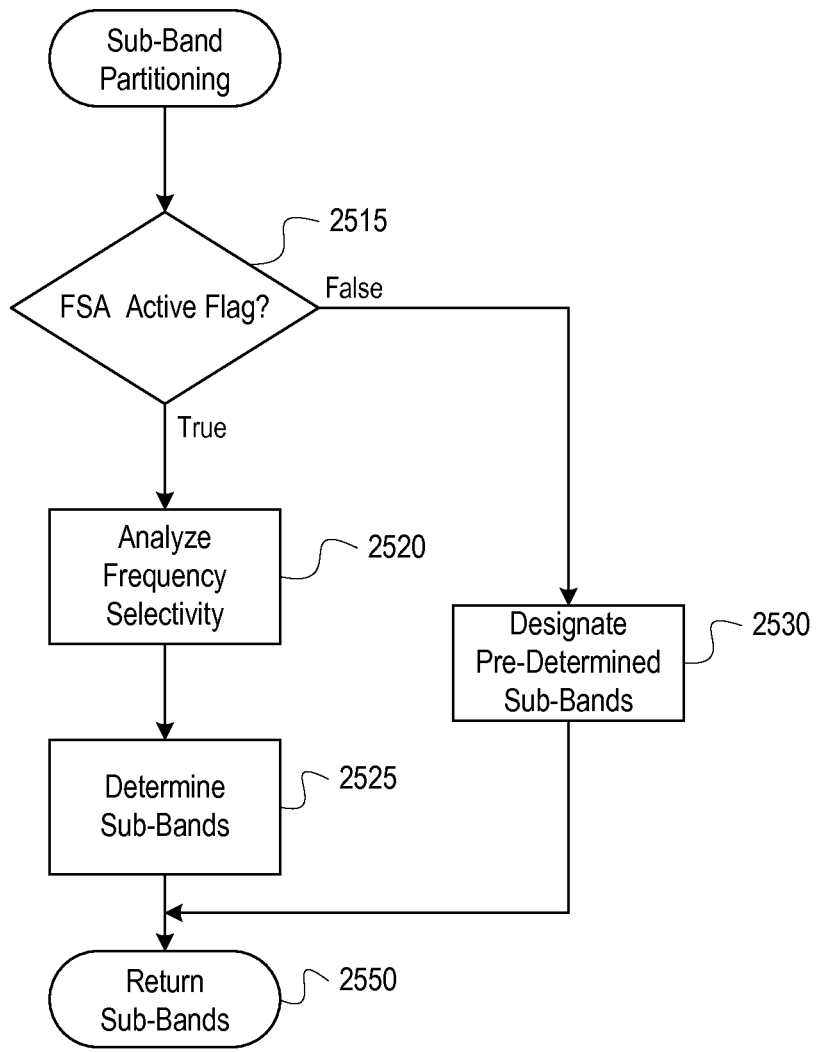
FIG. 25 is a flowchart of a process for sub-band partitioning in accordance with aspects of the invention.

FIG. 25 is a flowchart of a process for sub-band partitioning in accordance with aspects of the invention. The sub-band partitioning process of FIG. 25 can check whether the received PUSCHs display frequency selectivity.

In step 2515, the process determines whether a Frequency Selectivity Analyzer (FSA) Active Flag is set indicating that frequency selectivity analysis is to be conducted. If the FSA Active Flag is set, the process continues to step 2520; otherwise, the process continues to step 2530.

The FSA Active Flag may be set based on various criteria. For example, the FSA Active Flag may be a configurable parameter set, for example, by operator policy. Alternatively, the FSA Active Flag may be a dynamically adjusted variable. For example, the FSA Active Flag may be set if the aggregate PUSCH size is larger than a threshold value and not set if the aggregate PUSCH size is smaller than the threshold value. A rationale for such a use of a threshold is a higher likelihood of observing frequency selectivity in transmissions with larger aggregate PUSCH sizes.

Other criteria that may used in deciding whether to set the FSA Active Flag include one or more of (a) predetermined performance requirements for the reception of the layers; (b) received signal quality (e.g., as measured by a ratio of signal power to sum of noise and interference powers (SINR) metric, a channel quality indicator (CQI) metric, a received signal strength indicator (RSSI), metric, a reference signal receive power (RSRP) metric, and a reference signal receive quality (RSRQ) metric); and (c) modulation and coding scheme (MCS) values used for transmission of the layers.

The FSA Active Flag may, for example, be set if the aggregate PUSCH size is larger than a threshold and the MCS used for one or more of the layers is an element of a set of predetermined modulation and coding schemes that are relatively more sensitive to frequency selectivity. For another example, the FSA Active Flag may be set if the aggregate PUSCH size is larger than a threshold, the MCS used for one or more of the layers is an element of a set of predetermined modulation and coding schemes that are relatively more sensitive to frequency selectivity, and the received signal quality is below a received signal quality threshold. For another example, the FSA Active Flag may be set if the received signal quality is below a received signal quality threshold (e.g., determined by an offset from a received signal quality level required to provide a predetermined performance under frequency-flat channel characteristics). For another example, the FSA Active Flag may be set based on a decision function that relies on a collection of additional factors such as data traffic, channel conditions, receiver computational load, power consumption, PUSCH size, receiver mobility, and previously observed channel frequency selectivity characteristics.

In step 2530 (reached when the FSA Active Flag is not set), frequency selectivity analysis is not conducted and sub-bands are designated in a predetermined manner. The process may, for example, designate the whole aggregate PUSCH range as a single sub-band without any sub-band partitioning. Alternatively, the process may divide the aggregate PUSCH range into PUSCH range portions over which unique combinations of layer transmissions exist where PUSCH range portions occupy a contiguous set of subcarriers, and designate each of the portions as sub-bands. Alternatively, the process may divide the aggregate PUSCH range into sub-bands of a predetermined sub-band size. The process may designate the whole aggregate PUSCH range as a single sub-band if the aggregate PUSCH size is smaller than the predetermined sub-band size. An aggregate PUSCH range with aggregate PUSCH size larger than the predetermined sub-band size may be divided into portions of the predetermined sub-band size. If the aggregate PUSCH size is not a multiple of the predetermined minimum sub-band size, one or more of the sub-bands may have sizes smaller than the predetermined sub-band size.

Frequency Selectivity Analysis

In step 2520, the process analyzes frequency selectivity of the channel through which received signals arrived. The frequency selectivity analysis may be performed on the aggregate PUSCH range by processing the received resource element values from the reference signal locations of the aggregate PUSCH ranges for each of the receiver chains.

Figure 26:
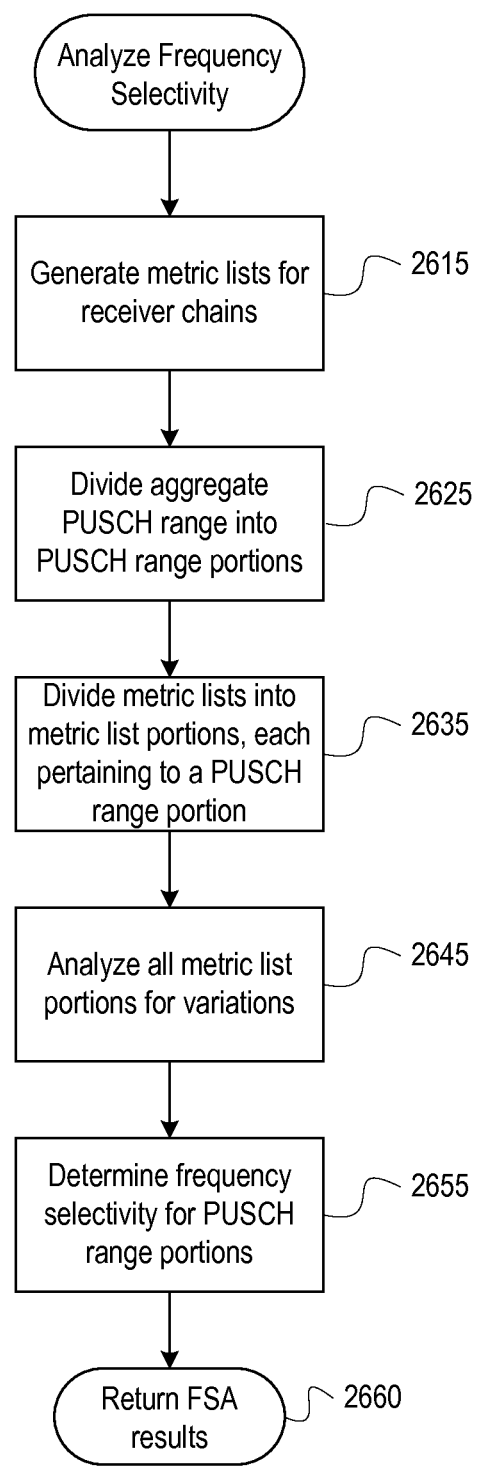
FIG. 26 is a flowchart of a process for analyzing frequency selectivity in accordance with aspects of the invention.

FIG. 26 is a flowchart of a process for analyzing frequency selectivity in accordance with aspects of the invention. The process may be used to implement step 2520 in the process for sub-band partitioning of FIG. 25.

In step 2615, the process applies one or more envelope detection functions to resource element values from reference signal locations for each receiver chain. Example envelope detection functions include an absolute value function, a magnitude squared function, a sum of absolute values of real and imaginary parts function, a sum of maximum among absolute values of real and imaginary parts scaled by a first scale factor added to minimum among absolute values of real and imaginary parts scaled by a second scale factor. Processing of the resource element values with the envelope detection function provides metrics related to resource elements. The sequence of metrics for each of the receiver chains may be referred to as a metric list.

In various embodiments, the metric lists may be formed by applying the envelope detection function to a reduced subset of resource element values from reference signal locations for each of the receiver chains. For example, every other resource element may be used to reduce computational requirements. Additionally, the metric lists may be further processed by averaging successive metric values to reduce distortions (e.g., impact of noise).

In step 2625, the process divides the aggregate PUSCH range into parts referred to as PUSCH range portions. PUSCH range portions are defined such that over each PUSCH range portion a unique combination of layer transmissions exist. PUSCH range portions occupy contiguous subcarriers.

In step 2635, the process divides each of the metric lists into metric list portions where elements of each of the metric list portions are from a specific PUSCH range portion. From this step, each of the PUSCH range portions there are R metric list portions where R is the number of receiver chains.

In step 2645, the process analyzes the metric list portions for deviations of the metric within a metric list portion. The process may declare a metric list portion relatively constant if the maximum deviation of every metric value from the average value of the metric values in the list is smaller than a threshold. The process may declare a metric list portion relatively non-constant if at least one metric value deviates from the average value of the metric values in the list by more than the threshold. The threshold may, for example, be defined as a percentage value. For example, consider the case where there are two receiver chains (R=2) and two metric list portions are of length 12, and with values {1.10 0.90 1.20 1.20 1.20 1.10 1.25 1.00 1.10 1.15 1.10 0.90} and {0.75 0.80 0.85 0.90 0.96 1.01 1.05 1.10 1.15 1.20 1.10 1.13}. The average values for two metrics list portions are 1.1 and 1.0. The deviation of the values in the metric list portions from their average values are then {0.00 0.20 0.10 0.10 0.10 0.00 0.15 0.10 0.00 0.050 0.00 0.20} and {0.25 0.20 0.15 0.10 0.04 0.01 0.05 0.10 0.15 0.20 0.10 0.13}. With a threshold defined as 20% of the average value, the threshold values for the two metric list portions are 0.22 and 0.20. Maximum deviation of all metric values from the average value for first metric list portion is smaller than the threshold for the metric list portion. Maximum deviation of all metric values from the average value for the second metric list portion is more than the threshold for the metric list portion. Thus, the first metric list portion may be declared as relatively constant and the second metric list portion may be declared as relatively non-constant. Other methods may be employed to determine whether a metric list portion is relatively constant or relatively non-constant. For example, the process may declare a metric list portion relatively non-constant if the ratio of standard deviation and mean of metric values (i.e., the standard deviation of the metric values divided by the mean of the metric values) in the metric list portion exceeds a threshold and may declare a metric list portion relatively constant if the ratio is smaller than the threshold. For another example, the process may declare a metric list portion relatively non-constant if digital representations of the metric values in the metric list portion do not have the same binary values in some number of most significant bits and may declare a metric list portion relatively constant if the digital representations of the metric values in the metric list portion have the same binary values in some number of most significant bits.

In step 2655, the process obtains frequency selectivity results for the PUSCH range portions. For example, if all metric list portions corresponding to a PUSCH range portion are found to be relatively constant, the PUSCH range portion may be determined to be frequency non-selective. If one or more metric list portions corresponding to a PUSCH range portion are found to be relatively non-constant, the PUSCH range portion may be determined to be frequency selective.

In step 2660, the process provides the FSA results, for example, to step 2525 in the process of FIG. 25. The FSA results may include a description of the PUSCH range portions. The PUSCH range portions may be specified with a list of indices for each of the subcarrier frequencies in each of the PUSCH range portions. Alternatively, each PUSCH range portion may be specified by a beginning index and a length identifier that specifies the length of PUSCH range portions in units of subcarriers or in units of resource blocks. Alternatively, the PUSCH range portions may simply be defined by a beginning index for the first PUSCH range portion and the lengths of the PUSCH range portions in units of subcarriers or in units of resource blocks. The FSA results may also include all metric list portions for each of the PUSCH range portions. The FSA results may also include a flag for each of the PUSCH range portions identifying whether a PUSCH range portion is found to be frequency selective or frequency non-selective.

Sub-Band Decisions

Returning to FIG. 25, in step 2525, the process analyzes the FSA results and PUSCH range portions to produce PUSCH range sub-bands. If all PUSCH range portions of an aggregate PUSCH range are found to be frequency non-selective, the process may designate the aggregate PUSCH range as a single sub-band. If at least one PUSCH range portion is found to be frequency selective, the process divides frequency-selective PUSCH range portions into PUSCH range sub-portions that are non-frequency selective or of a minimum size. The process then combines certain PUSCH range sub-portions and PUSCH range portions into PUSCH range sub-bands.

The process may use a recursive technique to divide the frequency-selective PUSCH range portions into PUSCH range sub-portions. For example, the process may process each frequency-selective PUSCH range portion as follows.

Step 1: If the PUSCH range portion includes fewer subcarriers than a minimum size threshold, the PUSCH range portion is not divided.

Step 2: If the PUSCH range portion include more subcarriers than a maximum size threshold, divide the PUSCH range portion into sub-portions. The process may, for example, divide the PUSCH range portion into a number (e.g., two) of equal size PUSCH range sub-portions.

Step 3: For each of the PUSCH range sub-portions identified in step 2, perform a frequency selectivity analysis. The process may, for example, perform frequency selectivity analysis using step 2645 and step 2655 of the FSA process of FIG. 26 with the metric list portions corresponding to the PUSCH range sub-portions. If the PUSCH range sub-portion is determined to be frequency non-selective, the process designates the PUSCH range sub-portion as frequency non-selective. If the PUSCH range sub-portion is found to be frequency selective, the process designates the PUSCH range sub-portion as frequency selective and returns to step 1 for further processing of the PUSCH range sub-portion.

After the above processing, the PUSCH range portions may include: 1) PUSCH range portions that were found to be frequency non-selective; 2) PUSCH range portions that were found to be frequency selective; 3) PUSCH range sub-portions that were found to be frequency non-selective; and 4) PUSCH range sub-portions that were found to be frequency selective. These PUSCH range portions and sub-portions may be combined to form PUSCH range sub-bands in various ways. For example, the process may combine PUSCH range portions and PUSCH range sub-portions that have different combinations of layer transmissions and found to be a frequency non-selective into larger portions. The resulting combined and non-combined PUSCH range portions and sub-portions are determined to be the PUSCH range sub-bands.

In step 2550, the process supplies, from the sub-band partitioning module 2410, a description of the determined PUSCH range sub-bands (or sub-band). The process may supply a list of PUSCH range sub-bands specified in various ways. For example, the list of PUSCH range sub-bands may be a list of indices for each of the subcarrier frequencies in each of the PUSCH range sub-bands, a list with each sub-band specified by a beginning index and a length identifier that specifies the length of a PUSCH range sub-band, or a list with a beginning index for the first PUSCH range sub-band and the lengths of the PUSCH range sub-bands. The lengths of the PUSCH range sub-bands may be, for example, in units of subcarriers or in units of resource blocks.

The process for sub-band partitioning of FIG. 25 may be modified by adding, omitting, reordering, or altering steps. For example, some embodiments may always perform frequency selectivity analysis and omit step 2515 and step 2530 and other embodiments may never perform frequency selectivity analysis and omit step 2515, step 2520, and step 2525.

Segmentizer Module

Returning to FIG. 24, the segmentizer module 2420 can divide PUSCH range sub-bands into PUSCH range segments over which distinct CTF estimations will be performed to provide CTF estimates specific to the PUSCH range segments. For each PUSCH range sub-band provided by the sub-band partitioning module 2410, the segmentizer module 2420 may use the layers transmitted in different parts of the sub-band to determine segments. The segmentizer module 2420 can determine the layers transmitted from information about the resource allocation map available at the receiver.

The segmentizer module 2420 may designate the frequency sub-bands provided to it by the sub-band partitioning module 2410 as segments without performing any further partitioning.

The segmentizer module 2420 may divide sub-bands into segments that allow CTF estimation over parts of a sub-band where there are fewer layers. This can reduce cross layer interference in a CTF estimate which can increase receiver performance. There exist different approaches to dividing a sub-band into one or more segments. For example, the process may, for each PUSCH range sub-band, proceed as follows.

Step 1. Examine the layers that have transmissions in the PUSCH range sub-band. If all of the layers fully occupy the PUSCH range sub-band, declare the whole PUSCH range sub-band as a PUSCH range segment. If one or more of the layers do not fully occupy the sub-band, PUSCH range segments may be obtained from the PUSCH range sub-band such that in each obtained PUSCH range segment there is a unique combination of layers. Such dividing may be performed by adding segment boundaries at the subcarrier frequencies for each boundary of each of the transmitted layers that do not fully occupy the PUSCH range sub-band. A segment boundary may be at a subcarrier frequency for which a transmitted layer occupies the PUSCH range sub-band below the segment boundary but does not use any subcarriers above the segment boundary. Alternately, a segment boundary may be at a subcarrier frequency for which a transmitted layer occupies the PUSCH range sub-band above the segment boundary but does not use any subcarriers below the segment boundary.

Step 2. When all PUSCH range sub-bands have been processed, determine the PUSCH range segments via inspection of the segment boundaries identified in step 1.

This process may result in the number of PUSCH range segments of a PUSCH range sub-band being as large as the number of regions of the PUSCH range sub-band where different combinations of layers are transmitted. An example for two layers is provided below.

The output of the segmentizer module 2420 may include a description of PUSCH range segments specified with a list similar to that used for PUSCH range sub-bands. The segmentizer module 2420 output may also include a description of the specific layers transmitted in each of the PUSCH range segments. In the case that the number of layers or the specific layers change within a segment, the segmentizer module 2420 output may also include an identification of T/F grid regions with distinct layer combinations within the PUSCH range segment and the identity of specific layers transmitted within each T/F frequency grid region.

Cross-Correlator

The cross-correlator module 2430 performs cross-correlation operations for each of the PUSCH range segments determined by the segmentizer module 2420 to produce CTF estimates. Cross-correlation may use the parts of known transmitted reference signals and received values of reference signals within each PUSCH range segment. Specific structures of cross-correlation for the special case of inter-cell interference resolution are described above for the case of layer transmissions from terminal nodes in different cells. Such correlation operations are applicable to PUSCH range segments with expected and received reference signals from layers transmitted by a single transmitter or from layers transmitted by multiple transmitters and received by one receiver (including with multiple receive chains) in a cell.

Cross-Correlation Nulling

The cross-correlation nulling module 2440 improves the CTF estimates from the cross-correlator module 2430 by reducing residual errors that may occur due to non-orthogonality in the parts of RSs used to calculate the CTF estimates. The cross-correlation nulling module 2440 may apply cross-correlation nulling (CCN) as described above. The PUSCH range segments determined by the segmentation module 2420 and the corresponding enhanced CTF estimates from the cross-correlation nulling module 2440 are supplied from the CTF estimation to the equalizer/detector module 2250.

The cross-correlation nulling module 2440 may always apply CNN or apply CCN conditionally (on an as needed basis). The cross-correlation nulling module 2440 may determine the need for CCN based on the results of one or more cross-correlations using the known, transmitted reference signal portions within a segment. For example, if a cross-correlation result is above a first correlation threshold, the cross-correlation nulling module 2440 may apply CCN. Alternatively, if the cross-correlation result is above the first correlation threshold, the cross-correlation result is compared to a second correlation threshold. The second correlation threshold may be determined based on one or more factors such as anticipated improvements from using CCN, the cost of performing the CCN operation (e.g., processing cycles, battery life), and the quality of the received signals, (e.g., signal to noise ratio). For example, a cost function may be based upon a weighted sum of the bit error rate (BER) improvement and the increase in battery current drain due to use of the CCN. The cross-correlation nulling module 2440 may omit CCN when only one layer is present across a PUSCH range segment.

Equalizer/Detector

Returning to FIG. 22, the equalizer/detector module 2250 takes into account the enhanced CTF estimates provided by the CTF estimation module 2240 and the knowledge of layers transmitted within each segment. The equalizer/detector module 2250 may operate on a per segment basis while taking into account the number of layers in each of the PUSCH range segments. The dimensionality of equalization and detection operations may be limited to the number of layers transmitted within the segment. This technique may provide higher performance since the impact of noise and disturbances may be reduced in higher dimensionality equalization processes.

The equalizer/detector module 2250 may also perform a diversity combining operation, for example, when the number of transmitted layers is less than the number of receiver chains. In the equalizer/detector module 2250, the CTF values calculated for each PUSCH range segment may be used for equalization and detection of the resource elements within the same PUSCH range segment. Additionally or alternatively, a CTF estimate of one PUSCH range segment may be used for equalization and detection of resource elements in one or more other PUSCH range segments.

The described techniques for CTF estimation, equalization, and detection may be used with receiver architectures other the receiver of FIG. 22. For example, an alternative receiver architecture may employ multiple receiver chains that are each focused on reception of a single layer. In such a receiver architecture, each receiver chain may have a specific aggregate PUSCH range defined as the frequency range for the layer that is being received by the receiver chain. Other layer transmissions in the frequency range of the desired layer are then considered in the CTF estimation, equalization, and detection process, and the layer transmissions outside of the receiver specific aggregate PUSCH range are ignored.

Example of Two Layer Transmission

Figure 27:
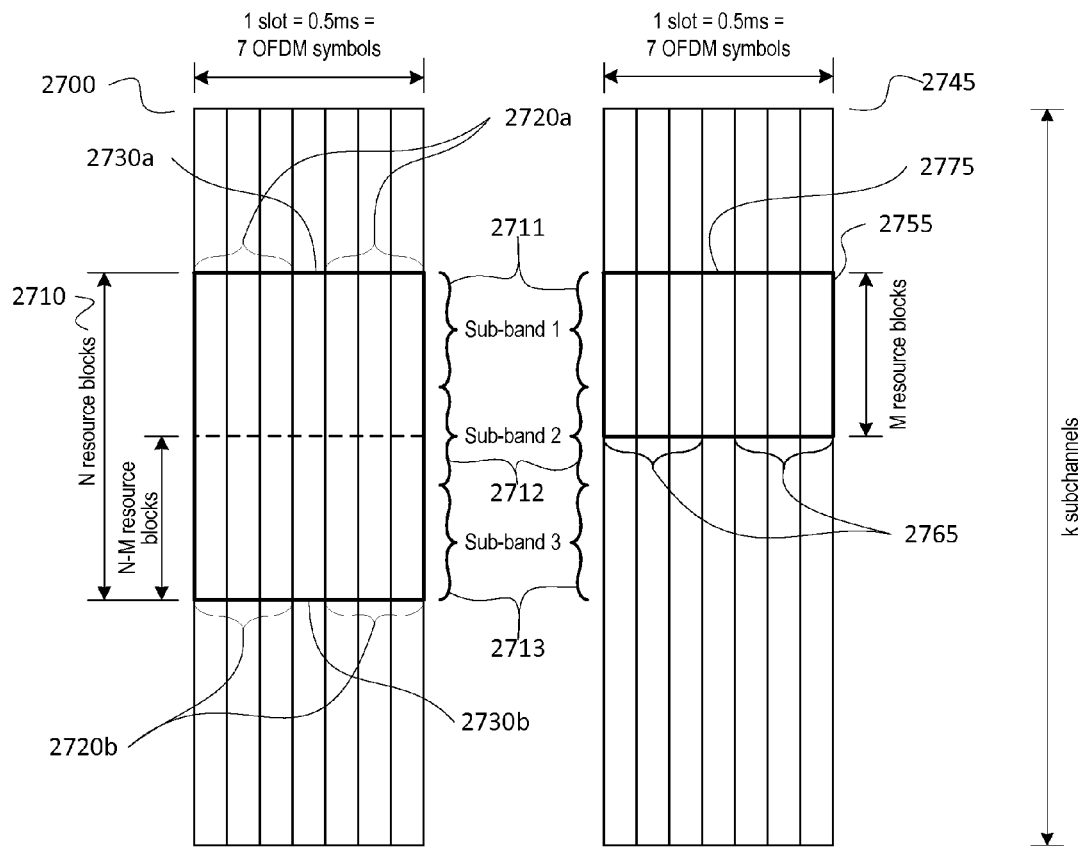
FIG. 27 is a diagram of an uplink transmission of two layers in subcarriers of a slot in accordance with aspects of the invention.

FIG. 27 is a diagram of an uplink transmission of two layers in subcarriers of a slot in accordance with aspects of the invention. The two layers are OFDM modulated and transmitted through two antennas to a wireless medium. The transmission may be a SU-MIMO-SM transmission as illustrated in FIG. 18 where the two layers are non-equal size transmission layers from a single terminal node to a base station. Alternatively, the transmission may be a MU-MIMO-SM transmission as illustrated in FIG. 19 where the layers are non-equal size layers transmitted by two terminal nodes that transmit to a single base station.

FIG. 27 shows a PUSCH transmission 2710 of a first layer (Layer 1) in slot 2700 from a first terminal node and a PUSCH transmission 2755 of a second layer (Layer 2) in slot 2745 from a second terminal node. Slot 2700 and slot 2745 are at the same time. PUSCH transmission 2710 includes a data element 2720 in the first three and last three OFDM symbols. PUSCH transmission 2710 includes a reference signal 2730 in the middle OFDM symbol of slot 2700. The PUSCH transmission 2755 includes a data element 2765 in the first three and last three OFDM symbols. The PUSCH transmission 2755 includes a reference signal 2775 in the middle OFDM symbol of slot 2745.

The first M resource blocks of PUSCH transmission 2710 and the M resource blocks of PUSCH transmission 2755 overlap in time and frequency. A first data element portion 2720a of data element 2720 overlaps with data element 2765 of PUSCH transmission 2755. A first RS portion 2730a of reference signal 2730 of PUSCH transmission 2755 overlaps with reference signal 2775 of PUSCH transmission 2755. A second data element portion 2720b of data element 2720 of PUSCH transmission 2710 does not overlap with data element 2765 of PUSCH transmission 2755. A second RS portion 2730b of reference signal 2730 of PUSCH transmission 2755 does not overlap with reference signal 2775 of PUSCH transmission 2755. The second data element portion 2720b and the second RS portion 2730b occupy N-M resource blocks.

PUSCH transmission 2710 (Layer 1) involves N contiguous resource blocks and PUSCH transmission 2755 (Layer 2) involves M contiguous resource blocks. In the example transmission of FIG. 27, N>M so there are data resource elements and reference signal portions of Layer 1 (PUSCH transmission 2710) that have no coinciding portions in Layer 2. PUSCH transmission 2710 contains a reference signal 2730 that is 12*N subcarriers long in the fourth OFDM symbol of the slot and PUSCH transmission 2755 contains a reference signal 2775 that is 12*M subcarriers long in the fourth OFDM symbol of the slot.

The transmissions will be described with reference to the wireless channel shown in FIG. 20. From a receiver CTF estimation and equalization viewpoint, SU-MIMO-SM and MU-MIMO-SM share a common framework and the disclosed techniques apply to both SU-MIMO-SM and MU-MIMO-SM.

Reception of the transmissions will be described with reference to the receiver of FIG. 22 with R=2. However, any suitable receiver may be used. For R=2, the receiver has two antennas and two paths for processing received signals. Resource demapper inputs at OFDM symbol index i, and subcarrier index j can be described as $$y_1 = h_{11}^{ch} x_1 + h_{12}^{ch} x_2 + n_1$$

$$y_2 = h_{21}^{ch} x_1 + h_{22}^{ch} x_2 + n_2 \quad (30)$$

The indices i and j are omitted from the equation (30) for easier readability. In the above equations:

- $y_1$ is the input of the first resource demapper module 2217a;
- $y_2$ is the input of the second resource demapper module 2217r;
- $x_1$ is the transmitted resource element value from Layer 1;
- $x_2$ is the transmitted resource element value from Layer 2;
- $h_{11}^{ch}$ is the CTF value for Layer 1 resource elements through the wireless channel from the first transmitter antenna 2016 to the first receiver antenna 2056 (antenna 2211a in FIG. 22);
- $h_{12}^{ch}$ is the CTF value for Layer 2 resource elements through the wireless channel from the second transmitter antenna 2026 to the first receiver antenna 2056;
- $h_{21}^{ch}$ is the CTF value for Layer 1 resource elements through the wireless channel from the first transmitter antenna 2016 to the second receiver antenna 2066 (antenna 2211r in FIG. 22);
- $h_{22}^{ch}$ is the CTF value for Layer 2 resource elements through the wireless channel from the second transmitter antenna 2026 to the second receiver antenna 2066; and
- $n_1$ and $n_2$ are the noise values impacting values at the first resource demapper module 2217a and the second resource demapper module 2217r.

An example sequence of operations for the reception of the example layers illustrated in FIG. 27 is now described. For this example, the sub-band partitioning module 2410 divided the aggregate PUSCH range into three distinct sub-bands (a first sub-band 2711, a second sub-band 2712, and a third sub-band 2713). In the first sub-band 2711, Layer 1 and Layer 2 are transmitted and both layers fully occupy the frequency range of the first sub-band 2711. In the second sub-band 2712, although transmission from both Layer 1 and Layer 2 exist, the transmission of Layer 1 fully occupies the second sub-band 2712 whereas the transmission of Layer 2 only partially occupies the second sub-band 2712. In the third sub-band 2713, there is only transmission of Layer 1.

The segmentizer module 2420 operates on the three sub-bands as follows.

For the first sub-band 2711, because the overlap between layers is across the whole sub-band, the segmentizer module 2420 may define all of the first sub-band 2711 as one segment.

For the second sub-band 2712, the segmentizer module 2420 may define all of the second sub-band 2712 as one segment. In such a case, the CTF estimation for resource elements in the second sub-band 2712 may use reference signal components transmitted in Layer 1 and Layer 2 that coincide in the second sub-band 2712. Alternatively, the segmentizer module 2420 may define two segments for the second sub-band 2712. The first segment is the portion of the frequency band where there are both Layer 1 and Layer 2 transmissions, and the second segment is the portion of the frequency band where there is only Layer 1 transmission. This allows the CTF estimation for the non-coinciding parts of Layer 1 (in the second segment) to be based on the reference signal portion of the Layer 1 reference signal without cross-layer interference from Layer 2.

For the third sub-band 2713, because only Layer 1 is present, the segmentizer module 2420 may define all of the third sub-band 2713 as one segment.

Cross-Correlation

For the first sub-band 2711 (defined as one segment by the segmentizer module 2420), a basic CTF cross-correlation procedure can be conducted for CTF estimation. For CTF estimates $h_{11}$, $h_{12}$, $h_{21}$, $h_{22}$ for estimation of $h_{11}^{ch}$, $h_{12}^{ch}$, $h_{21}^{ch}$, $h_{22}^{ch}$, respectively, the cross-correlator module 2430 may calculate the CTF estimates as follows:

- $h_{11}$ by cross-correlation at zero delay of x and y where x is the reference signal portion within the first sub-band 2711 expected to be transmitted with Layer 1 and y is the received resource element values from the first resource demapper module 2217a at corresponding locations;
- $h_{12}$ by cross-correlation at zero delay of x and y where x is the reference signal portion within the first sub-band 2711 expected to be transmitted with Layer 2 and y is the received resource element values from the first resource demapper module 2217a at corresponding locations;
- $h_{21}$ by cross-correlation at zero delay of x and y where x is reference signal portion within the first sub-band 2711 expected to be transmitted with Layer 1 and y is the received resource element values from the second resource demapper module 2217r at corresponding locations; and
- $h_{22}$ by cross-correlation at zero delay of x and y where x is reference signal portion within the first sub-band 2711 expected to be transmitted with Layer 2 and y is the received resource element values from the second resource demapper module 2217r at corresponding locations.

For the second sub-band 2712, as described above, there is more than one option for segments. When the segmentizer module 2420 leaves all of the second sub-band 2712 as one segment, the cross-correlator module 2430 may apply the same procedure used for the first sub-band 2711 to the second sub-band 2712.

For the second sub-band 2712, when the segmentizer module 2420 segments the second sub-band 2712 into two segments (the first segment being the frequencies where there are both Layer 1 and Layer 2 transmissions, and the second segment being the frequencies where there is only Layer 1 transmission), the cross-correlator module 2430 may produce two sets of CTF estimates corresponding to the first and second segments.

The cross-correlator module 2430 may calculate the first set of CTF estimates as follows:

$h_{11}$ by cross-correlation at zero delay of x and y where x is the reference signal segment transmitted with Layer 1 within the first segment of the second sub-band 2712 and y is the received resource element values from the first resource demapper module 2217a at corresponding locations;

$h_{12}$ by cross-correlation at zero delay of x and y where x is the reference signal segment transmitted with Layer 2 within the first segment of the second sub-band 2712 where there are transmissions at both Layer 1 and Layer 2 and y is the received resource element values from the first resource demapper module 2217a at corresponding locations;

$h_{21}$ by cross-correlation at zero delay of x and y where x is the reference signal segment transmitted with Layer 1 within the first segment of the second sub-band 2712 and y is the received resource element values from the second resource demapper module 2217r at corresponding locations; and $h_{22}$ by cross-correlation at zero delay of x and y where x is the reference signal segment transmitted with Layer 2 the first segment of the second sub-band 2712 and y is the received resource element values from the second resource demapper module 2217r at corresponding locations.

The cross-correlator module 2430 calculates the second set of CTF estimates based on the second segment. Since there is only transmission of Layer 1 in the second segment, only CTF estimates $h_{11}$ and $h_{21}$ are calculated. The cross-correlator module 2430 may calculates the CTF estimates as follows:

$h_{11}$ by cross-correlation at zero delay of the reference signal segment transmitted with Layer 1 in the second segment of the second sub-band 2712 with the received frequency domain T/F resource grid resource element values from the first resource demapper module 2217a at corresponding locations; and $h_{21}$ by cross-correlation at zero delay of the reference signal segment transmitted with Layer 1 in the second segment of the second sub-band 2712 with the received resource element values from the first resource demapper module 2217a at corresponding locations.

For the third sub-band 2713, there is only transmission of Layer 1 and only the CTF estimates $h_{11}$ and $h_{21}$ are calculated. The cross-correlator module 2430 may calculates the CTF estimates as follows:

$h_{11}$ by cross-correlation at zero delay of the reference signal segment transmitted with Layer 1 in the third sub-band 2713 with the received resource element values from the first resource demapper module 2217a at corresponding locations; and $h_{21}$ by cross-correlation at zero delay of the reference signal segment transmitted with Layer 1 in the third sub-band 2713 with received frequency domain T/F resource grid resource element values from the first resource demapper module 2217a at corresponding locations.

Cross-Correlation Nulling

The cross-correlation nulling module 2440 can improve the above CTF estimates when degraded by non-orthogonality between reference signal segments. Example CCN calculations will be provided in detail for the first sub-band 2711. CCN in the other PUSCH range sub-bands (with multiple layers) may calculated in a similar manner. CCN can be omitted when only a single layer is transmitted in a PUSCH range segment.

The enhanced CTF estimates for $h_{11}$, $h_{12}$, $h_{21}$, $h_{22}$ are denoted $h'_{11}$, $h'_{12}$, $h'_{21}$, $h'_{22}$, respectively. The cross-correlation nulling module 2440 can calculate the enhanced CTF estimates using:

$$\hat{H}' = \hat{H}C^{-1} \tag{31}$$

Where the enhanced CTF estimates are in matrix notation:

$$\hat{H}' = \begin{bmatrix} h'_{11} & h'_{12} \\ h'_{21} & h'_{11} \end{bmatrix} \tag{32}$$

and matrix C is given by $$C = \begin{bmatrix} 1 & c_1 \\ c_1^* & 1 \end{bmatrix} \tag{33}$$

with $$c_1 = \text{cxcorr}(R_A, R_B) \tag{34}$$

Where the cxcorr(arg 1, arg 2) operation is cross-correlation at zero delay of arg 1 and arg 2, $R_A$ is the reference signal portion of a PUSCH range segment within a PUSCH range sub-band that is expected to be transmitted with Layer 1, and $R_B$ is the corresponding reference signal portion expected to be transmitted with Layer 2. In the first sub-band 2711, the PUSCH range segment is the entire PUSCH range sub-band, and hence $R_A$ and $R_B$ are the reference signal portions of the entire PUSCH range sub-band.

Similar CCN operation can apply to the CTF estimates obtained for the first segment of the second sub-band 2712.

Equalization/Detection

For the first sub-band 2711 (designated as one segment), the equalizer/detector module 2250 can perform two-dimensional equalization and detection.

For the second sub-band 2712 (when designated as one segment), the equalizer/detector module 2250 can also perform two-dimensional equalization and detection.

For the second sub-band 2712 (when designated as two segments with the first segment having both Layer 1 and Layer 2 transmissions and the second segment having only Layer 1 transmission), the equalizer/detector module 2250 can perform two-dimensional equalization and detection. For the second segment, the equalizer/detector module 2250 can perform one-dimensional equalization and detection. In addition, a diversity combining process may be used for reception of the transmission of Layer 1 in segment 2 where equalized reception from the two receiver chains is combined to provide improved reception reliability.

For the third sub-band 2713 (designated as one segment), the equalizer/detector module 2250 can perform one-dimensional equalization and detection. Diversity combining may also be used for reception of the third sub-band 2713.

The equalizer/detector module 2250 may use the CTF estimate of each segment for equalization and detection of the resource elements within the same segment. Alternatively, the equalizer/detector module 2250 may also utilize estimates from other segments. For example, for the second sub-band 2712 with two segments (the second segment having no Layer 2 transmission), the CTF estimate obtained for the second segment is not effected by cross layer interference. Thus, it may be possible to get a higher quality estimate for $h_{11}$ and $h_{21}$. As a result, the equalizer/detector module 2250 may use the CTF estimates for the second segment the second sub-band 2712 for equalization performed for the first segment of the second sub-band 2712. Alternatively, the equalizer/detector module 2250 may use a combination of the estimates for $h'_{12}$ and $h'_{22}$ from the first segment of the second sub-band 2712 and estimates for $h_{11}$ and $h_{21}$ from the second segment of the second sub-band 2712. For example the combination of the estimates $h''_{11}$ and $h''_{12}$ may be obtained by averaging according to $h''_{11}=(h'_{11}+h_{11})/2$, and $h''_{12}=(h'_{12}+h_{12})/2$.

According to the LTE standard through Release 12, orthogonality of SRS transmissions by multiple terminal nodes to a base station in the same subframe is accomplished through comb type resource allocation of SRS sequence elements or through overlapping transmissions of cyclic shifted versions of an SRS sequence. The techniques presented herein can allow flexible SRS scheduling of non-orthogonal SRSs in the same subframe. The non-orthogonal SRSs may, for example, be obtained by use of non-equal length SRSs that partially overlap.

DL SU-MIMO

Many of the techniques described herein for uplink communications may also be adapted to downlink communications. For example, DL SU-MIMO communications may apply cross-correlation nulling (CCN) and joint-decoding methods.

The multi-layer receiver of FIG. 22 may be located in a terminal node and used to receive DL SU-MIMO transmissions from a base station. In such a terminal node, the outputs of the resource demapper modules 2217 may be PDSCH symbols and RSs. In communications according to the LTE standard, OFDMA transmission waveforms used in the downlink differ from the SC-FDMA transmission waveforms used in the uplink with the multi-layer receiver modified accordingly.

In DL SU-MIMO, overlapping T/F resources may be utilized by two or more layers being transmitted to the terminal node. A DL SU-MIMO transmission may include the use of reference signals, for example, one or more of LTE DMRS, CRS, and CSI-RS. In certain transmission scenarios, a reference signal associated with one layer may be transmitted on the same T/F resources as a different reference signal transmitted on another layer. In other transmission scenarios, unique RSs may each be assigned to a different antenna (e.g., in LTE this is termed an antenna port which follows layer precoding) and transmitted using overlapping T/F resources. Unless noted otherwise, the following descriptions assume that the RSs are each assigned to a different transmission layer and CTF and CTF estimates are determined per transmission layer. The same or similar methods applied to RSs assigned per transmission layer may be applied to transmission modes in which the RSs are each assigned to different antennas with CTF and CTF estimates determined per antenna.

An example of RSs assigned per layer is LTE DL transmission mode 9 where a unique DMRS is assigned to each layer. Two or more DMRSs may be assigned to overlapping T/F resources. If overlapping DMRSs are not orthogonal, the channel estimation output of the CTF estimation module 2240 may be degraded. This may occur, for example, in LTE enhancements for "massive MIMO." To compensate for non-orthogonal RSs, cross-correlation nulling (CCN) methods may be used to improve the quality of CTF estimation. The expected RSs, an input to the CTF estimation module 2240, may be known by the DL SU-MIMO receiver through methods defined by a communication standard, such as LTE. Additional methods, for example, as described herein, may also be employed to improve the operation of the equalizer/detector module 2250 of the receiver in such scenarios. For example, methods similar to those described for LTE PUSCH and LTE uplink RSs may be applied to LTE PDSCH and LTE downlink reference signals.

DL MU-MIMO-SM

In DL MU-MIMO, multiple signals using common T/F resources are transmitted by a single transmitter (e.g., an access node) and received by multiple receivers (e.g., terminal nodes). A DL MU-MIMO transmission may also include the use of reference signals, such as DMRS, CRS, and CSI-RS or LTE. In certain transmission scenarios, unique RSs may each be assigned to a different transmission layer and transmitted using overlapping T/F resources. For example, in LTE DL transmission mode 9, a DMRS is assigned to each layer. Two or more DMRSs may be assigned to overlapping T/F resources.

FIG. 28 is a block diagram illustrating multi-user multiple-input multiple-output downlink communication in a communication network in accordance with aspects of the invention. A base station 2850 transmits to a first terminal node 2810 and a second terminal node 2820. FIG. 28 illustrates two layers being independently transmitted by one transmitter to two receivers. The communication network includes a base station 2850 with a MIMO transmitter 2855. The MIMO transmitter 2855 processes a first layer (layer 1) and a second layer (layer 2) and transmits the layers using two transmitter antennas 2856, 2857. The communication network includes a first terminal node 2810 with a first receiver 2815 and a second terminal node 2820 with a second receiver 2825. The first receiver 2815 receives signals using a first receiver antenna 2816 and works to decode the first layer. The second receiver 2825 receives signals using a second receiver antenna 2826 and works to decode the second layer.

In FIG. 28, each terminal node has a single antenna. In this scenario, each terminal node is able to receive a single transmission layer from the base station 2850. For example, LTE DL transmission mode #8 uses beamforming on the base station to enable the transmission of two layers, each layer being received by one of two terminal nodes. A transmission such as this may be received by the terminal nodes, each having a single receiver chain. Each receiver in FIG. 28 may be the receiver of FIG. 22 having a single antenna and receiver chain (R=1). The CTF estimation module 2240 and the equalizer/detection module 2250 are present in the first terminal node 2810 and the second terminal node 2820. The CTF estimation modules in the terminal nodes may have access to the expected RS only for the layer transmitted to that terminal node. If overlapping RSs (e.g., DMRSs) are not orthogonal, the channel estimation output of the CTF estimation module 2240 may be degraded. The communication system of FIG. 28 may be extended for various combinations of numbers of terminal nodes, numbers of receiver antennas per terminal node, and numbers of layers transmitted to each terminal node.

The expected RSs used in some or all layers transmitted by the base station for reception by other terminal nodes ("other expected RSs") may be signaled from the base station to a terminal node to improve reception of the layer intended for that terminal node. For example, the expected RS for the layer transmitted to the second terminal node 2820 may be signaled to the first terminal node 2810. Alternatively, the base station 2850 may signal the expected RS to the second terminal node 2820 in such a manner that the first terminal node 2810 can also receive the information, for example, in downlink bandwidth allocation messages transmitted by the base station 2850 on a shared downlink channel. Configuration information (parameters used to create an expected RS) of the other expected RSs may be signaled from the base station. Signaling other expected RS configuration information may reduce communication overhead compared to signaling the other expected RSs. The other expected RSs or other expected RS configuration information may be sent continuously. Alternatively, the other expected RSs or other expected RS configuration information may be requested by the terminal node following an unsuccessful reception of a layer using traditional methods (e.g., without CCN).

A terminal node may, in an alternative embodiment, determine the other expected RSs based on rules governing the configuration of expected RSs. For example, when RS configuration information is a known function of transmission mode and resource allocation (e.g., using LTE PDSCH position/timing within a transmission frame and base station PCI to define a RS), the terminal node can use this knowledge to determine the other expected RSs. Rules defining the configuration of expected RSs may be signaled or programmed in advance.

A terminal node may utilize the expected RSs to reduce the effect of non-orthogonal, overlapping RSs via the following CCN method. Referencing FIG. 28, the received signal at the first terminal node 2810 may be described as follows:

$$y_1 = h_{11}^{ch} x_1 + h_{12}^{ch} x_2 + n_1 \quad (35)$$

Where
- $y_1$ is the scalar, resource demapper data output (e.g., PDSCH in LTE) at OFDM symbol index i, and subcarrier index j at the first terminal node 2810. (Indices i and j in the above equations are omitted for clarity);
- $x_1$ is the scalar, frequency domain resource element data value (e.g., PDSCH in LTE) transmitted for layer 1 by the base station;
- $x_2$ is the scalar, frequency domain resource element data (e.g., PDSCH in LTE) value transmitted for layer 2 by the base station;
- $h_{11}^{ch}$ is the scalar CTF for transmitted layer 1 at the first terminal node 2810 demapper output;
- $h_{12}^{ch}$ is the scalar CTF for transmitted layer 2 at the first terminal node 2810 demapper output; and
- $n_1$ is the scalar noise value.

The equalizer/detector in the first terminal node 2810 may determine $\hat{x}_1$, its estimate of the transmitted signal, by solving the following equation, $$\hat{x}_1 = h_{11}^{-1} y_1 \quad (36)$$

Where $h_{11}$ is the CTF estimate of $h_{11}^{ch}$ as determined by the CTF estimation module. The CTF estimation module may determine $h_{11}$ by correlating the expected RS for layer 1 with the actual RS as received by the first terminal node 2810. If the layer 2 RS is transmitted on resources overlapping with the layer 1 RS, the actual RS as received by the first terminal node 2810 will contain energy and information from both the layer 1 and layer 2 RSs. If the layer 1 and layer 2 RSs are not orthogonal, the cross-correlation result between the expected RS for layer 1 and the actual RS will be influenced by the layer 2 RS. As a result, the CTF estimate $h_{11}$ may be inaccurate, and the ability of the first terminal node 2810 to correctly receive the desired layer 1 transmission will be impaired.

However, if the expected layer 2 RS is known by terminal node 1 based on, for example, methods described above, the CTF estimation error can be reduced or eliminated using CCN.

In an embodiment, an enhanced CTF estimate, $h'_{11}$, may be calculated in the CTF estimation module by applying the following equations, $$H' \triangleq [h'_{11} \ h'_{12}] = [h_{11} \ h_{12}] \begin{bmatrix} 1 & c_1 \\ c_1^* & 1 \end{bmatrix}^{-1} \quad (37)$$

$$c_1 = xcorr(R_1, R_2) \quad (38)$$

Where:
- H' is defined as the enhanced CTF estimate vector;
- $h'_{11}$ and $h'_{12}$ are the enhanced CTF estimates of $h_{11}^{ch}$ and $h_{12}^{ch}$ respectively;
- $R_1$ and $R_2$ are the expected RS for layer 1 and layer 2, respectively; and
- $h_{11}$ and $h_{12}$ are the CTF estimates of $h_{11}^{ch}$ and $h_{12}^{ch}$ respectively created, for example, by correlating the actual RS as received by the first terminal node 2810 with $R_1$ and $R_2$, respectively.

In a further embodiment, the calculation of the enhanced CTF estimates $h'_{11}$ and $h'_{12}$ may be used to improve the detection of $\hat{x}_1$ using methods other than the CTF estimate inversion technique described by equation (36). For example, $\hat{x}_1$ may be determined using techniques such as maximum likelihood detection and successive interference cancellation. Although the foregoing techniques describe enhancements to the detection of $\hat{x}_1$ at the first terminal node 2810, the same or similar methods may be applied to improving the detection of the layer 2 transmission at the second terminal node 2820.

In alternative scenarios, it is possible to have more than one layer transmitted to and received by one or more of the terminal nodes. For such a case, the minimum number of antennas required at each terminal node is the number of layers received by the terminal node, and the minimum number of antennas required at the base station is total number of layers transmitted to all the terminal nodes. For example, consider an extension of FIG. 28 where each terminal node has two receiver antennas and the base station has four transmitter antennas. In this case, the base station may transmit four layers with each terminal node receiving two layers. The methods described previously to obtain the other expected RSs may be employed in this scenario. The terminal nodes may utilize the expected RSs in an extension of the cross-correlation nulling method previously described in order to enhance the CTF estimation and eliminate the effect of non-orthogonal overlapping RSs.

Consider an extension of equation (35) to include the received signals at the first terminal node 2810, $$\begin{bmatrix} y_1 \\ y_2 \end{bmatrix} = \begin{bmatrix} h_{11}^{ch} & h_{12}^{ch} & h_{13}^{ch} & h_{14}^{ch} \\ h_{21}^{ch} & h_{22}^{ch} & c_{23}^{ch} & h_{24}^{ch} \end{bmatrix} \begin{bmatrix} x_1 \\ x_2 \\ x_3 \\ x_4 \end{bmatrix} + \begin{bmatrix} n_1 \\ n_2 \end{bmatrix} \quad (39)$$

From which CTF estimates may be computed as follows, $$\begin{bmatrix} h_{11} & h_{12} & h_{13} & h_{14} \\ h_{21} & h_{22} & h_{23} & h_{24} \end{bmatrix} = \quad (40)$$

$$\begin{bmatrix} xcorr(r_1, R_1) & xcorr(r_1, R_2) & xcorr(r_1, R_3) & xcorr(r_1, R_4) \\ xcorr(r_2, R_1) & xcorr(r_2, R_2) & xcorr(r_2, R_3) & xcorr(r_2, R_4) \end{bmatrix}$$

Where
- $y_1$, $y_2$ are the scalar, resource demapper data outputs (e.g., PDSCH in LTE) at OFDM symbol index i, and subcarrier index j of antenna 1 and 2, respectively, at the first terminal node 2810. (Indices i and j in the above equations are not displayed for clarity);

$x_1$, $x_2$ are the scalar, frequency domain resource element data values (e.g., PDSCH in LTE) transmitted for layer 1 and layer 2, respectively, by the base station, intended to be received by the first terminal node 2810;

$x_3$, $x_4$ are the scalar, frequency domain resource element data values (e.g., PDSCH in LTE) transmitted for layer 3 and layer 4, respectively, by the base station, intended to be received by the second terminal node 2820;

$h_{xy}^{ch}$ is the actual, scalar CTF between the terminal node layer x and base station layer y;

$R_n$ is the expected RS for the $n^{th}$ transmitted layer;

$r_n$ is the actual received RS for the $n^{th}$ received layer;

$h_{xy}$ is the scalar CTF estimate between terminal node layer x and base station layer y; and $n_x$ is the scalar noise value at terminal node layer x.

In an embodiment, the first terminal node 2810 creates an enhanced set of CTF estimates as follows:

$$H' = HC^{-1} \quad (41)$$

Where, $$H = \begin{bmatrix} h_{11} & h_{12} & h_{13} & h_{14} \\ h_{21} & h_{22} & h_{23} & h_{24} \end{bmatrix} \quad (42)$$

$$H' = \begin{bmatrix} h'_{11} & h'_{12} & h'_{13} & h'_{14} \\ h'_{21} & h'_{22} & h'_{23} & h'_{24} \end{bmatrix} \quad (43)$$

$$C = \begin{bmatrix} 1 & c_{12} & c_{13} & c_{14} \\ c^*_{12} & 1 & c_{23} & c_{24} \\ c^*_{13} & c^*_{23} & 1 & c_{34} \\ c^*_{14} & c^*_{24} & c^*_{34} & 1 \end{bmatrix} \quad (44)$$

and $$c_{ab} = \text{xcorr}(R_a, R_b) \quad (45)$$

The enhanced CTFs of $h'_{11}$, $h'_{12}$, $h'_{21}$, and $h'_{22}$ may be used to improve the reception of layer 1 and layer 2 using various techniques including ZF or MMSE equalization, or other methods as described herein. The enhanced CTFs of $h'_{13}$, $h'_{14}$, $h'_{23}$, and $h'_{24}$ may be used to further improve reception performance using, for example, interference mitigation techniques such as SIC and ML detection. The use of techniques such as SIC and ML may include the exchange of additional information such as modulation type, FEC parameters, and codeword lengths. This additional information may be exchanged using static and dynamic methods as described herein. CCN matrix C and the calculation of $c_{ab}$ may be adjusted to accommodate partially overlapping DL transmissions in which CCN is performed for various combinations of partial RS sequences.

If the number of antennas in a DL MU-MIMO terminal node is greater than the number of layers being sent to it by the base station, it is possible for the additional antennas to receive layers not intended for the terminal node. By receiving such unintended layers, a terminal node may further improve the ability to receive intended layers using techniques such as ZF, MMSE, SIC, and ML and those described herein. The decoding of the additional layers may be further enhanced by using CCN to improve the CTF estimates of transmissions using non-orthogonal RSs.

For example, consider the case of a base station transmitting two layers each to a first terminal node and a second terminal node. In this example, the first terminal node has 3 antennas rather than two and hence equation (39) above may be extended to include reception of $y_3$ from the third antenna as shown in equation (46).

$$\begin{bmatrix} y_1 \\ y_2 \\ y_3 \end{bmatrix} = \begin{bmatrix} h^{ch}_{11} & h^{ch}_{12} & h^{ch}_{13} & h^{ch}_{14} \\ h^{ch}_{21} & h^{ch}_{22} & h^{ch}_{23} & h^{ch}_{24} \\ c^{ch}_{31} & h^{ch}_{32} & h^{ch}_{33} & h^{ch}_{34} \end{bmatrix} \begin{bmatrix} x_1 \\ x_2 \\ x_3 \\ x_4 \end{bmatrix} + \begin{bmatrix} n_1 \\ n_2 \\ n_3 \end{bmatrix} \quad (46)$$

If expected RSs $R_1$, $R_2$ are known and $R_3$ and $R_4$ are signaled to the first terminal node, CTFs may be computed using an extension of equation (40). Enhanced CTFs may be computed via equation (41) with the C matrix shown in equation (44) and with the dimensionality of H and H' adjusted as:

$$H = \begin{bmatrix} h_{11} & h_{12} & h_{13} & h_{14} \\ h_{21} & h_{22} & h_{23} & h_{24} \\ h_{31} & h_{32} & h_{33} & h_{34} \end{bmatrix} \quad (47)$$

$$H' = \begin{bmatrix} h'_{11} & h'_{12} & h'_{13} & h'_{14} \\ h'_{21} & h'_{22} & h'_{23} & h'_{24} \\ h'_{31} & h'_{32} & h'_{33} & h'_{34} \end{bmatrix} \quad (48)$$

The outputs of $y_3$ and H' may be used to improve the reception of $x_1$ and $X_2$ as previously described. These techniques and equations may be adjusted for other combinations of terminal node quantities, numbers of receiver antennas per terminal node, and numbers of layers transmitted to each terminal node.

For the case where the number of receiver antennas of a terminal node is equal to or greater than the total number of layers transmitted by a base station, the scenario for that terminal node becomes similar to the DL SU-MIMO case previously described. Where the terminal node has access to all expected RS, the methods described above may be applied.

Multi-Base Station, Inter-Cell Operation

Terminal nodes may be located at the edge of a cell. Cell-edge terminal node antennas may receive downlink transmissions from an intended base station and one or more interfering base stations, all transmitting on overlapping T/F resources. FIG. 6 depicts this downlink scenario for two base stations, each transmitting a single layer, and two terminal nodes each receiving a wanted and an unwanted signal.

In a given timeslot/subcarrier allocation, such as a physical resource block (PRB) in LTE or a tile in WiMAX, the first UE 650a may receive a combination of wanted signal 635a from the first base station 675a and unwanted signal 645a from the neighboring second base station 675b. Similarly, the second UE 650b may receive a combination of wanted signal 635b from the neighboring second base station 675b and unwanted signal 645b from the first base station 675a.

The interfering transmission may degrade the ability of one or both terminal nodes to receive a transmission from the intended base station. This degradation may be exacerbated by the use of overlapping, non-orthogonal RSs by the two base stations. For example, consider two LTE base stations operating in proximity to each other, using the same transmission frequencies and both configured to transmit DL data using LTE transmission mode #1. In this mode, each base station uses 1 of 6 positional shifts to transmit a CRS. The positional shift is based on the base station PCI value. If the two neighboring base stations are using the same positional shift, then there is a possibility that non-orthogonal CRSs may be transmitted by the two base stations on common T/F resources.

In an embodiment, one or more expected RSs (or RS configuration information) used by the neighboring second base station 675b may be sent to the first base station 675a via a backhaul network, for example, communication path 625 or communication path 615a and communication path 615b. This information may be sent by the neighboring second base station 675b following a request by the first base station 675a. Alternatively, this information may be stored in a network server such as the central entity 605, and sent to the first base station 675a upon request.

In an alternate embodiment, expected RSs or RS configuration information may be sent by the neighboring second base station 675b or the central entity 605 to the first base station 675a periodically or upon a change in RS configuration or usage. In this scenario, the neighboring second base station 675b or the central entity 605 may include information describing how each expected RS may be used at different PRB locations within a frame.

The first base station 675a may communicate the expected RSs or RS configuration information of the neighboring second base station 675b to the first UE 650a for the purposes of mitigating inter-cell interference. The first base station 675a may communicate this information in response to a request from the first UE 650a following the unsuccessful reception of a transmission from the first base station 675a. In such a scenario, the first base station 675a may communicate RS information so as to avoid the effect of the inter-cell interference which prevented the successful reception of previous transmissions. For example, the first base station 675a may communicate this information using more robust modulation and coding or may transmit on different T/F resources.

In a further embodiment, the first base station 675a may communicate this information to all terminal nodes or a subset of terminal nodes most likely to use the information. For example, the base station may communicate this information to the set of terminal node determined to be at a cell edge. Various methods may be used for determining which terminal nodes are at the cell edge.

The terminal node may utilize the expected RSs to eliminate the effect of non-orthogonal, overlapping RSs via the cross-correlation nulling methods described above. For example, consider the previous DL MU-MIMO case of a 2 layer/2 antenna base station transmitting to two terminal nodes. In this previous example, the terminal nodes were members of a single cell. The scenario may be adjusted to depict an inter-cell configuration by considering one transmission layer (e.g., $x_1$ in equation (35)) as wanted signal 635a transmitted by the first base station 675a to the first UE 650a, and the second layer ($x_2$) as being transmitted by the neighboring second base station 675b to the second UE 650b. The first UE 650a, having demapper output $y_1$ and expected RSs $R_1$ and $R_2$, obtained using the exchange of information as previously described, may now apply equations (37) and (38) to create an enhanced CTF estimate H'. As before, the enhanced CTF estimate $h'_{11}$ may be used to improve reception using the CTF inversion method depicted in equation (36). Alternatively, the calculation of the enhanced CTF estimates $h'_{11}$ and $h'_{12}$ may be used to improve the detection of $\hat{x}_1$ using well-known techniques such as maximum likelihood detection and successive interference cancellation.

Multi-Neighbor Downselect

The exchange of information between base stations to reduce or eliminate the effect of interference on a base station's reception of a signal in various cases is described above. The exchange of information between base stations to improve the reception of an intended signal by a terminal node in various cases is also described. Methods that may be used by base stations for exchange of information in deployment scenarios of more than one neighbor base station are now described. To provide a specific example, the methods will be described with reference to the receiver or FIG. 5 and the processes of FIGS. 7-9; however, the methods may be used with any suitable apparatus or process. The methods are described for a base station that has already discovered the set of neighbor base stations and has the capability to communicate with each neighbor base station, for example, via a backhaul network.

For resolving UL interference, a base station may request data and information from a neighbor base station (e.g., in step 730 of process of FIG. 7 and step 840 of the process of FIG. 8). In an embodiment, a base station may request data and information from all of its known neighbor base stations. Each neighbor base station having UL transmissions overlapping the PUSCH T/F resources of the interfered base station will respond with data (e.g., in step 950 of the process of FIG. 9). If a neighbor base station receives a request for data but has no UL transmission overlapping the PUSCH T/F resources of the interfered base station, the neighbor base station may respond with a 'no corresponding overlapping data' message. Alternatively, the neighbor base station may simply ignore the request.

Once received, data and information from each neighbor base station may be used in a separate attempt to resolve interference (step 850). Step 840 and step 950 may be performed multiple times using data from multiple neighbor base stations in a serial fashion. That is, the base station may execute step 840 and step 850 using data from a first neighbor, then again execute step 840 and step 850 using data from a second neighbor base station, and so on. Alternatively, the base station may execute step 840 for all neighbors simultaneously and, as the data is received from a neighbor base station, execute step 850 using data from that neighbor base station. This may result in the execution of step 850 for multiple neighbor base stations in parallel.

In an embodiment, an enhanced step 850 may include additional inspection and selection functions. The inspection function determines the quality of each interference resolution attempt by determining, for example, the number of erroneous bits remaining following error correction (e.g., FEC) in the decoder module 565 of FIG. 5. Alternatively, the inspection function may estimate the PUSCH BER for each interference resolution attempt by inspecting demodulator metrics such as EVM. The selection function then selects the interference resolution attempt with highest quality and outputs this data as PUSCH data 570.

In an embodiment, the base station may determine the interference source, and the corresponding base station using a cross-correlation process over a set of expected RSs. In step 840, a base station may request that all neighbor base stations send the expected RS (or RS configuration information) used by each terminal node transmitting on the interfered PUSCH T/F resources. Upon reception of the set of expected RSs, the base station performs a cross-correlation operation at zero delay between its received RS on the interfered PUSCH and each expected RS from the neighbor base station(s). The magnitude of the cross-correlation operation is then computed and the result stored.

Since the set of expected RSs may not be orthogonal, an additional step may improve the set of magnitudes computed above using CCN. For example, consider the scenario in which a single received layer is being interfered by four overlapping transmissions to four neighbor base stations. Specifically, equation (41) may be applied where, H is the vector of unimproved cross-correlation magnitudes, $$H \triangleq [h_1 h_2 h_3 h_4] \qquad (49)$$

where $h_n$ is the result of the cross-correlation operation between the actual received RS and the n-th expected RS (in this example there are four), and $$C = \begin{bmatrix} 1 & c_{12} & c_{13} & c_{14} \\ c_{12}^* & 1 & c_{23} & c_{24} \\ c_{13}^* & c_{23}^* & 1 & c_{34} \\ c_{14}^* & c_{24}^* & c_{34}^* & 1 \end{bmatrix} \qquad (50)$$

and $$c_{ab} = \text{xcorr}(R_a, R_b) \qquad (51)$$

where $R_a$ and $R_b$ are the a-th and b-th expected RS.

The application of equation (41) using definitions (49), (50) and (51) results in a vector of improved cross-correlations having one element per expected RS. This method may be applied to any number of expected RSs. The expected RS which creates the largest cross-correlation magnitude is then determined. The base station then requests the remaining UL data associated with this expected RS from the corresponding neighbor base station. Once the remaining UL data is received, the base station attempts to resolve the interference in step 850.

Alternatively, the base station may determine the set of expected RSs with the n highest cross-correlation magnitudes. The base station may then request the remaining data from the set of neighbor base stations associated with the set of n expected RSs. The base station may attempt to resolve the interference using the enhanced step 850 described above.

In alternative embodiment, the set of expected RSs (or set of RSs configuration information) may be obtained from a central entity, such as central entity 605.

In a further embodiment, the set of expected RSs may be computed by the base station directly based on static information supplied by neighbor base stations in step 730 and using known set of rules used to construct the RS using the static information. For example, in LTE the RS used by a terminal node for UL transmissions is a Zadoff-Chu sequence with a seed value based on a base station PCI value. A neighbor list determined by LTE base stations typically contains each neighbor base station's PCI value, thus a base station knows the Zadoff-Chu seed values for UL transmissions scheduled by neighbor base stations. Furthermore, a neighbor base station may assign the remaining (non-seed) Zadoff-Chu parameters based upon the PUSCH size and position within a periodic frame (e.g., LTE slot number). In such a case, an interfered base station may combine the knowledge of each neighbor base station's PCI value with the position of the interfered PUSCH transmission to create a set of expected RSs used for UL transmissions to neighbor base stations. Given the set of expected RSs, the above methods may then be applied.

Additionally or alternatively, a base station may determine the neighbor base station involved in the interference based on the physical relationship between the base stations and their coverage areas. For example, during neighbor base station discovery (steps 720 and 730), each base station may supply geographic coordinates describing its location and coverage area. This information may be stored in a file, table, or database on the base station. If a base station fails to successfully decode a PUSCH transmission (e.g., at step 830), the base station determines the last known physical position of the transmitting terminal node. This position is then compared to the coverage areas of each neighbor base station. The set of neighbor base stations having a coverage area which includes or is near to the terminal node's position is then determined. If the set contains a single neighbor base station, then steps 840 and 850 may be performed. If the set contains more than one neighbor base station, then the enhanced methods described above may be applied to the neighbor base stations within the set.

The physical location of terminal nodes is known to the network and such information may be obtained by a base station via a request sent to the appropriate network entity via the backhaul interface. Furthermore, the functions to request, store, and process geographic information may reside in devices other than base stations, e.g., a network node such as central entity 605.

The methods for multi-neighbor downselect were described using examples of uplink transmissions and interference. The same or similar methods may be applied to downlink communications.

Resource Allocation and Pairing

Information relating to an interference resolution attempt may be tracked and used to improve the probability of successful reception of subsequent transmissions. The methods described below rely generally on two concepts about the behavior of mobile networks: (a) transmission patterns exist, that is, transmissions to or from a terminal node may occur on a periodic basis; and (b) despite having mobile capability, many terminal nodes may be in the same or a similar physical location for many transmission/reception events.

Examples of transmission patterns include periodic UL transmissions in support of a VoIP service (e.g., every 10 ms), periodic keep alive transactions generated by transport protocols such as TCP, and periodic updates generated by terminal node applications contacting an Internet-based server (e.g., email, Facebook).

Stationarity may be viewed over various timescales. Many mobile terminal nodes being served in a typical cell are stationary, for example, those located at a user's home, school, or place of work. Stationary operation may continue for minutes or hours. Even when in motion a terminal node may remain in a similar position for a period of time long enough to conduct many transmissions and receptions. For example, a cell edge terminal node, which may either produce or be vulnerable to inter-cell interference, may remain (even at vehicular speeds) at the cell edge for many seconds or longer.

In an embodiment, information related to each attempt to resolve inter-cell interference by a base station is stored. For example, a receive results table may be created by the base station containing an entry for each resolution attempt. Information in an UL variant of the table may include local UE ID, neighbor base station ID, interfering UE ID, PUSCH PRB resource allocation range, frame number, slot number, and interference resolution result. A local UE in this context refers to a UE that is associated or 'attached' with the base station creating the table. In this UL inter-cell interference scenario, an interfering UE is a UE which is associated or attached to a neighbor base station.

The local UE ID may be represented by a UE's International Mobile Subscriber Identity (IMSI) or Temporary Mobile Subscriber Identity (TMSI). The neighbor base station ID may be represented by a physical cell identity (PCI) and obtained during neighbor discovery. The interfering UE ID may be represented by an IMSI or TMSI if such information is sent by a neighbor base station during an interference resolution attempt, for example, during step 840 of the process of FIG. 8. Alternatively, the interfering UE ID may be represented by the expected RS (or RS configuration information) used by the interfering UE. The PUSCH allocation range may be described by the range of subcarriers (e.g., beginning subcarrier, ending subcarrier). Frame number is an index assigned to each transmission frame, for example, each 10 ms frame may be assigned an index number which increments for each transmission. Slot number is an index describing the time-based position of the PRB within a frame. In LTE, for example, there are 20 slots per frame. In this scenario, slot number may be an integer from 1 to 20. The interference resolution result may be a pass/fail indication created by comparing the quality determination in step 850 to a threshold. Alternatively, the interference resolution result may be the continuously variable quality determination result (e.g., 25% BER)

| Local UE ID | Neighbor Base Station ID | Interfering UE ID | PUSCH allocation range | UL interference resolution result | Slot Number | Frame Number |
|---|---|---|---|---|---|---|
| 17 | 21 | 171 | 1-12 | Success | 10 | 4353 |
| 17 | 21 | 171 | 1-12 | Success | 10 | 4354 |
| 19 | 21 | 182 | 13-24 | Failure | 11 | 4354 |
| 15 | 21 | 182 | 13-24 | Failure | 12 | 4354 |
| 17 | 21 | 171 | 1-12 | Success | 10 | 4355 |
| 17 | 21 | 182 | 13-24 | Failure | 11 | 4360 |

The exemplary table above depicts the results of 6 different UL interference resolution attempts. The interference resolution attempts are made on behalf of three local UEs (15, 17, and 19) communicating with a base station. Interference is being caused by one of two interfering UEs, 171 and 182, transmitting to neighbor base station 21.

By analyzing the table contents, a base station may determine which PUSCH PRB locations are more likely to result in successful UL interference resolution and assign those resources preferentially (e.g., first or with increased probability). For example, in the above table, a base station may determine that PUSCH allocation range 1-12 is to be assigned prior to other PUSCH ranges due to three previous successful receptions (data rows 1, 2, and 5 in the table). The preferential PUSCH assignment may be applied cell wide. That is, the preference may be applied to any UE needing UL resources. Alternatively, the preference may be applied to a subgroup of UEs, for example, those determined to be at the cell edge or those sharing the cell edge with neighbor base station 21. Finally, the preference may be applied uniquely per UE, for example, PUSCH allocation range 1-12 may only be preferentially assigned for the UE 17 due its previous success but not preferentially assigned for other UEs.

A base station may also use the table to determine which slots are more likely to result in successful UL interference resolution. This may be a particularly useful approach when supporting services requiring periodic UL transmissions, for example, voice or VoIP services. Referencing the table above, a base station may preferentially assign slot 10 (and possibly using PUSCH range 1-12) before slots 11 and 12 due to the success of the previous UL interference resolution attempts.

Table contents may be removed following a specified period of time (age out) in order to avoid using stale or irrelevant data. The age-out period may be a function of cell density, UE mobility or other factors.

The table may be enhanced to include information regarding the success or failure of reception without using UL interference resolution methods. That is, an additional table column may depict that an UL transmission was successfully received during step 830 of the process of FIG. 8. This additional information may be used to enhance the performance of the resource allocation methods described above. For example, the table may be used by a base station to first allocate PUSCH T/F resources which are most likely to be successfully received without requiring UL interference resolution. Once such resources are fully allocated, the base station may then allocate PUSCH T/F resources which are most likely to be successfully received when using UL interference resolution.

In an embodiment, preferential allocation of resources by a base station may be based on a statistical computation of the table data. For example, a base station may analyze the table and compute the average success rate for each PRB location and slot. The average success rate of a PRB and slot may be computed by dividing the total number of interference resolution successes by the total number of interference resolution attempts. The preferential allocation of resources for each slot may then be made in order from the PRB location with the highest success rate to the PRB location with the lowest success rate. This computation may be further extended to include success rate per local UE, per neighbor base station, or combination thereof.

Alternatively or additionally, a base station may send its table to one or more neighbor base stations. Base stations may send a table periodically, on-demand, or based upon a change in table or base station status (e.g., the addition of new information to the table). A base station may send its table only to one or more of the neighbor base stations which are listed in a base station's current table, for example, base station 21 in the exemplary table above.

In an embodiment, a base station may use a table received from a neighbor base station to augment the methods for allocating PUSCH PRBs described above. For example, a base station may first preferentially allocate PUSCH PRB locations in which both the base station and the neighbor base station have had successful receptions, both with and without the use of UL interference resolution. Once such resources are allocated, the base station may then preferentially allocate PUSCH PRB locations for which the base station has had successful receptions, but the neighboring base station has not. Also, the base station may allocate PUSCH PRB locations where neither the base station nor neighbor base station have had successful receptions. This may be useful in high mobility scenarios where there is a possibility that UE movement may result in improved reception not predicted by the current table entries.

Alternatively, the base station may allocate PUSH PRB locations where neither the base station nor neighbor base station have had successful receptions to a different class of local UE (e.g., allocate to non-cell edge users) or attempt to allocate these locations to a specific local UE which has not yet attempted an UL transmission. Alternatively, the base station may intentionally avoid the use of PRB locations and/or scheduling intervals that have not been used successfully, by the base station or a neighbor base station.

In an embodiment, a base station and neighboring base station may explicitly pair UEs for transmission on the same PUSCH PRB location and slot. For example, consider UE 17 communicating to a base station and UE 171, communicating to neighbor base station 21. By analyzing its table, a base station may determine that UL transmissions from UE 17 are successfully received on PUSCH range 1-12 and slot 10 using UL interference resolution. The base station may make this determination, for example, by calculating the success rate and comparing the result to a minimum threshold. Considering the example for UE 17 in the table above, the success rate for PUSH range 1-12 and slot 10 is 100%.

The base station may then send a message to neighbor base station 21 informing it of the intention to use a particular PUSCH PRB location and slot for subsequent UE 17 transmissions. If UE 171 has UL data pending, then neighbor base station 21 may then attempt to schedule UE 171 at the same PUSCH PRB location and slot.

Information regarding the periodicity of transmissions from UE 17 may be included in the base station message to further enhance this method for services requiring periodic transmissions. For example, the base station may send a message describing the use and settings of a persistent or semi-persistent scheduling mode for the allocation of UL resources to UE 17.

Enhanced Interference Resolution and Information Exchange

The reuse one interference problem is particular concern in small cell deployments. Small cells may be located within the coverage area of a macrocell and may use the same transmission channel as the macrocell. Uplink transmissions to the small cell base station by terminal nodes associated with the small cell may be impacted by transmissions of terminal nodes that are associated with the macrocell and are in the geographic proximity of the small cell. Similarly, the uplink transmissions to the macrocell base station by terminal nodes associated with the macrocell may be impacted by transmissions of terminal nodes that are associated with small cells in geographic proximity of the macrocell base station. Reuse one interference is also of concern in heterogeneous network deployments of LTE. Heterogeneous network deployment in LTE refers to multiple small range transmission/reception points, such as remote radio heads or small cells covering regions of a larger macrocell and using the same transmission channel. Heterogeneous networks may also be referred to as HetNets.

Figure 29:
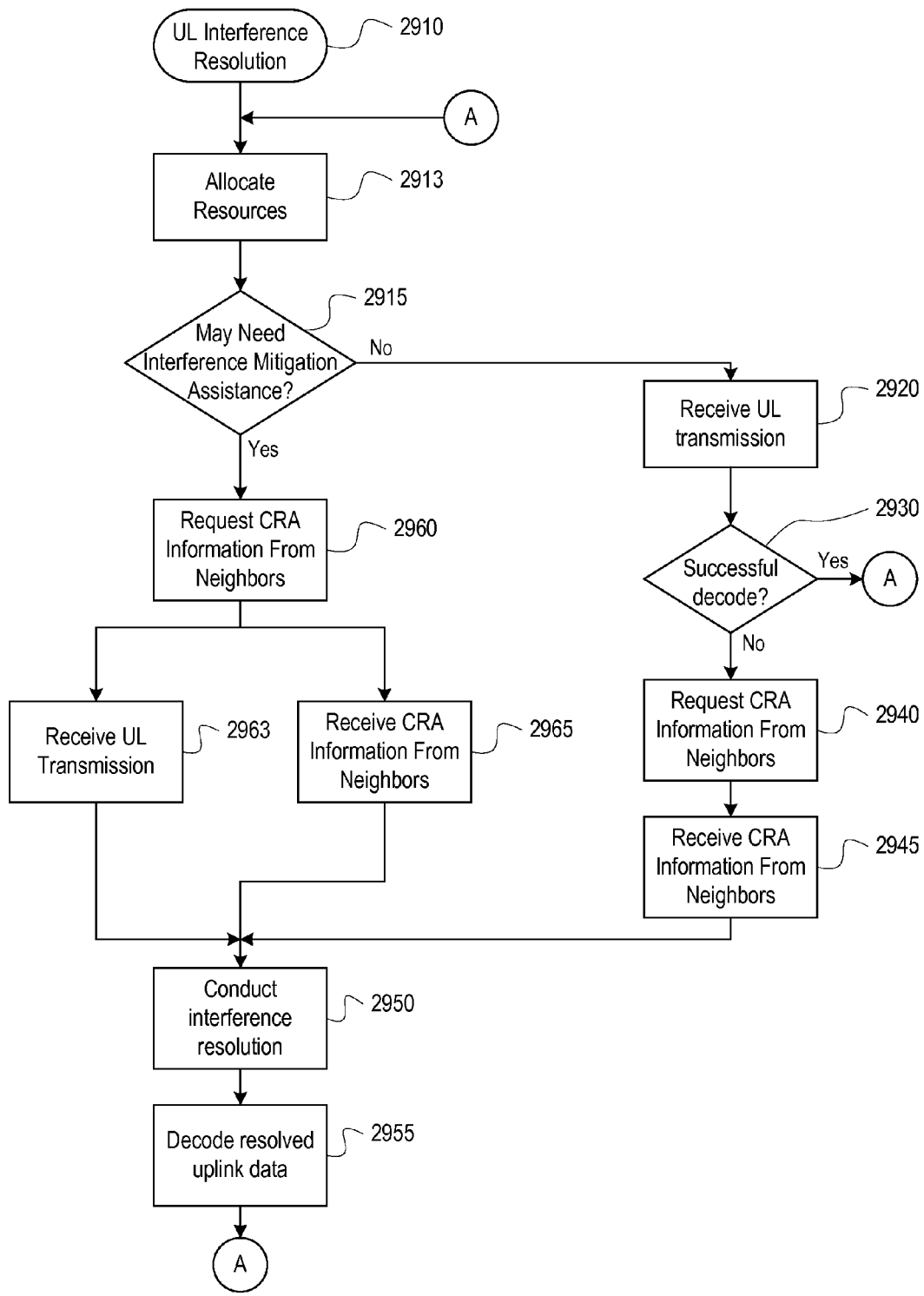
FIG. 29 is a flowchart of a process for a configuration and resource allocation information exchange for interference resolution in accordance with aspects of the invention.

FIG. 29 is a flowchart of a process for configuration and resource allocation (CRA) information exchange for interference resolution in accordance with aspects of the invention. The process may be performed, for example, by an access node. The access node may use the CRA information for interference cancellation and other processing described here. The process of FIG. 29 may be viewed as an enhancement of the process fro on-demand uncoordinated uplink multipoint interference resolution of FIG. 8.

These CRA information can be used in estimating channel characteristics, such as the channel transfer function (CTF). The CRA information may, for example, include the number of layers transmitted by an interferer, time/frequency resources that are used for the interfering transmission, and the expected reference signals used in the interfering transmission. The CRA information may include modulation and forward error correction parameters of the interfering transmission.

Some components of CRA information exchanged between base stations may be static parameters exchanged at configuration or configuration update. Some components of CRA information may be dynamic parameters that are exchanged as needed.

Methods for mitigating interference may benefit from the simultaneous reception of multiple signals, both the wanted signal and an unwanted interferer, coinciding in time and frequency by multiple receiver chains. Thus, in addition to the techniques for using CRA to improve CTF estimation, interference mitigation may benefit from using otherwise unused receiver chain resources as will be described in more detail below.

The process of FIG. 29 extends the previously described exchange of CRA information (where received frequency domain data were being exchanged between base stations) to include the case where only CRA information is exchanged between the base stations and the signals derived from multiple antennas of a receiving (assisted) base station are used to replace the received frequency domain signals provided by assisting base stations. This reduces the backhaul traffic since there is no transmission of received frequency domain data in the backhaul.

The process of FIG. 29 will be described with reference to the communication system of FIG. 6 and as performed by the first base station 675a. The process may, however, be performed by any suitable apparatus. Wanted signal 635a in FIG. 6 may be a single layer transmission, a multi-layer SU-MIMO transmission, or a multi-layer transmission which is a component of a MU-MIMO transmission targeting the first base station 675a. Similarly, the neighboring second base station 675b receives wanted signal 635b from the second UE 650b. Wanted signal 635b may be a single layer transmission, a multi-layer SU-MIMO transmission, or a multi-layer transmission which is a component of a MU-MIMO transmission targeting the neighboring second base station 675b.

As shown in FIG. 29, the process may begin at step 2910, such as after the base station is initialized.

At step 2913, the first base station 675a performs a resource allocation. The resource allocation may take into account the relative priorities, data rate requirements, and link budgets for multiple terminal nodes (including the first UE 650a) for which the first base station may need to allocate resources. Furthermore, channel quality considerations across the transmission channel, anticipated gain from interference mitigation if conducted, and protocol restrictions per the communications standard may also be considered. As a result of the resource allocation, the first base station determines a subframe and a number of PRBs for the UL transmission of the first terminal node.

At step 2915, the first base station determines whether reception of the transmission from the first terminal node is likely to benefit by use of interference resolution. This decision may be based, for example, on received signal level, whether the first terminal node is a cell-edge terminal node, or whether the transmission from the first terminal node is likely to be impacted by interference from other transmissions. If the process determines that the reception of the transmission from the first terminal node is not likely to be benefitted by use of interference resolution, the process proceeds to step 2920; otherwise, the process continues to step 2960.

At step 2920, the first base station receives UL transmission from the first terminal node and attempts to decode the uplink transmission data. In step 2930, the first base station determines whether it has successfully decoded the received UL transmission. If the first base station has not successfully decoded the UL transmission, the process continues to step 2940; otherwise, the process returns to step 2913. At step 2940, the first base station requests CRA information from the neighboring second base station. In step 2945, the first base station receives the requested information. In step 2940 and step 2945, alternatively or additionally, the process may request and receive signal data received by the neighboring base station. The process continues to step 2950 for interference resolution. Operation of step 2920 may be the same or similar to step 820; operation of step 2930 may be the same or similar to step 830; operation of step 2940 may be the same or similar to step 840; operation of step 2945 may be the same or similar to step 845.

In step 2960 (reached when successful reception of the transmission from the first terminal node is likely to benefit from interference resolution), the first base station requests CRA information from one or more neighbor base stations. This information may, for example, be requested and received through a central entity. The requested CRA information may be the CRA information related to a subframe that will be transmitted in the future. The process then continues to step 2963 and step 2965.

In step 2963 the first base station receives the transmission from the first terminal node. In step 2965, the first base station receives CRA information from the neighboring base stations. Step 2963 and step 2965 may be concurrent or sequential. After step 2963 and step 2965 complete, the process continues to 2950.

In step 2950, the first base station conducts interference resolution using local uplink transmission data (from step 2963 or step 2920) and the received CRA information (from step 2965 or step 2945). In step 2955, the base station decodes the interference resolved uplink transmission data to decode the received UL signal and produce decoded uplink data. The process then returns to step 2913. Operation of step 2950 may be the same or similar to step 850, and operation of step 2955 may be the same or similar to step 855.

The process of FIG. 29, which includes proactive and reactive information requests, may be modified by adding, omitting, reordering, or altering steps. For example, in some embodiments, neighboring base stations may periodically send their CRA information to the first base station. Additionally, the CRA information that a neighboring base station provides may be the CRA information for the whole transmission bandwidth of the neighboring base station or the CRA information for a specific set of T/F resources requested by the first base station 675*a*. In another variation, the neighboring base station may provide CRA information for any PUSCH transmissions that overlap (the superset of T/F resources defined by the overlapping PUSCHs) a specific set of T/F resources specified by the first base station 675*a*.

Enhanced Receiver Operation Interference Mitigation

Additional techniques for interference resolution are now described. The interference resolution may be used, for example, in step 2950 or a variant of step 850. Aspects of these techniques will be described with reference to the multi-layered receiver of FIG. 22 and the communication system of FIG. 6. The techniques can use CRA information along with signals derived from multiple antennas of an assisted base station (e.g., the first base station 675*a*) to operate without received frequency domain signals provided by assisting (neighboring) base stations (e.g., the neighboring second base station 675*b*). This can reduce the backhaul traffic since there is no transmission of received frequency domain data over the backhaul.

The assisted base station may request CRA information from multiple neighboring base stations. The assisted base station may request CRA information for all or a subset of the neighboring base stations. The subset of neighbor base stations may be selected based on considerations such as the geographic location of the terminal node from which a transmission is to be received and the likelihood interference form transmissions intended for the neighbor base stations.

The assisted base station may receive CRA information for the whole transmission bandwidth of a neighboring base station. In such cases, upon receiving the CRA information, the assisted base station can analyze received the CRA information to identify which, if any, of the neighbor base stations have UL transmissions that overlap PRBs that are used by UL transmission targeting the assisted base station. Alternatively, the assisted base station may specify the PRBs for which it is requesting CRA information and the neighboring base station may provide CRA information for the specific requested PRBs of interest. In this case, if a neighboring base station does not have any scheduled receptions in the specified PRBs, the neighboring base station may respond by stating that it does not have a transmission in the specified PRBs. If a neighbor base station identifies that there is no transmission in overlapping PRBs, the assisted base station can ignore CRA information related to transmissions by terminal nodes to this neighboring base station in the interference resolution. Uplink transmissions to neighboring base stations that are overlapping the transmissions to the assisted base station are layers to be processed by the assisted base station.

A base station with multiple receiver chains may be used for multi-layer reception, for example, reception of SU-MIMO-SM or MU-MIMO-SM transmissions. The processing that the assisted base station can perform to mitigate interference caused by one or more unwanted signals depends upon the total number of layers transmitted by intended and interfering terminal nodes compared to the number of receiver chains at the assisted base station. Here, unwanted signals refers to interfering signals transmitted to neighbor base stations for which CRA information is available. The total number of layers in the received signals may be determined by the assisted base station using CRA information received from neighboring base stations. When the total number of layers (wanted and unwanted) received by a base station is less than or equal to the number receiver chains, the base station may both receive wanted layers and also perform interference mitigation. When the total number of layers is less than the number receiver chains, the base station may use receiver chains that are in excess of the wanted layers for techniques such as diversity combining, beamforming, as well as performing interference resolution which may include cross-correlation nulling. The use of the receiver chains may vary for different PRBs and over time.

The multi-layer receiver of FIG. 22 may be used for the reception of multiple layers (wanted and unwanted) where the wanted signal and any of the interferers may be single layer transmissions or multiple layer transmissions that are a part of SU-MIMO transmissions or MU MIMO transmissions. In the case of uplink interference, the receiver antennas are exposed to a superposition of multiple layers transmitted by more than one terminal node from one or more cells. The time/frequency resource allocations for the layers transmitted by each terminal node may be different. In the case of interference resolution, data reception is required only for wanted layers. Although layers from other unwanted transmissions can be equalized, the assisted base station may omit decoding of layers from other unwanted transmissions. Alternatively, the assisted base station may omit may fully decode of all the layers, for example, using SIC techniques. In the full decoding case, after the signal components associated with interfering layers are removed, the decoded layer data from the interfering layers may be discarded. CRA information may be used to obtain CTF estimates of unwanted layers and used to improve reception of wanted layers. The CTF estimates may be combined with CCN techniques to improve CTF estimates for all layers.

If the total number of layers for particular PRBs is greater than the number of receiver chains (but the number of wanted layers is less than the number of receiver chains), the assisted base station may select a subset of interferers for interference resolution. For example, a level sensing operation may be conducted to identify the strongest of the interferers and perform interference resolution just for those interferers. The level sensing operation may, for example, be conducted by performing CTF estimation for all interfering layers and identifying the strongest of the interferers based on the magnitude of the CTF values. Alternatively, a receiver may randomly select interferers and for interference resolution. The number of interferers selected for interference resolution is such that the total number of wanted and unwanted layers processed is less than or equal to the number of receiver chains.

Additionally, when the number of receiver chains is smaller than the total number of layers received, CRA information may be used to obtain improved CTF estimates for the wanted and unwanted layers through the use of CCN. The obtained CTF estimates then may be used in advanced receiver algorithms that use maximum likelihood or successive interference cancellation algorithms where the receiver attempts to demodulate more layers than the available number of receiver chains. The use of maximum likelihood typically uses information such as the modulation type used by interfering signals. To enable an SIC receiver, further information such as length of the FEC coding schemes and code word block length may be used. This additional information may be provided by assisting base stations using methods described herein.

The cross-correlation matrix is constructed by cross-correlating the expected RSs. If the correlations between RSs are small compared to the autocorrelation of RSs, the cross-correlation matrix is invertible without significant noise amplification when used to improve CTF estimates. In some scenarios, the cross-correlation matrix may be singular or close to singular, which may cause significant noise amplification when used to attempt to improve CTF estimates. In order to detect this situation and reduce degradation due to noise amplification, the base station may deploy a metric such as a condition number of the cross-correlation matrix. If, for example, the condition number is found to be larger than a threshold value, the receiver may elect to not use the CCN processing. The threshold value may be a function of, for example, signal-to-noise ratio of the received signal. For example, the condition number threshold value may be 100 when the signal-to-noise ratio is less than 20 dB and the value may be increased to 200 when the signal-to-noise ratio is greater than 20 dB.

The techniques presented in this application may also be applied to the scenario of inter-cell SRS interference. Improvements may be obtained for SRSs if the base station is furnished with sufficient information about allocation of resources for SRS transmissions and the specific SRS sequences transmitted to the neighboring base stations.

The embodiments disclosed herein related to channel estimation and detection are presented for explanatory purposes and it should be appreciated that the concepts presented herein can also be applied to other techniques and modalities. The foregoing systems and methods and associated devices and modules are susceptible to many variations. For example, the systems and methods method can be extended to MIMO systems by using appropriately dimensioned channel transfer functions. Additionally, for clarity and concision, many descriptions of the systems and methods have been simplified. For example, the figures generally illustrate one (or two) of each device, communication structure, and the like, but a communication system may have many of each type of device. Similarly, many descriptions use terminology and structures of a specific wireless standard such as LTE. However, the disclosed systems and methods are more broadly applicable, including for example, in WiMAX systems. Additionally, various assumptions are state in some descriptions. The assumptions often allow simpler or clearer descriptions. The described systems and methods are generally applicable it scenarios where stated assumptions are not valid.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The various illustrative logical blocks, units, steps and modules described in connection with the embodiments disclosed herein can be implemented or performed with a processor, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules. Similarly, a first device may be described as transmitting data to (or receiving from) a second device when there are intermediary devices that couple the first and second device and also when the first device is unaware of the ultimate destination of the data.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter that is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. An access node, comprising:
    a first radio module configured to receive, using a first antenna, a transmission including a first signal and a second signal;
    a second radio module configured to receive, using a second antenna, the transmission; a memory module; and a processor module coupled to the first and second radio modules and the memory module and configured to:
    derive a first local reference signal from the received transmission of the first radio module;
    derive a second local reference signal from the received transmission of the second radio module; and
    estimate one or more channel transfer functions associated with the transmission, the estimation of the one or more channel transfer functions including correlating at least a portion of an expected reference signal associated with the first signal with at least a portion of the first local reference signal, and correlating at least a portion of an expected reference signal associated with the second signal with at least a portion of the second local reference signal,
    wherein the at least a portion of the expected reference signal associated with the first signal and the at least a portion of the expected reference signal associated with the second signal are non-orthogonal to each other.

2. The access node of claim 1, wherein the expected reference signal associated with the first signal and the expected reference signal associated with the second signal are partially overlapping in frequency.

3. The access node of claim 1, wherein the expected reference signal associated with the first signal and the expected reference signal associated with the second signal are different sizes.

4. The access node of claim 1, wherein the first signal and the second signal are associated with different layers of a multiple-input multiple-output transmission.

5. The access node of claim 1, wherein the processor is further configured to determine decoded data conveyed in the received transmission using the one or more estimated channel transfer functions.

6. The access node of claim 1, wherein the estimation of the one or more channel transfer functions further includes applying a correction to the channel transfer function, the correction including correlating the at least a portion of the expected reference signal associated with the first signal with a corresponding portion of the second local reference signal, or correlating the at least a portion of the expected reference signal associated with the second signal with a corresponding portion of the first local reference signal.

7. The access node of claim 1, wherein the reference signals are demodulation reference signals.

8. The access node of claim 1, wherein the estimation of the one or more channel transfer functions further includes:
    partitioning an aggregate frequency range into frequency range segments, the aggregate frequency range containing frequencies occupied by the first signal or the second signal; and
    estimating a channel transfer function for each of the frequency range segments.

9. The access node of claim 8, wherein the frequency range segments are selected based at least in part on frequency selectivity of a channel associated with the received transmission.

10. The access node of claim 8, wherein the frequency range segments are selected based at least in part on frequencies occupied by the first signal and frequencies occupied by the second signal.

11. The access node of claim 8, wherein partitioning the aggregate frequency range includes:
    dividing the aggregate frequency range into one or more frequency range sub-bands; and
    segmenting the frequency range sub-bands into one or more frequency range segments.

12. The access node of claim 11, wherein dividing the aggregate frequency range into one or more frequency range sub-bands uses predetermined sub-band sizes.

13. The access node of claim 11, wherein dividing the aggregate frequency range into one or more frequency range sub-bands includes:
    analyzing a channel associated with the received transmission for frequency selectivity; and
    dividing the aggregate frequency range into the one or more frequency range sub-bands based on analyzed frequency selectivity.

14. The access node of claim 11, wherein the frequency range segments include segments of the frequency range sub-bands having unique combinations of first and second signals.

15. A method for receiving communications in a wireless communication system, the method comprising:
    receiving, using a first antenna, a transmission that includes a first signal and a second signal;
    receiving the transmission using a second antenna;
    deriving a first local reference signal from the transmission received using the first antenna; and
    deriving a second local reference signal from the transmission received using the second antenna; and
    estimating one or more channel transfer functions associated with the transmission, the estimating including correlating at least a portion of an expected reference signal associated with the first signal with at least a portion of the first local reference signal, and correlating at least a portion of an expected reference signal associated with the second signal with at least a portion of the second local reference signal,
    wherein the at least a portion of the expected reference signal associated with the first signal and the at least a portion of the expected reference signal associated with the second signal are non-orthogonal to each other.

16. The method of claim 15, wherein the expected reference signal associated with the first signal and the expected reference signal associated with the second signal are partially overlapping in frequency.

17. The method of claim 15, wherein the expected reference signal associated with the first signal and the expected reference signal associated with the second signal are different sizes.

18. The method of claim 15, wherein the first signal are the second signal are associated with different layers of a multiple-input multiple-output transmission.

19. The method of claim 15, further comprising determining decoded data conveyed in the received transmission using the one or more estimated channel transfer functions.

20. The method of claim 15, wherein the estimating further includes applying a correction to the channel transfer function, the correction including correlating the at least a portion of the expected reference signal associated with the first signal with a corresponding portion of the second local reference signal, or correlating the at least a portion of the expected reference signal associated with the second signal with a corresponding portion of the first local reference signal.

21. The method of claim 15, wherein the reference signals are demodulation reference signals.

22. The method of claim 15, wherein estimating the one or more channel transfer functions further includes:
   partitioning an aggregate frequency range into frequency range segments, the aggregate frequency range containing frequencies occupied by the first signal or the second signal; and
   estimating a channel transfer function for each of the frequency range segments.

23. The method of claim 22, wherein the frequency range segments are selected based at least in part on frequency selectivity of a channel associated with the first signal.

24. The method of claim 22, wherein the frequency range segments are selected based at least in part on frequencies occupied by the first signal and frequencies occupied by the second signal.

25. The method of claim 22, wherein partitioning the aggregate frequency range includes:
   dividing the aggregate frequency range into one or more frequency range sub-bands; and
   segmenting the frequency range sub-bands into one or more frequency range segments.

26. The method of claim 25, wherein dividing the aggregate frequency range into one or more frequency range sub-bands uses predetermined sub-band sizes.

27. The method of claim 25, wherein dividing the aggregate frequency range into one or more frequency range sub-bands includes:
   analyzing a channel associated with the first signal for frequency selectivity; and
   dividing the aggregate frequency range into the one or more frequency range sub-bands based on analyzed frequency selectivity.

28. The method of claim 25, wherein the frequency range segments include segments of the frequency range sub-bands having unique combinations of first and second signals.

29. A communication system, comprising:
   a first terminal node including a first transmitter configured to transmit a first signal that includes a first expected reference signal;
   a second terminal node including a second transmitter configured to transmit a second signal that includes a second expected reference signal,
   wherein the second expected reference signal is transmitted using frequencies that partially overlap with frequencies used by the first terminal node to transmit the first expected reference signal, or wherein the second expected reference signal and the first expected reference signal are non-orthogonal to each other;
   an access node comprising:
   a first radio module configured to receive, using a first antenna, a transmission including the first signal and the second signal;
   a second radio module configured to receive, using a second antenna, the transmission; a memory module; and a processor module coupled to the first and second radio modules and the memory module and configured to:
   derive a first local reference signal from the received transmission of the first radio module;
   derive a second local reference signal from the received transmission of the second radio module; and
   estimate one or more channel transfer functions associated with the transmission, the estimation of the one or more channel transfer functions including
   correlating at least a portion of the first expected reference signal with at least a portion of first local reference signal, and correlating at least a portion of the second expected reference signal with at least a portion of the second local reference signal,
   wherein the at least a portion of the first expected reference signal and the at least a portion of the second expected reference signal are non-orthogonal to each other.

* * * * *